United States Patent
Hattori et al.

(10) Patent No.: US 8,259,280 B2
(45) Date of Patent: Sep. 4, 2012

(54) IMAGE DISPLAY DEVICE AND MANUFACTURING METHOD THEREOF

(75) Inventors: Takashi Hattori, Musashimurayama (JP); Midori Kato, Kawasaki (JP); Mutsuko Hatano, Kokubunji (JP); Takeshi Satou, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 503 days.

(21) Appl. No.: 12/509,581

(22) Filed: Jul. 27, 2009

(65) Prior Publication Data
US 2010/0026938 A1    Feb. 4, 2010

(30) Foreign Application Priority Data
Jul. 29, 2008    (JP) .................. 2008-194725

(51) Int. Cl.
G02F 1/1333    (2006.01)
G02F 1/1335    (2006.01)
(52) U.S. Cl. .......................... 349/158; 349/96
(58) Field of Classification Search .............. 349/96–98, 349/158–160
See application file for complete search history.

(56) References Cited

U.S. PATENT DOCUMENTS

| | | | |
|---|---|---|---|
| 6,417,899 B1 * | 7/2002 | Jones et al. | 349/96 |
| 6,624,863 B1 | 9/2003 | Jacobs et al. | |
| 8,014,068 B2 * | 9/2011 | Cheong et al. | 359/900 |
| 2007/0076143 A1 | 4/2007 | Palk et al. | |
| 2008/0132667 A1 | 6/2008 | Makinoshima et al. | |
| 2008/0292786 A1 | 11/2008 | Hatano et al. | |
| 2009/0015760 A1 | 1/2009 | Hattori et al. | |

FOREIGN PATENT DOCUMENTS

| | | |
|---|---|---|
| JP | 11-084413 | 3/1999 |
| JP | 2002-033464 | 1/2002 |
| JP | 2006-199945 | 8/2006 |
| JP | 2007-102174 | 4/2007 |
| JP | 2008-292608 | 12/2008 |
| JP | 2009-021322 | 1/2009 |

OTHER PUBLICATIONS

French et al., "Thin Plastic Electrophoretic Displays Fabricated by a Novel Process", Society for Information Display, Symposium Digest of Technical Papers, vol. 36, Issue 1, pp. 1634-1637(May 2005).

(Continued)

*Primary Examiner* — Dung T. Nguyen
(74) *Attorney, Agent, or Firm* — Antonelli, Terry, Stout & Kraus, LLP.

(57) ABSTRACT

An image display device having a display panel in which a first substrate and a second substrate are disposed to each other, in which the first substrate includes an insulating substrate composed of a resin, a circuit layer having a circuit where a plurality of Thin-film transistors are arranged in a matrix, and a polarizer disposed between the insulating substrate and the circuit layer, the insulating substrate has a thickness of 20 μm or more and 150 μm or less, a transmittance of 80% or more for a visible light at a wavelength of 400 nm or more and 800 nm or less, and a 3% weight reduction temperature of 300° C. or higher, and has no melting point or has a melting point of 300° C. or higher.

4 Claims, 26 Drawing Sheets

OTHER PUBLICATIONS

Yeh et al., "7-Inch Color VGA Flexible TFT LCD on Colorless Polyimide Substrate with 200° C a-Si : H TFT's", Society for Information Display, Symposium Digest of Technical Papers, vol. 38, Issue 1, pp. 1677-1679 (May 2007).

French et al., "Invited Paper: Flexible Displays and Electronics Made in AM-LCD Facilities by the EPLaR™ Process", Society for Information Display, Symposium Digest of Technical Papers, vol. 38, Issue 1, pp. 1680-1683 (May 2007).

* cited by examiner

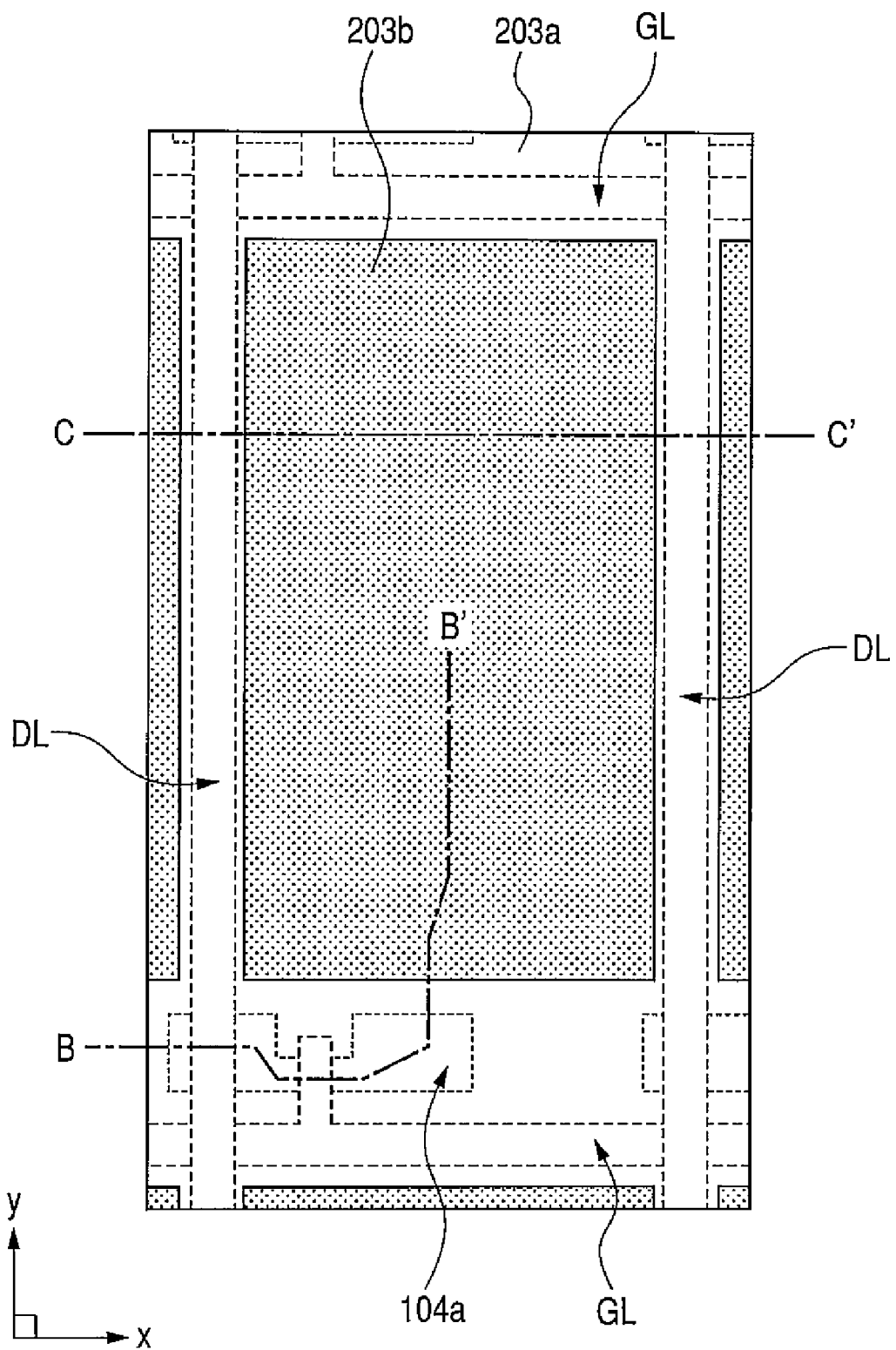

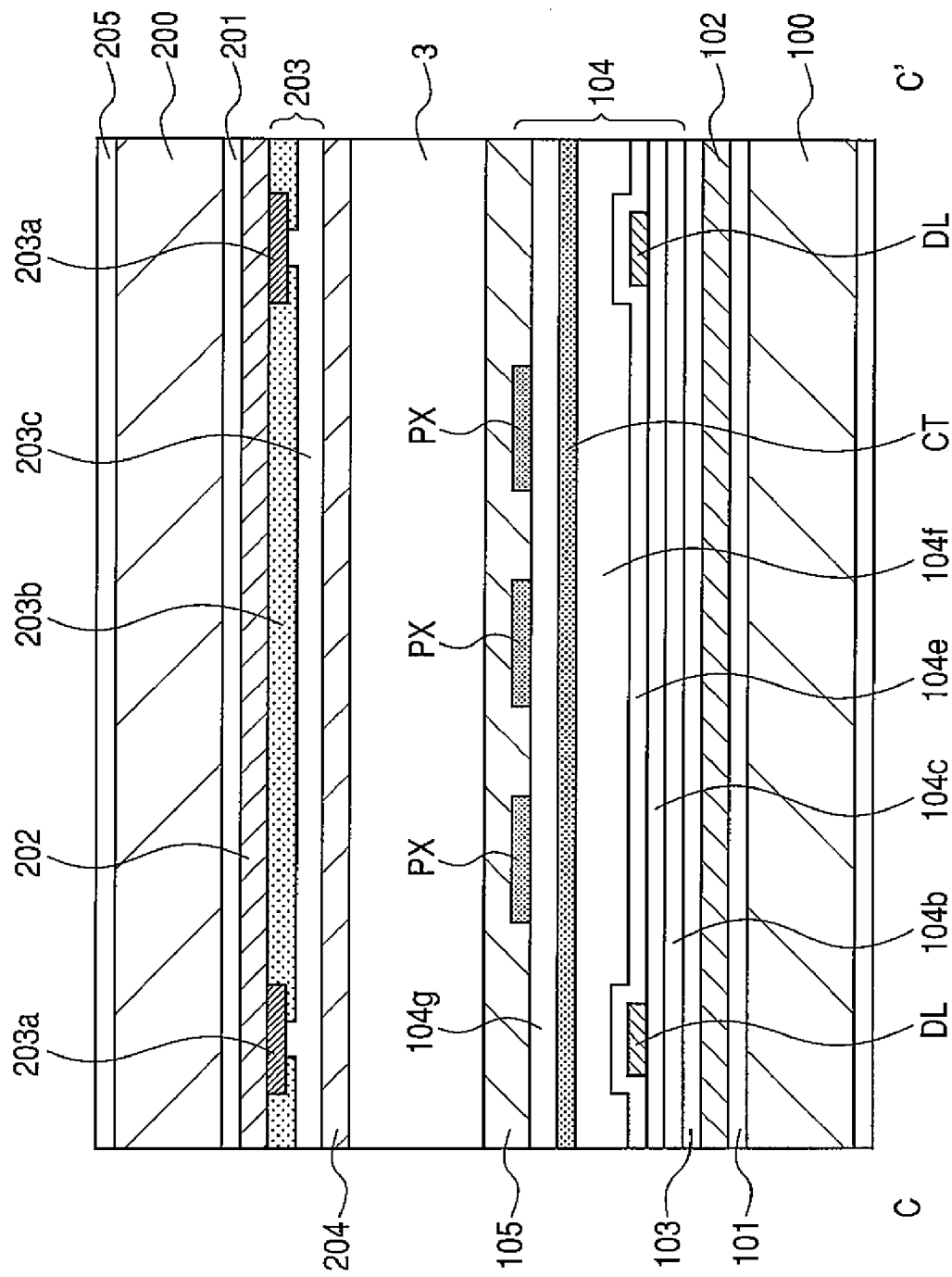

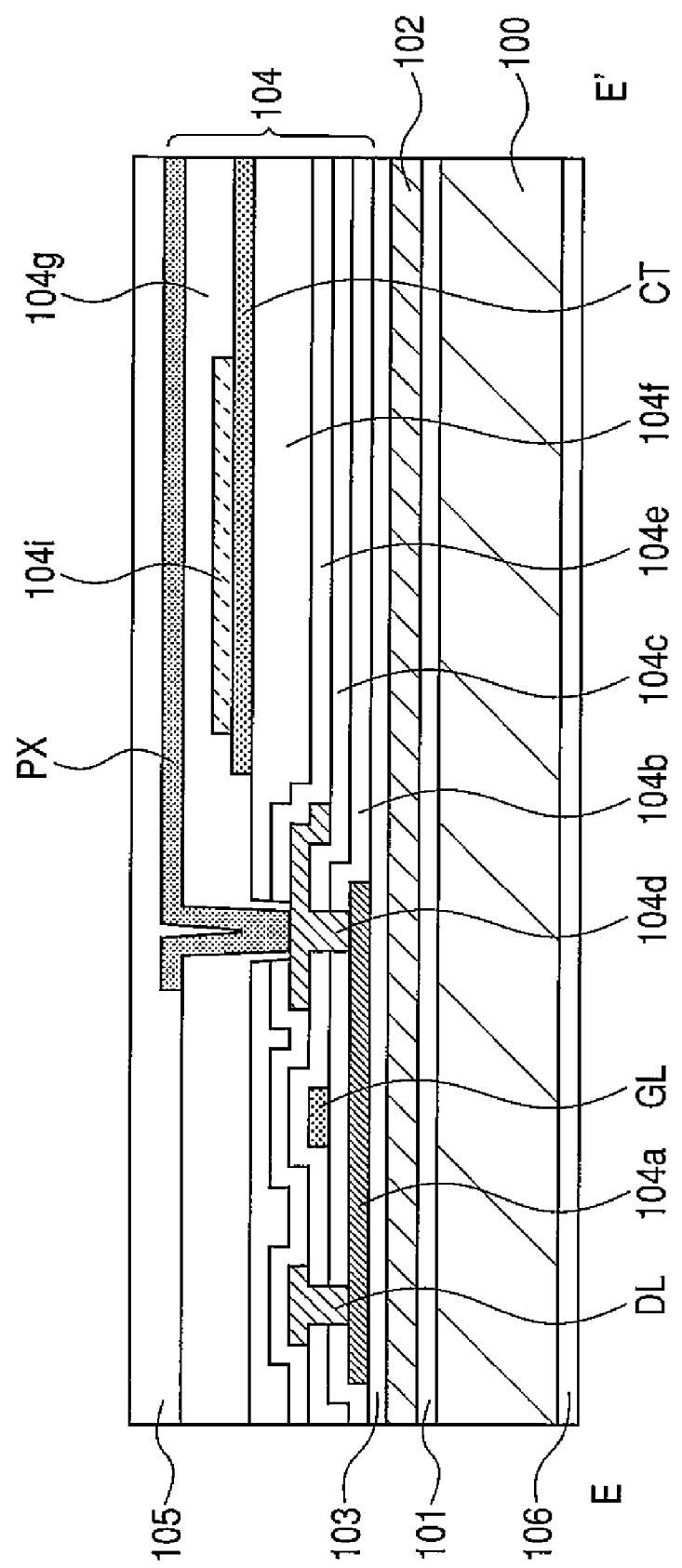

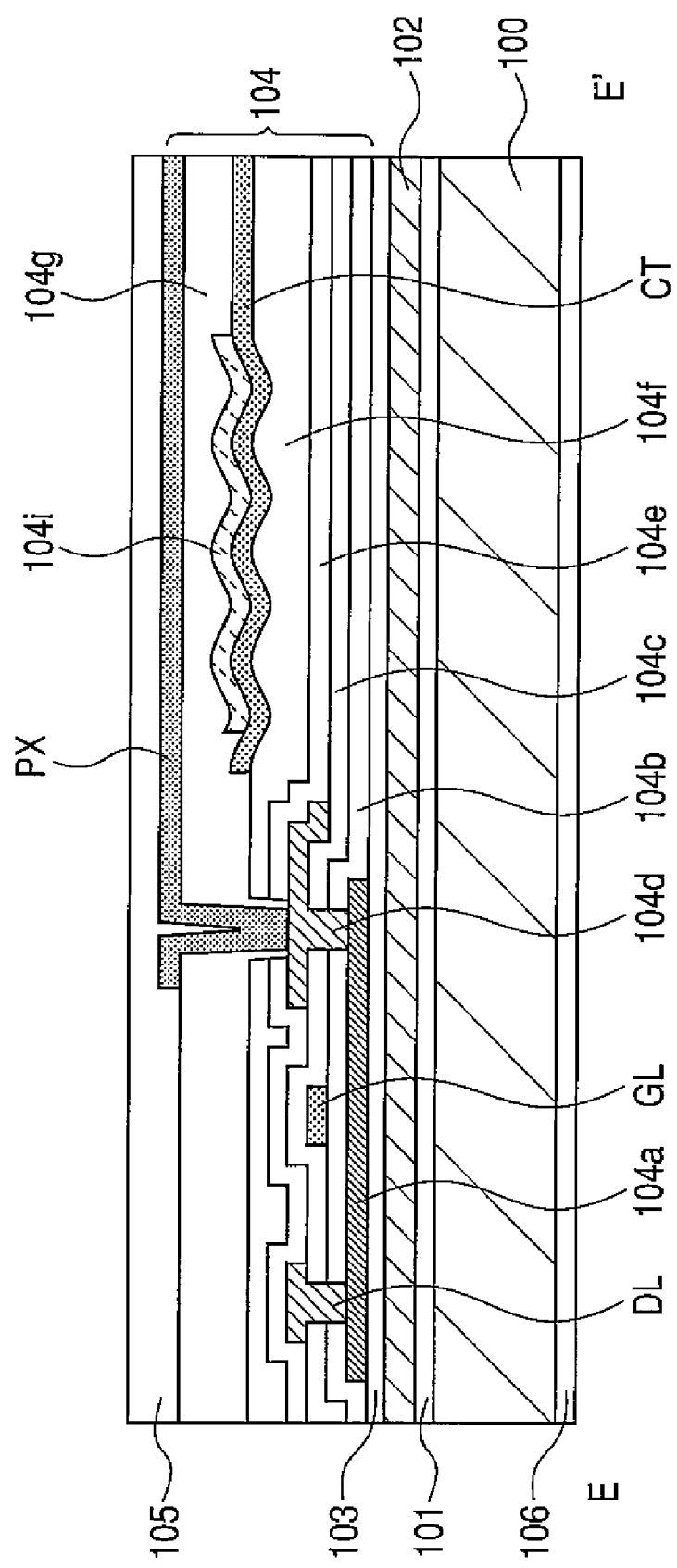

IMAGE DISPLAY DEVICE AND MANUFACTURING METHOD THEREOF

CLAIM OF PRIORITY

The present application claims priority from Japanese patent application JP 2008-194725 filed on Jul. 29, 2008, the content of which is hereby incorporated by reference into this application.

FIELD OF THE INVENTION

The present invention concerns an image display device having a polarizer such as a liquid crystal display device and a manufacturing method thereof.

BACKGROUND OF THE INVENTION

A liquid crystal display device having a liquid crystal display panel in which a liquid crystal is sealed between a pair of substrates is used as a display portion of televisions, displays for personal computers, and portable electronic equipment such as mobile telephone terminals. In this case, one of a pair of substrates (hereinafter referred to as a TFT substrate) is formed with scanning lines, signal lines, thin-film transistors, pixel electrodes and alignment layers on the surface of an insulating substrate such as a glass substrate. Further, the other of the pair of substrates (hereinafter referred to as a counter substrate or a color filter substrate) is formed with a light cut off layer (hereinafter referred to as a black matrix layer), color filters and alignment layers, etc.

The TFT substrate and the counter substrate used for existent liquid crystal display panels are manufactured, for example, by using a glass substrate having thickness of about 0.5 mm to 1.1 mm as the insulating substrate.

By the way, for the liquid crystal display panel, decrease in the thickness of the insulating substrate has been investigated in order to decrease the weight of the liquid crystal display device (liquid crystal display module). However, in a case of using a glass substrate as the insulating substrate, when the thickness is 0.5 mm or less, it involves a problem of tending to be cracked, for example, in the course of manufacture or during use of a completed liquid crystal display device. As one of countermeasures for the problems, a method of forming the insulating substrate for the TFT substrate and the counter substrate, for example, with a plastic substrate (resin substrate) has been proposed.

A liquid crystal display panel prepared by using a plastic substrate for the insulating substrate of the TFT substrate and the counter substrate has an advantage that it is light in the weight and less cracked and, in addition, it may be considered an advantage for example, that the display surface can be formed in a curved surface taking the advantage of the flexibility of the plastic substrate, thereby increasing the degree of freedom in view of design. Further, it is considered that such a liquid crystal display panel can enhance the possibility of obtaining a rollable liquid crystal display device, for example, of making the size smaller, for example, by bending or rolling up the device when it is not used.

However, while the heat resistance of glass substrates is about 600° C., the heat resistance for plastic substrate is about 200° C. In the thin-film transistor for usual liquid crystal panels, amorphous silicon (a-Si) or polysilicon is used as a semiconductor layer and a step of forming the thin-film transistor has a step of applying a treatment at a high temperature of about 300° C. or higher. Therefore, manufacture of the TFT substrate by using a plastic substrate requires a countermeasure, for example, of improving the heat resistance of the plastic substrate or lowering the temperature when the thin-film transistor is formed.

When plastic materials (resin materials) are classified in view of the heat resistance, it has been known that the heat resistance, for example, of a polyimide type resin used for the insulating substrate of a flexible wiring circuit board is relatively high. However, since usual polyimide type resins are colored yellow to brown, it is difficult to use them as they are for the insulating substrate of the liquid crystal display panel. By the way, it has been found in recent years that the transparency of the polyimide type resin is improved by modifying an aromatic moiety in the polyimide structure to an alicyclic structure (for example, refer to JP-A No. 2006-199945). Then, it can be said that this enhances the possibility of attaining the liquid crystal display panel using the plastic substrate.

However, the polyimide type resin has retardation inherent to the structure and highly transparent polyimide type resin disclosed in JP-A No. 2006-199945 also has retardation. Accordingly, the polyimide type resin is not suitable as the material for the insulating substrate of the liquid crystal display panel used by bonding a polarizer such as a polarization plate or a polarization film.

Further, also in view of the coefficient of thermal expansion, while the coefficient of thermal expansion of a glass substrate is several ppm/K, the coefficient of thermal expansion of a plastic substrate is from several tens ppm/K to one hundred and several tens ppm/K. Accordingly, in a case of treatment at a high temperature such as in the step of forming a thin-film transistor, the plastic substrate exhibits more elongation (thermal expansion) compared with the glass substrate. This results in fluctuation of the size or positional deviation for formation and it is expected, for example, that scattering of properties of thin-film transistors increases between each of the pixels to deteriorate the display property of the liquid crystal display device.

Furthermore, different from the glass substrate, the plastic substrate is soft and liable to be deformed. Accordingly, the TFT substrate and the counter substrate using the plastic substrate involves a problem that it is extremely difficult to manufacture them in the existent manufacturing apparatus for the TFT substrate and the counter substrate using the glass substrate. For such a problem, it may be considered a method of changing the manufacturing apparatus for the TFT substrate and the counter substrate, for example, to roll-to-roll system which is used when flexible wiring boards, etc. are manufactured.

On the other hand, as a method of preparing a TFT substrate and a counter substrate using a plastic substrate by utilizing an apparatus for manufacturing the TFT substrate and the counter substrate using the glass substrate, a method, for example, of transferring a thin-film transistor or the like formed on the glass substrate to a plastic substrate has been investigated. The method of transferring the thin-film transistor or the like includes, for example, a method of etching a glass substrate formed with a thin-film transistor or the like thereby decreasing the thickness or a method of previously forming a separation layer to a glass substrate and separating the separation layer after forming the thin-film transistor or the like. In the transfer methods described above, the thickness of the glass substrate formed with the thin-film transistors, etc. is decreased and they are relocated to the plastic substrate. Further, in another transfer method, a plastic substrate is bonded on a glass substrate and, after forming the thin-film transistors, etc. on the plastic substrate, the glass substrate is separated (for example, refer to JP-A No. 2002-033464).

By the way, in existent liquid crystal display devices, a polarizer plate or polarizer is bonded to the surface of the liquid crystal display panel directed to the outer side. On the other contrary, for the liquid crystal display device in recent years, a method of incorporating the polarizer in the TFT substrate and the counter substrate and disposing the polarizer between the insulating substrate of the TFT substrate and the insulating substrate of the counter substrate is proposed, for example, in JP-A No. 11-084413.

Further, for the polarizer in the existent liquid crystal display devices, polarizers formed by dying polyvinyl alcohol with iodine and stretching the same upon preparation into a film thereby arranging iodine molecules in the stretching direction are sandwiched between protective films made of triacetyl cellulose are used. On the contrary, in the liquid crystal display device in recent years, a method of using a polarizer referred to as a wire grid polarizer formed by utilizing fine fabrication technique has been proposed, for example, in JP-A No. 2007-102174.

SUMMARY OF THE INVENTION

A method of manufacturing a TFT substrate by forming a circuit layer having thin-film transistors, etc. on a glass substrate, then decreasing the thickness of the glass substrate and transferring the circuit layer to the plastic substrate has an advantage that the manufacturing apparatus for the TFT substrate using a glass substrate can be utilized with no requirement for the change of conditions (for example, temperature) upon forming the thin-film transistor, etc.

However, in a case of decreasing the thickness of the glass substrate by etching, most of the glass substrate is lost wastefully to bring about a problem of increasing the manufacturing cost for the liquid crystal display panel. Moreover, since a great amount of liquid wastes are formed upon etching the glass substrate, this also results in a problem in view of the environmental load.

Further, the thickness of the circuit layer formed on the glass substrate is about several μm. Accordingly, in the step of transferring (relocating the circuit layer to the plastic substrate, even when some or other protecting film is bonded when the thickness of the glass substrate is decreased, a glass substrate that has supported the circuit layer of several μm thickness is once removed. Accordingly, the method of manufacturing the TFT substrate by transferring the circuit layer formed on the glass substrate to the plastic substrate involves a problem, for example, that cracks tend to be generated to the circuit layer by internal stress or external force during the step thereby failing to obtain a high yield.

Further, the method of forming a circuit layer having thin-film transistors, etc. on the plastic substrate disposed to the surface of a glass substrate and then separating the glass substrate from the plastic substrate involves a problem, for example, in view of the heat resistance of the plastic substrate and, it is necessary to lower the temperature when the thin-film transistors, etc. are formed. Accordingly, this results in a problem that preparation of a device of excellent properties is difficult.

Furthermore, the resin having a relatively high heat resistance such as the polyimide type resin has retardation derived from the structure thereof as described above. Then, when the thickness of the insulating substrate of the TFT substrate and the counter substrate is formed to such a thickness (for example, about 50 μm) as capable of ensuring a strength to some extent as the insulating substrate of the TFT substrate and the counter substrate, the problem of retardation becomes conspicures and most of the resins show retardation of 10 nm or more. The resin that increases the retardation when formed to a thickness of several tens μm as described above is not suitable to the material for the insulating substrate of the TFT substrate or the counter substrate in the liquid crystal display panel using the polarizer.

As described above, in a case of using the plastic substrate (resin substrate) for the insulating substrate of the TFT substrate and the counter substrate, existent material and manufacturing method for the plastic substrate involves a problem due to the properties of the material and a problem due to the manufacturing method. Accordingly, the display device having the polarizer such as a liquid crystal display device involves a problem that further decreasing of the thickness and the weight is difficult.

The present invention intends to provide a technique capable of decreasing the thickness and the weight of an image display device having a polarizer such as a liquid crystal display device.

Further, the invention intends to provide a technique capable of improving the yield in the manufacture of an image display device having a display panel in which a circuit layer having thin-film transistors, etc. are formed to a plastic substrate.

Furthermore, the invention intends to provide a technique capable of suppressing increase in the cost of manufacturing a display panel in which a circuit layer having thin-film transistors, etc. are formed to the plastic substrate.

The foregoing and other objects and novel features of the invention will become apparent by reading the descriptions in the specification in conjunction with the appended drawings.

Outline of typical inventions among those disclosed in the present application are to be described as below.

(1) An image display device having a display panel, a first substrate and a second substrate being opposed to each other, in which the first substrate has an insulating substrate composed of a resin, a circuit layer having a circuit in which a plurality of thin-film transistors are arranged in a matrix, and a polarizer disposed between the insulating substrate and the circuit layer, and in which the insulating substrate has a thickness of 20 μm or more and 150 μm or less, a transmittance of 80% or more to a visible light at a wavelength of 400 nm or more and 800 nm or less, and a 3 wt % weight loss temperature of 300° C. or higher, and has no melting point or has a melting point of 300° C. or higher.

(2) In the image display device as described in (1) above, the insulating substrate is composed of one of a polybenzoxazole containing a cycloaliphatic structure, a polyamideimide containing an alicyclic structure, a polyimide containing an alicyclic structure, and a polyamide containing an alicyclic structure.

(3) In the image display device described in (1) above, the polarizer is a polarizer having plural fine metal wires extending in one direction each arranged at an equal distance in a direction perpendicular to the above-mentioned one direction.

(4) In the image display device as described in (1) above, the second substrate has an insulating substrate composed of a resin and a polarizer disposed on the surface of the insulating substrate, and the polarizer of the first substrate and the polarizer of the second substrate are disposed between the insulating substrate of the first substrate and the insulating substrate of the second substrate.

(5) In the image display device as described in (4) above, the insulating substrate of the second substrate is composed of the resin of one of the polybenzoxazole containing the alicyclic structure, the polyamideimide containing the alicyclic structure, the polyimide containing the alicyclic structure, and the polyamide containing the alicyclic structure.

(6) In the image display device as described in (4) above, the polarizer of the second substrate is a polarizer having plural fine metal wires extending in one direction each arranged at an equal distance in a direction perpendicular to the above-mentioned one direction.

(7) In the image display device as described in (6) above, the polarizer of the first substrate is a polarizer having plural fine metal wires extending in one direction each arranged at an equal distance in a direction perpendicular to the above-mentioned one direction, and the extending direction of the fine metal wires in the polarizer of the second substrate is perpendicular to the extending direction of the fine metal wires in the polarizer of the first substrate.

(8) In the image display device as described in (1) above, a liquid crystal is interposed between the first substrate and the second substrate of the display panel.

(9) A method of manufacturing an image display device includes: forming an insulating substrate composed of a resin on the surface of a supporting substrate; forming a polarizer above the insulating substrate; forming a circuit layer having plural thin-film transistors above the polarizer; and separating the supporting substrate from the insulating substrate formed with the polarizer and the circuit layer, in which the step of forming the insulating substrate forms an insulating substrate having a thickness of 20 μm or more and 150 μm or less, a transmittance of 80% or more to a visible light at a wavelength of 400 nm or more and 800 nm or less, and a 3 wt % weight loss temperature of 300° C. or higher, and has no melting point or has a melting point of 280° C. or higher.

(10) A method of manufacturing an image display device includes a first step of forming a first substrate; a second step of forming a second substrate; and a third step of keeping the first substrate formed in the first step and the second substrate formed in the second step at a predetermined distance, and sealing a liquid crystal between the first substrate and the second substrate, in which the first step includes: forming an insulating substrate composed of a resin on the surface of a supporting substrate; forming a polarizer above the insulating substrate; forming a circuit layer having plural thin-film transistors above the polarizer; and forming an alignment layer above the circuit layer; in which the third step includes keeping the first substrate having the supporting substrate and the second substrate formed in the second step at a predetermined distance, sealing a liquid crystal between the first substrate and the second substrate, and in which the method further includes separating the supporting substrate from the insulating substrate after the third step, and in which the step of forming the insulating substrate forms an insulating substrate having a thickness of 20 μm or more and 150 μm or less, a transmittance of 80% or more to a visible light at a wavelength of 400 nm or more and 800 nm or less, and a 3 wt % weight loss temperature of 300° C. or higher, and having no melting point or having a melting point of 280° C. or higher.

(11) A method of manufacturing an image display device includes a first step of forming a first substrate; a second step of forming a second substrate; and a third step of keeping the first substrate formed in the first step and the second substrate formed in the second step at a predetermined distance, and sealing a liquid crystal between the first substrate and the second substrate, in which the first step includes: forming an insulating substrate composed of a resin on the surface of a supporting substrate; forming a polarizer above the insulating substrate; forming a circuit layer having plural thin-film transistors above the polarizer; forming an alignment layer above the circuit layer; and separating the supporting substrate from the insulating substrate between the step of forming the circuit layer and the step of forming the alignment layer, or after the step of forming the alignment layer, in which the third step keeps the first substrate and the second substrate formed in the second step at a predetermined distance and sealing a liquid crystal between the first substrate and the second substrate, and in which the step of forming the insulating substrate forms an insulating substrate having a thickness of 20 μm or more and 150 μm or less, a transmittance of 80% or more to a visible light at a wavelength of 400 nm or more and 800 nm or less, and a 3 wt % weight loss temperature of 300° C. or higher, and having no melting point or having a melting point of 280° C. or higher.

(12) In the method of manufacturing an image display device as described in (9) above, the step of forming the insulating substrate forms an insulating substrate composed of a resin of one of the polybenzoxazole containing the alicyclic structure, the polyamideimide containing the alicyclic structure, the polyimide containing the alicyclic structure, and the polyamide containing the alicyclic structure.

(13) In the method of manufacturing an image display device as described in (9) above, the step of forming the insulating substrate forms an insulating substrate composed of a resin having a glass transition temperature of 250° C. or higher.

(14) In the method of manufacturing an image display device as described in (9) above, the step of forming the insulating substrate has a step of applying a heat treatment at a temperature of 250° C. or higher and at a temperature higher than the heating temperature upon forming the thin-film transistor in the step of forming the circuit layer.

(15) In the method of manufacturing an image display device as described in (14) above, the step of applying the heat treatment is performed in a nitrogen atmosphere or in vacuum.

(16) In the method of manufacturing an image display device as described in (9) above, a glass substrate or a quartz substrate is used as the supporting substrate.

(17) In the A method of manufacturing an image display device as described in (9) above, the step of separating the supporting substrate from the insulating substrate includes a step of irradiating a UV-light at a wavelength of 200 nm or more and 400 nm or less.

(18) In the method of manufacturing an image display device as described in (10) above, the second step includes: forming an insulating substrate composed of a resin on the surface of the supporting substrate; forming a polarizer above the insulating substrate; forming plural kinds of color filters of different colors above the polarizer; forming an alignment layer above the color filter; and the third step includes: keeping the first substrate and the second substrate having the supporting substrate at a predetermined distance and sealing a liquid crystal between the first substrate and the second substrate; and separating the supporting substrate from the insulating substrate of the second substrate after the third step.

(19) In the method of manufacturing an image display device as described in (10) above, the second step includes: forming an insulating substrate composed of a resin above the supporting substrate; forming a polarizer above the insulating substrate; forming a plurality kinds of color filters of different color above the polarizer; forming an alignment layer above the color filter, and separating the supporting substrate from the insulating substrate between the step of forming the color filter and the step of forming the alignment layer or after the step of forming the alignment layer.

(20) In the method of manufacturing an image display device as described in (18) above, the step of forming the insulating substrate in the second step forms an insulating substrate composed of a resin of one of the polybenzoxazole containing the alicyclic structure, the polyamideimide containing the alicyclic structure, the polyimide containing the alicyclic structure, and the polyamide containing the alicyclic structure.

According to the image display device of the invention, an image display device having a polarizer, for example, a liquid crystal display device can be decreased in the thickness and the weight.

Further, according to the method of manufacturing the image display device of the invention, the yield in the manufacture of the image display device having a display panel in which a circuit layer having thin-film transistors, etc. on a plastic substrate can be improved.

Further, according to the method of manufacturing an image display device of the invention, increase in the cost of manufacturing an image display panel formed with a circuit layer having thin-film transistor, etc. on a plastic substrate can be suppressed.

BRIEF DESCRIPTION OF THE DRAWINGS

FIG. 3B is a schematic plan view showing an example of a planar constitution of a pixel in a counter substrate;

FIG. 3D is a schematic cross sectional view showing an example of a cross sectional constitution along line C-C' in FIG. 3B;

FIG. 7B is a schematic plan view showing an example of a cross sectional constitution along line E-E' in FIG. 7A;

FIG. 7C is a schematic plan view showing another example of a cross sectional constitution along line E-E' in FIG. 7A;

DETAILED DESCRIPTION OF THE PREFERRED EMBODIMENTS

Figure 1:
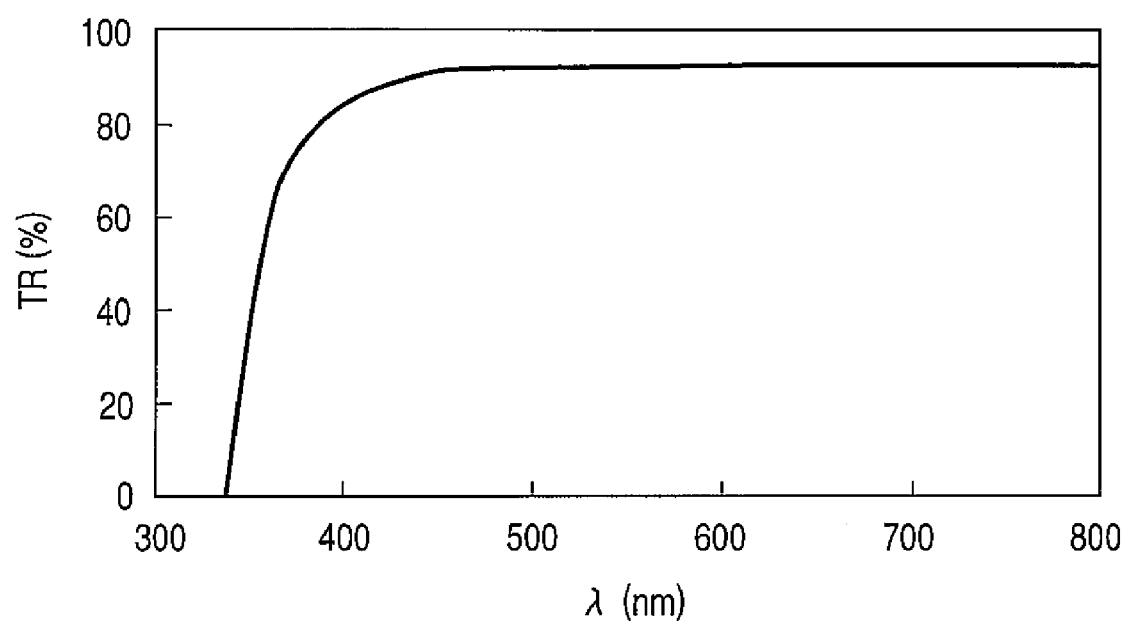
FIG. 1 is a schematic graph showing an example of transmission spectrum of a polybenzoxazole layer containing an alicyclic structure.

The present invention is to be described specifically in conjunction with preferred embodiments with reference to the drawings and prior to the description thereof, materials for an insulating substrate as one of main features of the invention is to be described.

The invention is applicable to an image display device having a substrate formed with a circuit layer having thin-film transistors, etc. on the surface of an insulating substrate and having a polarizer, for example, a liquid crystal display device.

The liquid crystal display device has a liquid crystal display panel in which a liquid crystal is sealed between a first substrate and a second substrate. In the first substrate, a circuit layer having, for example, plural scanning lines, plural signal lines, plural TFT substrates, and plurality of pixel electrodes, and an alignment layer are formed on the surface of an insulating substrate and the first substrate is generally referred to as a TFT substrate. In the second substrate, a lattice-like black matrix layer, color filters, an alignment layer, etc. are formed on the surface of the second insulating substrate and the second substrate is generally referred to as a counter substrate.

When the invention is applied to the liquid crystal display device, a plastic substrate (resin substrate) is used for the first insulating substrate, or the first insulating substrate and the second insulating substrate.

The thickness of the first insulating substrate, or the first insulating substrate and the second insulating substrate is preferably 20 μm or more and 150 μm or less, for example, with a view point of ensuring the strength of the liquid crystal display panel. In this case, the thickness of the first insulating substrate, or the first insulating substrate and the second insulating substrate is more preferably 30 μm or more and 100 μm or less.

Further, the liquid crystal display device is an image display device that displays video images or images by utilizing a backlight or an external light. Accordingly, it is preferred that the first insulating substrate, or the first insulating substrate and the second insulating substrate have a transmittance of 80% or more to a visible light at a wavelength of 400 μm or more and 800 μm or less. More preferably, the first insulating substrate or the first insulating substrate and the second insulating substrate have a transmittance of 90% or higher to the visible light.

Further, when the invention is applied to the liquid crystal display device, a circuit layer is formed directly to the first insulating substrate in the step of forming the TFT substrate as to be described later. For this purpose, it is preferred that the first insulating substrate, or the first insulating substrate and the second insulating substrate comprise a resin of high heat resistance and, for example, a 3 wt % weight loss temperature thereof is preferably 300° C. or higher. The 3 wt % weight loss temperature means a temperature at which the weight is decreased by 3% from the weight at an initial temperature when change of the weight of a specimen is measured continuously while heating at a predetermined rate. In this case, it is more preferred that the first insulating substrate, or the first insulating substrate and the second insulating substrate have 1 wt % weight loss temperature of 300° C. or higher.

Further, it is preferred that the first insulating substrate or the first insulating substrate and the second insulating substrate have not a melting point or has a melting point of 280° C. or higher. In a case where the substrate has a melting point, it is more preferred that the melting point is 300° C. or higher.

Further, it is preferred that the glass transition temperature of the first insulating substrate, or the first insulating substrate and the second insulating substrate has a glass transition temperature of 250° C. or higher. In this case, it is more preferred that the first insulating substrate or the first insulating substrate and the second insulating substrate have the glass transition temperature of 300° C. or higher.

As a resin having the features (physical properties) as described above and usable as the first insulating substrate or the first insulating substrate and the second insulating substrate, there may be considered, for example, a polybenzoxazole containing an alicyclic structure, a polyamideimide containing an alicyclic structure, a polyimide containing an alicyclic structure, and a polyamide containing alicyclic structure. When the present invention is applied to the liquid crystal display device, it is preferred that the first insulating substrate or the first insulating substrate and the second insulating substrate comprise the resin of one of the polybenzoxazole containing the alicyclic structure, the polyamideimide containing the alicyclic structure, the polyimide containing the alicyclic structure or the polyamide containing the alicyclic structure. In this case, it is more preferred that the first insulating substrate or the first insulating substrate and the second insulating substrate is composed of, for example, having a structure as shown below.

In a case of using the polybenzoxazole having the alicyclic structure as the first insulating substrate or the first insulating substrate and the second insulating substrate, it is preferred to use, for example, a polybenzoxazole represented by the following structural formula 1.

(structural formula 1)

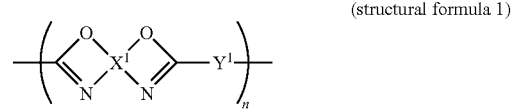

In the structural formula 1, $X^1$ represents a tetra-valent aromatic group, and $Y^1$ represents a bivalent alicyclic group or aromatic group. In the structural formula 1, the degree of polymerization n is about from 5 to 10000.

In this case, it is preferred that $X^1$ in the structural formula 1 is, for example, one of aromatic groups represented by the following structural formula (2) to the structural formula (6).

(structural formula 2)

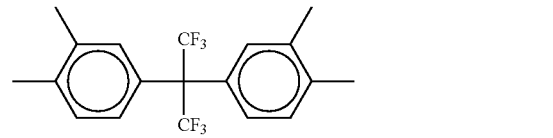

(structural formula 3)

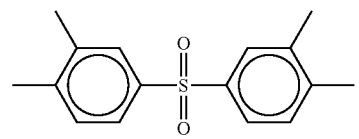

(structural formula 4)

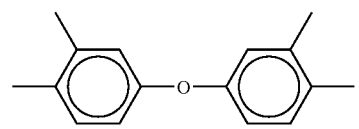

(structural formula 5)

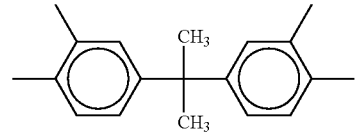

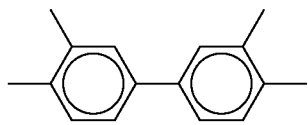
(structural formula 6)

In this case, it is preferred that $Y^1$ in the structural formula 1 is, for example, one of alicyclic groups represented by the following structural formula (7) to the structural formula (10).

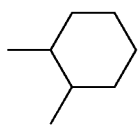
(structural formula 7)

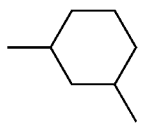
(structural formula 8)

(structural formula 9)

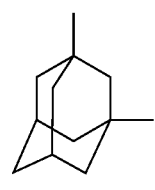
(structural formula 10)

In this case, the portion for $Y^1$ represented by the structural formula 1 may contain, for example, one of the aromatic groups represented by the following structural formula 11 to the structural formula 16 for improving the heat resistance.

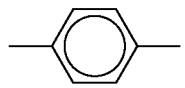
(structural formula 11)

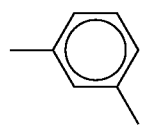
(structural formula 12)

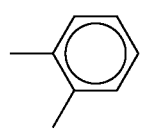
(structural formula 13)

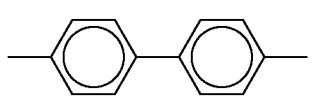
(structural formula 14)

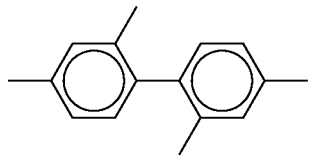
(structural formula 15)

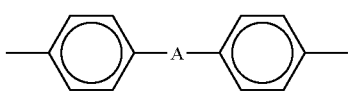
(structural formula 16)

In the structural formula 16, A represents one of —$CH_2$—, —$C(CH_3)_2$—, —O—, —S—, —$SO_2$—, —CO—, —NHCO—, and —$C(CF_3)_2$—.

The polybenzoxazole represented by the structural formula 1 is obtained, for example, by dehydrocyclization under heating of a precursor represented by the following structural formula 17.

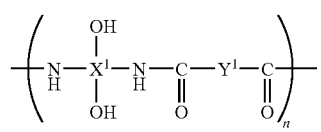
(structural formula 17)

$X^1$ and $Y^1$ in the structural formula 17 are groups having the same structures as $X^1$ and $Y^1$ in the structural formula 1. That is, $X^1$ in the structural formula 17 is preferably one of the aromatic groups of the structural formula 2 to the structural formula 6. Further, $Y^1$ in the structural formula 17 is preferably one of the alicyclic groups of the structural formula 7 to the structural formula 10. Further, $Y^1$ in the structural formula 17 may contain one of the aromatic groups of the structural formula 11 to the structural formula 16. In a case where the aromatic groups of the structural formula 16 is contained in the portion for $Y^1$ in the structural formula 17, A in the structural formula 16 is one of —$CH_2$—, —$C(CH_3)_2$—, —O—, —S—, —$SO_2$—, —CO—, —NHCO—, and —$C(CF_3)_2$—. Further, the degree of polymerization n in the structural formula 17 is about from 5 to 10,000.

Further, in the molecule represented by the structural formula 1 and the structural formula 17 (polymer), the combination of $X^1$ and $Y^1$ may be identical for all of the monomers, or the molecule may be a copolymer of two or more kinds of monomers in which the combination of $X^1$ and $Y^1$ is different.

Further, in a case of forming the polybenzoxazole by dehydrocyclization of a precursor represented by the structural formula 17, a crosslinker may be added, for example, to the precursor for improving the heat resistance, the mechanical property, and the chemical resistance.

The polybenzoxazole represented by the structural formula 1 has a feature that the water uptake is lower compared with other resins. Accordingly, in a case of using the polybenzoxazole represented by the structural formula 1 as the first insulating substrate, or the first insulating substrate and the second insulating substrate, deterioration of the liquid crystal display panel (particularly, reliability of the circuit formed in the circuit layer), by hygroscopy, etc. can be prevented.

In a case of using the polyamideimide containing the alicyclic structure as the first insulating substrate or the first insulating substrate and the second insulating substrate, it is preferred to use, for example, a polyamideimide represented by the following structural formula 18.

(structural formula 18)

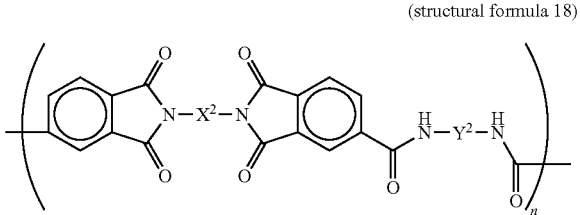

In the structural formula 18, $X^2$ represents a bivalent alicyclic group, and $Y^2$ represents a bivalent aromatic group or alicyclic group. In the structural formula 18, the degree of polymerization n is about from 5 to 10000.

Further, $X^2$ in the structural formula 18 is, for example, one of alicyclic groups represented by the following structural formula 19 to the structural formula 21.

(structural formula 19)

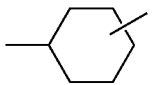

(structural formula 20)

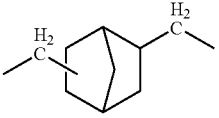

(structural formula 21)

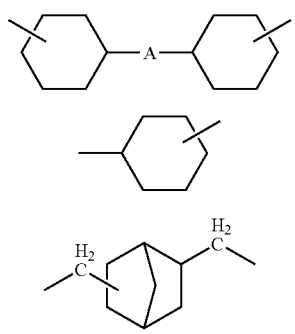

In the structural formula 19, A represents one of —$CH_2$—, —$C(CH_3)_2$—, —O—, —S—, —$SO_2$—, —CO—, —NHCO—, and —$C(CF_3)_2$—.

Further, $Y^2$ in the structural formula 18 is one of alicyclic groups represented by the following structural formula 22.

(structural formula 22)

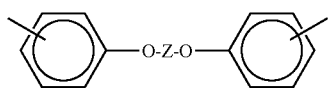

In the structural formula 22, Z represents, for example, one of aromatic groups represented by the following structural formula 23 to the structural formula 25.

(structural formula 23)

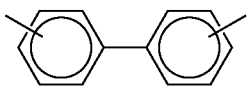

(structural formula 24)

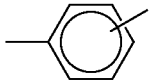

(structural formula 25)

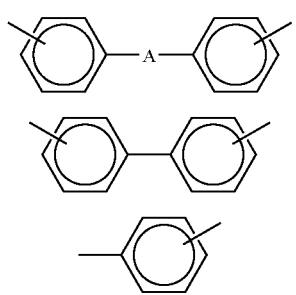

In the structural formula 23, A represents one of —$CH_2$—, —$C(CH_3)_2$—, —O—, —S—, —$SO_2$—, —CO—, —NHCO—, and —$C(CF_3)_2$—.

Further, $Y^2$ in the structural formula 18 may be, for example, one of alicyclic groups represented by the structural formula 19 to the structural formula 21, or a group having the structure represented by the following structural formula 26.

(structural formula 26)

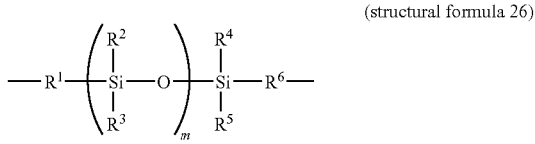

In the structural formula 26, $R^1$ and $R^6$ represent each an independent bivalent organic group and $R^2$ to $R^5$ represent each an independent alkyl groups of 1 to 20 carbon atoms or aryl group of 6 to 18 carbon atoms. Further, in the structural formula 26, the degree of polymerization is about 1 to 50.

Further, in a case where $Y^2$ in the structural formula 18 represents the alicyclic group of the structural formula 19, A in the structural formula 19 is one of —$CH_2$—, —$C(CH_3)_2$—, —O—, —S—, —$SO_2$—, —CO—, —NHCO—, —$C(CF_3)_2$—.

Further, in the molecule represented by the structural formula 18 (polymer), the combination of $X^2$ and $Y^2$ may be identical for all of the monomers, or the molecule may be a copolymer of two or more kinds of monomers in which the combination of $X^2$ and $Y^2$ is different.

Further, in a case of forming the polyamideimide represented by the structural formula 18, a crosslinker may be added, for example, to the precursor for improving the heat resistance, the mechanical property, and the chemical resistance.

Further, in a case of using the polyamideimide containing the alicyclic structure as the first insulating substrate or the first insulating substrate and the second insulating substrate, the polyamideimide, for example, represented by the following structural formula 27 can also be used.

(structural formula 27)

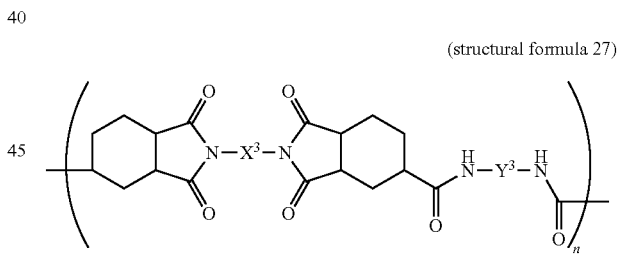

In the structural formula 27, $X^3$ represents a bivalent alicyclic group, and $Y^3$ represents a bivalent aromatic group or alicyclic group. In the structural formula 27, the degree of polymerization n is about from 5 to 10000.

Further, $X^3$ and $Y^3$ in the structural formula 27 represent each, for example, the aromatic group represented by the structural formula 22. In this case, Z in the structural formula 22 is, for example, one of the aromatic groups of the structural formula 23 to the structural formula 25. Further, in a case where Z in the structural formula 22 is the aromatic group of the structural formula 23, A in the structural formula 23 represents one of —$CH_2$—, —$C(CH_3)_2$—, —O—, —S—, —$SO_2$—, —CO—, —NHCO—, and —$C(CF_3)_2$—.

Further, $X^3$ and $Y^3$ in the structural formula 27 may represent each, for example, an alicyclic group represented by the structural formula 19 to the structural formula 21, or a group having the structure represented by the structural formula 26.

In a case where $X^3$ and $Y^3$ in the structural formula 27 represents the alicyclic groups of the structural formula 19, A in the structural formula 19 is one of —$CH_2$—, —$C(CH_3)_2$—, —O—, —S—, —$SO_2$—, —CO—, —NHCO—, and —$C(CF_3)_2$—. Further, in a case where $X^3$ and $Y^3$ in the structural formula 27 represent the structure (group) of the structural formula 26, $R^1$ and $R^6$ in the structural formula 26 represent each an independent bivalent organic group, $R^2$ to $R^5$ represent each an independent alkyl group of 1 to 20 carbon atoms or aryl group of 6 to 18 carbon atoms, and the degree of polymerization m is about 1 to 50.

Further, in the molecule represented by the structural formula 27 (polymer), the combination of $X^3$ and $Y^3$ may be identical for all of the monomers, or the molecule may be a copolymer of two or more kinds of monomers in which the combination of $X^3$ and $Y^3$ is different.

Further, in a case of forming the polyamideimide represented by the structural formula 27, a crosslinker may be added, for example, to the precursor for improving the heat resistance, the mechanical property, and the chemical resistance.

The polyamideimide type resin represented by the structural formula 18 or the structural formula 27 has somewhat higher hygroscopicity but it is advantageous in that the material is inexpensive. Accordingly, in a case of using the polyamideimide type resin represented by the structural formula 18 or the structural formula 27 as the first insulating substrate, or the first insulating substrate and the second insulating substrate, increase in the manufacturing cost of the liquid crystal display panel can be suppressed.

Further, in a case of using a polyimide containing an alicyclic structure as the first insulating substrate, or the first insulating substrate and the second insulating substrate, the polyimide, for example, represented by the following structural formula 28 is used preferably.

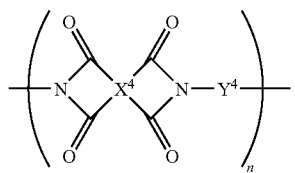

(structural formula 28)

In the structural formula 28, $X^4$ represents a tetravalent alicyclic group and $Y^4$ represents a bivalent aromatic group or alicyclic group. In the structural formula 28, the degree of polymerization n is about from 5 to 10000.

Further, $X^4$ in the structural formula 28 is one of the alicyclic groups represented by the following structural formula 29 to the structural formula 31.

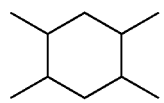

(structural formula 29)

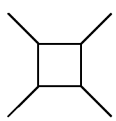

(structural formula 30)

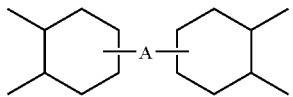

(structural formula 31)

In the structural formula 31, A represents one of —$CH_2$—, —$C(CH_3)_2$—, —O—, —S—, —$SO_2$—, —CO—, —NHCO—, and —$C(CF_3)_2$—.

Further, $Y^4$ in the structural formula 28 is, for example, the aromatic group represented by the structural formula 22. In this case, Z in the structural formula 22 is one of the aromatic groups of the structural formula 23 to the structural formula 25. In a case where Z in the structural formula 22 is the aromatic group of the structural formula 23, A in the structural formula 23 is one of —$CH_2$—, —$C(CH_3)_2$—, —O—, —S—, —$SO_2$—, —CO—, —NHCO—, and —$C(CF_3)_2$—.

Further, $Y^4$ in the structural formula 28 may be, for example, an aromatic group represented by the structural formula 23 to the structural formula 25, or a group having the structure represented by the structural formula 26. In a case where $Y^4$ in the structural formula 28 is an aromatic group of the structural formula 23, A in the structural formula 23 is one of —$CH_2$—, —$C(CH_3)_2$—, —O—, —S—, —$SO_2$—, —CO—, —NHCO—, and —$C(CF_3)_2$—. Further, in a case where $Y^4$ in the structural formula 28 is a structure (group) of the structural formula 26, $R_1$ and $R_6$ in the structural formula 26 represent each an independent bivalent organic group, and $R_2$ to $R_5$ represent each an independent alkyl group of 1 to 20 carbon atoms or an aryl group of 6 to 18 carbon atoms, and the degree of polymerization m is about 1 to 50.

Further, $X^4$ and $Y^4$ in the structural formula 28 each may be, for example, an alicyclic group represented by the structural formula 19 to the structural formula 21. In a case where $X^4$ and $Y^4$ in the structural formula 28 are alicyclic groups of the structural formula 19, A in the structural formula 19 is one of —$CH_2$—, —$C(CH_3)_2$—, —O—, —S—, —$SO_2$—, —CO—, —NHCO—, and —$C(CF_3)_2$—.

Further, in the molecule represented by the structural formula 28 (polymer), the combination of $X^4$ and $Y^4$ may be identical for all of the monomers, or the molecule may be a copolymer of two or more kinds of monomers in which the combination of $X^4$ and $Y^4$ is different.

In a case of forming such polyimides, it is preferred to form a film in the state of a polyamic acid as a precursor and then curing the same by heating to form a poyimide. In this case, a crosslinker may also be added to the polyamic acid for improving, for example, the heat resistance, the mechanical property and the chemical resistance.

Further, in a case where the polyimide in a cyclized state is soluble to a solvent and can be coated on a supporting substrate such as a glass substrate, a coating film may be formed also by coating the polyimide dissolved in a solvent on the supporting substrate and then evaporating the solvent by heating. In this case, a crosslinker may also be added to the solvent for dissolving the polyimide for improving, for example, the heat resistance, the mechanical property and the chemical resistance.

The polyamide type resin represented by the structural formula 28 has a medium hygroscopicity and it is at a medium level also in view of the cost of the material. Accordingly, in a case of using the polyimide type resin represented by the structural formula 28 as the first insulating substrate, or the first insulating substrate and the second insulating substrate, increase in the manufacturing cost of the liquid crystal display panel can be suppressed while suppressing the deterioration of the reliability of the liquid crystal display panel by moisture absorption.

In a case of using the polyamide containing the alicyclic structure as first insulating substrate, or the first insulating substrate and the second insulating substrate, a polyamide, for example, represented by the structural formula 32 is used preferably.

(structural formula 32)

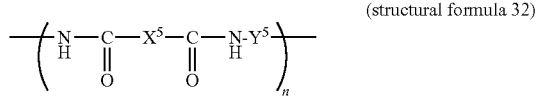

In the structural formula 32, $X^5$ represents a bivalent alicyclic group, and $Y^5$ represents a bivalent aromatic group or alicyclic group. In the structural formula 32, the degree of polymerization n is about from 5 to 10000.

Further, $X^5$ in the structural formula 32 is one of alicyclic groups represented by the structural formula 19 to the structural formula 21. In a case where $X^5$ in the structural formula 32 is an alicyclic group of the structural formula 19, A in the structural formula 19 is one of —$CH_2$—, —$C(CH_3)_2$—, —O—, —S—, —$SO_2$—, —CO—, —NHCO—, and —$C(CF_3)_2$—.

Further, $Y^5$ in the structural formula 32 is, for example, an aromatic group represented by the structural formula 22. In this case, Z in the structural formula 22 is one of aromatic groups of the structural formula 23 to the structural formula 25. In a case where Z in the structural formula 22 is an aromatic group of the structural formula 23, A in the structural formula 23 is one of —$CH_2$—, —$C(CH_3)_2$—, —O—, —S—, —$SO_2$—, —CO—, —NHCO—, and —$C(CF_3)_2$—.

Further, $Y^5$ in the structural formula 32 may be, for example, one of aromatic groups represented by the structural formula 23 to the structural formula 25, or a group having the structure represented by the structural formula 26. In a case where $Y^5$ in the structural formula 32 is an aromatic group of the structural formula 23, A in the structural formula 23 is one of —$CH_2$—, —$C(CH_3)_2$—, —O—, —S—, —$SO_2$—, —CO—, —NHCO—, and —$C(CF_3)_2$—. Further, in a case where $Y^5$ in the structural formula 32 is a structure (group) of the structural formula 26, $R_1$ and $R_6$ in the structural formula 26 represent each an independent bivalent organic group, and $R_2$ to $R_5$ represent each an independent alkyl group of 1 to 20 carbon atoms or aryl group of 6 to 18 carbon atoms and the degree of polymerization m is about 1 to 50.

Further, $Y^5$ in the structural formula 32 may be, for example, one of alicyclic groups represented by the structural formula 19 to the structural formula 21. In a case where $Y^5$ in the structural formula 32 is an alicyclic group of the structural formula 19, A in the structural formula 19 is one of —$CH_2$—, —$C(CH_3)_2$—, —O—, —S—, —$SO_2$—, —CO—, —NHCO—, and —$C(CF_3)_2$—.

Further, in the molecule represented by the structural formula 32 (polymer), the combination of $X^5$ and $Y^5$ may be identical for all of the monomers, or the molecule may be a copolymer of two or more kinds of monomers in which the combination of $X^5$ and $Y^5$ is different.

The polyamide type resin represented by the structural formula 32 has a somewhat high hygroscopicity but has an advantage that the coefficient of thermal expansion is small. Accordingly, in a case of using the polyamide type resin represented by the structural formula 32 as the material for the first insulating substrate, or the first insulating substrate and the second insulating substrate, there may be a possibility, for example, that the internal stress of the liquid crystal display panel can be lowered.

Then, description is to be made to the physical properties when the first insulating substrate is formed of one of the polybenzoxazole containing the alicyclic structure, the polyamideimide containing the alicyclic structure, the polyimide containing the alicyclic structure, or the polyamide containing the alicyclic structure described above.

At first, an example of the first insulating substrate comprising the polybenzoxazole containing the alicyclic structure includes, for example, a first insulating substrate comprising a polybenzoxazole having the structure represented by the following structural formula 33.

(structural formula 33)

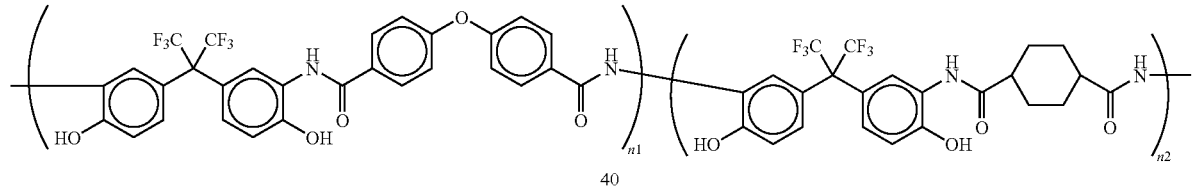

40

In the structural formula 33, the degree of polymerization n1/n2 is 50/50.

In a case of forming the polybenzoxazole of the structural formula 33, a solution of a polybenzoxazole precursor represented by the following structure 34 in γ-butyrolactone (BLC)/propylene glycol monomethyl ether acetate (PG-MEA) (9/1) is first coated to, for example, a 0.6 mm thick quartz substrate by a method such as spin coating. Then, for example, prebaking at 120° C. for 10 min is applied to obtain a coating layer.

(structural formula 34)

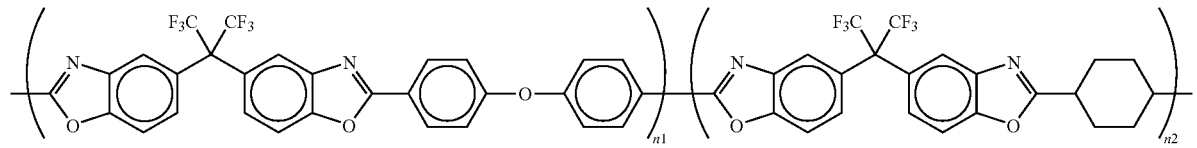

In the structural formula 34, the degree of polymerization n1/n2 is 50/50.

Then, an inert gas oven is used for example, and, after baking at 200° C. for 30 min in a nitrogen atmosphere, hardening/baking is performed at 350° C. for one hour, a layer of polybenzoxazole of the structural formula 33 is obtained. In an example of forming the layer for investigating the physical properties by the present inventors, the thickness of the coating layer after prebaking was 45 μm and the layer thickness after hardening/baking was 35 μm. Further, the polybenzoxazole layer after hardening was colorless transparent.

FIG. 1 is a schematic graph showing an example of transmission spectrum of a polybenzoxazole film containing the alicyclic structure.

In the graph of FIG. 1, the abscissa indicates wavelength λ (nm) of a light and the ordinate indicates a light transmittance TR (%).

When the present inventors have examined the transmission spectrum the film of a polybenzoxazole of the structural formula 33, to a light at a wavelength λ of from 300 nm to 800 nm results as shown in FIG. 1 were obtained. That is, it has been found that the transmittance Tr to a light in a visible light region at a wavelength λ of 400 nm to 800 nm was about 85% or higher and the transmittance to a light at a wavelength λ of 340 nm or lower (UV-light) was 0%.

Further, the present inventors performed thermal desorption spectroscopy by using a polybenzoxazole film prepared by the same procedures as those described above on a silicon substrate. Thermal desorption spectroscopy was performed by using EMD-WA1000S/W manufactured by ESCO Ltd. As a result, degassing was not found up to 350° C. which was the hardening temperature and it was found that the heat resistance of the film of polybenzoxazole of the structural formula 33 was high. Further, when the polybenzoxazole film was separated from the silicon substrate and physical properties were measured, it was found that the glass transition temperature was 269° C. and the coefficient of thermal expansion was 54 ppm/K. Further, 3 wt % weight loss temperature by thermogravimetry was 440° C.

Further, when the present inventors conducted examination for the film of polybenzoxazole of the structural formula 33 and other 10 types of resin films formed on quartz substrates with respect to light transmittance TR, 3 wt % weight loss temperature $T_{3\%}$, glass transition temperature $T_g$, and coefficient of thermal expansion CTE, results as shown in the following Table 1 were obtained.

The 3 wt % weight loss temperature $T_{3\%}$ (° C.) in Table 1 was measured by using TG/DTA-6200 manufactured by SII Nanotechnology within a range for the measuring temperature from 30° C. to 600° C. and at a temperature elevation rate of 10° C./min, in a nitrogen gas stream.

Further, the glass transition temperature $T_g$ (° C.) and the coefficient of thermal expansion CTE ppm/K in Table 1 were measured by using TMA-120 manufactured by SII Nanotechnology, within a range for the measuring temperature from 30° C. to 300° C., at a temperature elevation rate of 5° C./min by a tensile mode under a load of 10 g (gram). While the glass transition temperature $T_g$ in Table 1 is actually a temperature at which the value of the coefficient thermal expansion CTE changes greatly, but it is defined as the glass transition temperature for the sake of convenience.

Material M1 in Table 1 is a film of polybenzoxazole of the structural formula 33 formed on the quartz substrate described above and while the values for the 3 wt % loss temperature $T_{3\%}$, the glass transition temperature $T_g$, and the coefficient of thermal expansion CTE are somewhat different from the values in the polybenzoxazole film formed on the silicon substrate described above but they are approximately identical values.

Material M2 in Table 1 is a film of polybenzoxazole represented by following structural formula 35. The material M2 shows lower 3 wt % weight loss temperature $T_{3\%}$, glass transition temperature $T_g$ and larger coefficient of thermal expansion coefficient CTE compared with those of the material M1.

(structural formula 35)

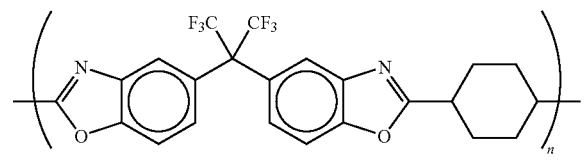

TABLE 1

| Material | Curing condition | Film thickness (μm) | Light transmittance (%) 300 nm | Light transmittance (%) 400 nm | Light transmittance (%) 600 nm | $T_{3\%}$ (° C.) | $T_g$ (° C.) | CTE (ppm/K) |
|---|---|---|---|---|---|---|---|---|
| M1 | 350° C. 60 min | 35 | 0 | 87 | 90 | 450 | 280 | 51 |
| M2 | 310° C. 60 min | 70 | 0 | 85 | 91 | 420 | 255 | 62 |
| M3 | 320° C. 60 min | 60 | 0 | 81 | 92 | 450 | 230 | 69 |
| M4 | 300° C. 60 min | 70 | 0 | 82 | 92 | 460 | 240 | 62 |
| M5 | 320° C. 60 min | 100 | 0 | 90 | 93 | 410 | 220 | 73 |
| M6 | 320° C. 60 min | 50 | 0 | 82 | 88 | 450 | 320 | 55 |
| M7 | 320° C. 60 min | 100 | 0 | 88 | 89 | 420 | 260 | 65 |
| M8 | 320° C. 60 min | 60 | 0 | 90 | 91 | 400 | 320 | 30 |
| M9 | 300° C. 60 min | 50 | 0 | 90 | 91 | 390 | 330 | 42 |
| M10 | 300° C. 60 min | 35 | 0 | 82 | 85 | 425 | 280 | 15 |
| M11 | 300° C. 60 min | 35 | 0 | 84 | 88 | 380 | 230 | 20 |

Material M3 in Table 1 is a film of polyamideimide represented by the following structural formula 36. The material M3 has lower light transmittance TR at the wavelength of about 400 nm and a lower glass transition temperature $T_g$ and a larger coefficient of thermal expansion CTE compared with those of the material M1.

The material M4 in Table 1 is a film of polyamideimide represented by the following structural formula 38. The material M4 has lower light transmittance TR at a wavelength of about 400 nm and a lower glass transition temperature $T_g$ and a larger coefficient of thermal expansion CTE compared with those of the material M1.

(structural formula 36)

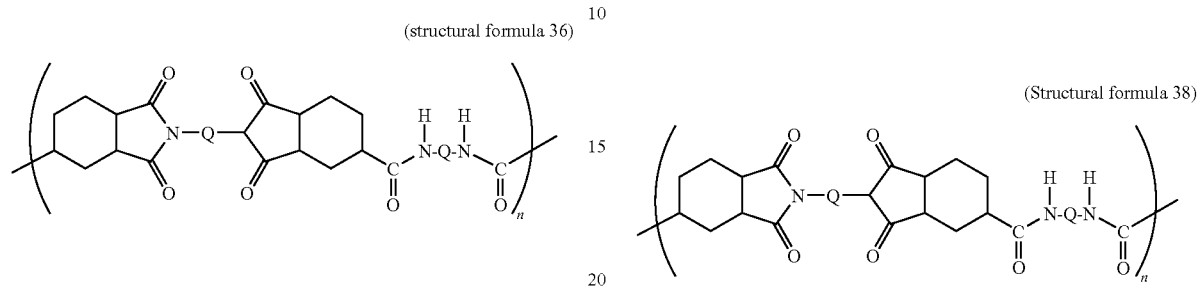

(Structural formula 38)

In the structural formula 36, Q is an aromatic group represented by the following structural formula 37.

(Structural formula 37)

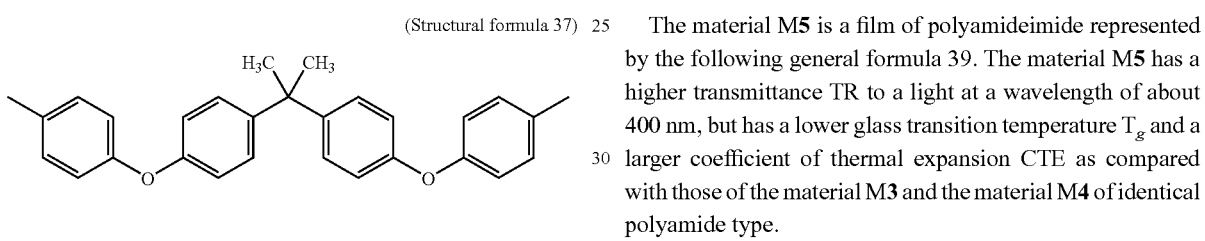

The material M5 is a film of polyamideimide represented by the following general formula 39. The material M5 has a higher transmittance TR to a light at a wavelength of about 400 nm, but has a lower glass transition temperature $T_g$ and a larger coefficient of thermal expansion CTE as compared with those of the material M3 and the material M4 of identical polyamide type.

(Structural formula 39)

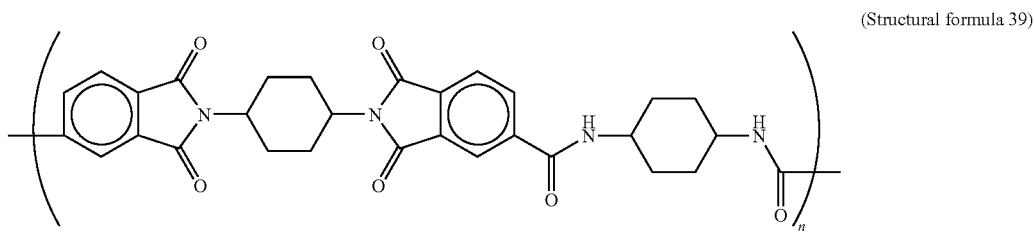

The material M6 in Table 1 is a film of a polyimide represented by the following structural formula 40. The material M6 has a higher glass transition temperature $T_g$ compared with the material M1 to the material M5.

(structural formula 40)

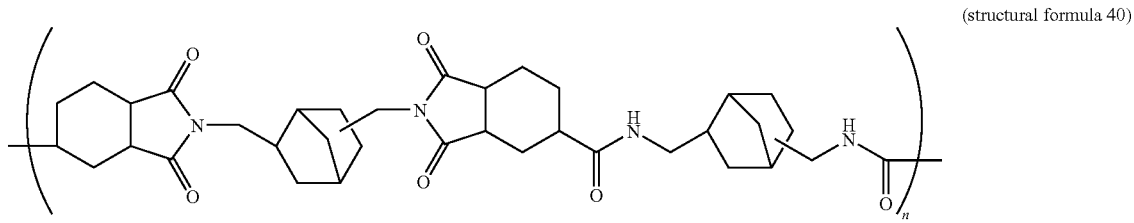

The material M7 in Table 1 is a film of a polyimide represented by the following general formula 41.

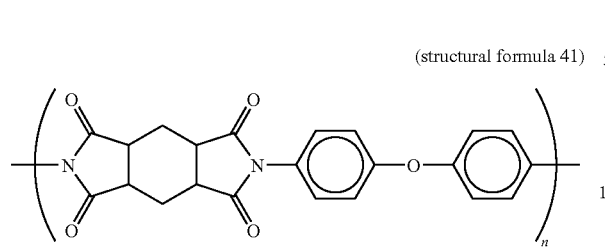
(structural formula 41)

The material M8 in Table 1 is a film of polyimide represented by the following structural formula 42. The material M8 has a low 3 wt % weight loss temperature $T_{3\%}$ but shows a high glass transition temperature $T_g$ and a small coefficient of thermal expansion CTE.

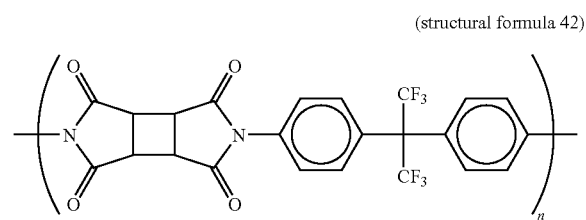
(structural formula 42)

The material M9 in Table 1 is a film of polyimide represented by the following structural formula 43. The material M9 has a low 3 wt % weight loss temperature $T_{3\%}$ but has a high glass transition temperature $T_g$ and small coefficient of thermal expansion CTE.

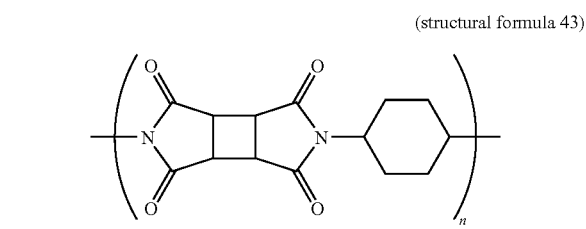
(structural formula 43)

The material M10 in Table 1 is a film of a polyamide represented by the following structural formula 44. The material M10 has a low transmittance TR to a light in a visible light region but has an extremely small coefficient of thermal expansion CTE.

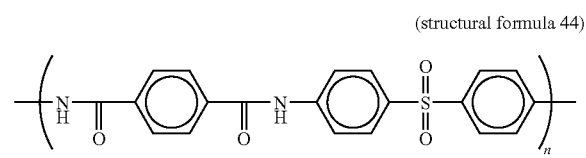
(structural formula 44)

The material M11 in Table 1 is a film of a polyamide represented by the following structural formula 45. The material M11 has a low transmittance TR to a light in a visible light region, and a 3 wt % weight loss temperature $T_{3\%}$ but has an extremely small coefficient of thermal expansion CTE.

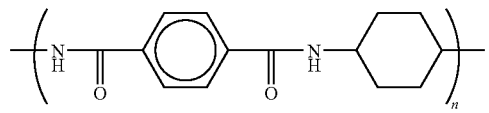
(structural formula 45)

Although not shown in Table 1, it was found that any of the materials M1 to M11 did not show melting at up to 300° C. and the melting point was 300° C. or higher.

By the way, the polybenzoxazole containing the alicyclic structure, the polyamideimide containing the alicyclic structure, the polyimide containing alicyclic structure, and the polyamide containing alicyclic structure, as described above usually have retardation. Accordingly, in a case of forming resin films having a thickness of 20 μm or more and 150 μm or less by using respective resins containing the alicyclic structure described above, most of resin films have a retardation of 10 nm or more. Therefore, when the first insulative substrate and the second insulating substrate are disposed between the first polarizer and the second polarizer as in existent liquid crystal display devices, light leakage occurs upon black display due to retardation in the insulating substrate. Therefore, when the invention is applied to the liquid crystal display device (liquid crystal display panel), the first polarizer is disposed between the first insulating substrate and the liquid crystal 3 (circuit layer) and the second polarizer is disposed between the second insulating substrate and the liquid crystal, thereby preventing light leakage upon black display.

It is not necessary that the material for the second insulating substrate is the polybenzoxazole containing the alicyclic structure, the polyamideimide containing the alicyclic structure, the polyimide containing alicyclic structure, and the polyamide containing the alicyclic structure but a transparent resin with extremely small retardation such as a polycarbonate or polyether sulfone can also be used. In a case of using a resin of extremely small retardation as the material for the second insulating substrate, the second polarizer disposed to the counter substrate can be disposed also on the side opposite to the liquid crystal as viewed from the second insulating substrate, that is, at the back of the surface formed with the color filter or the second alignment layer.

Descriptions are to be made for preferred embodiments of a liquid crystal display panel having a first insulating substrate, or the first insulating substrate and the second insulating substrate comprising one of the polybenzoxazole containing the alicyclic structure, the polyamideimide containing the alicyclic structure, the polyimide containing the alicyclic structure, and the polyamide containing the alicyclic structure, as well as a manufacturing method thereof.

Throughout the drawings for explaining the preferred embodiments, those having identical functions carry same reference numerals for which duplicate descriptions are to be omitted.

FIRST EMBODIMENT

Figure 2A:
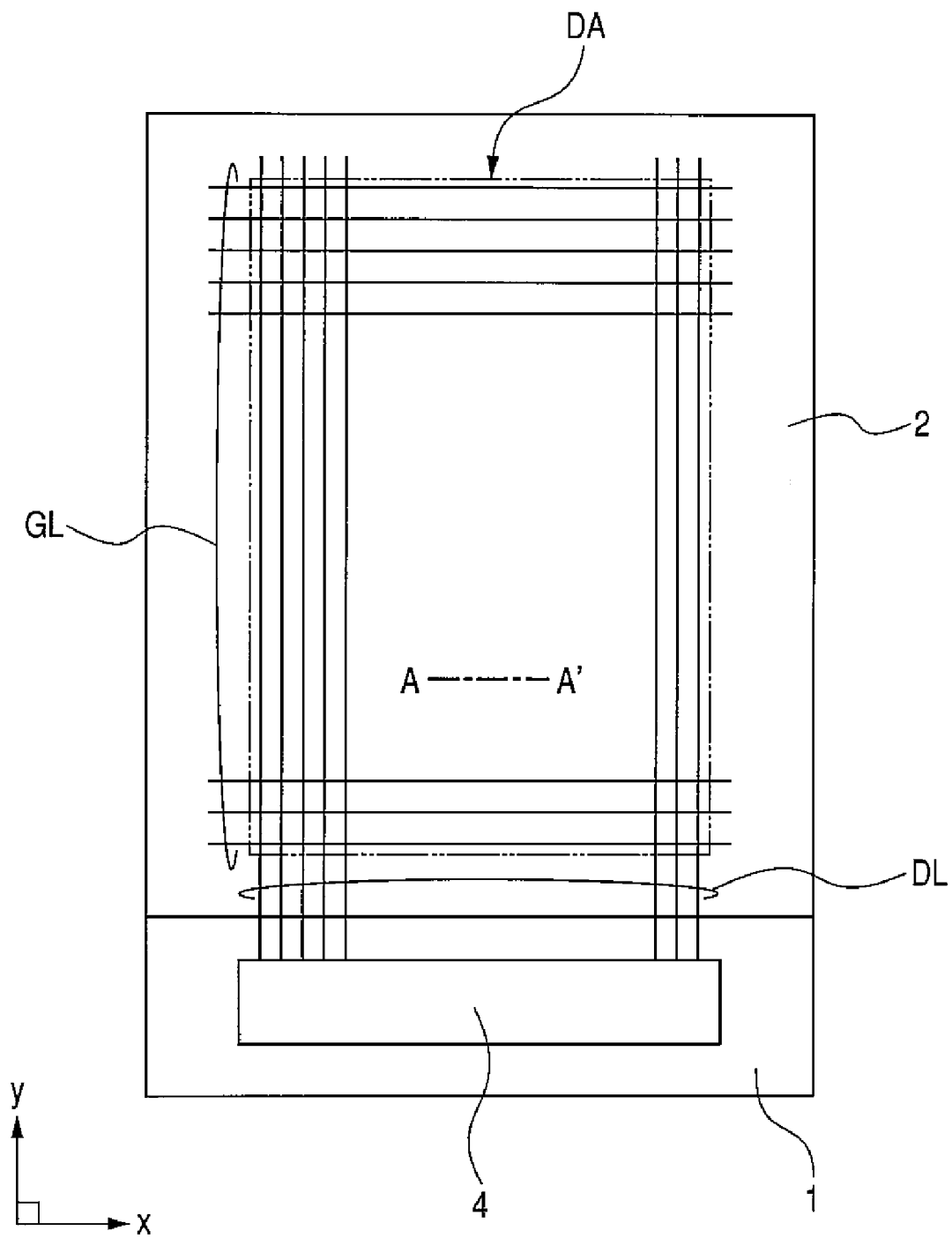
FIG. 2A is a schematic plan view showing an example of a planar constitution for a liquid crystal display panel of a first embodiment.
Figure 2B:
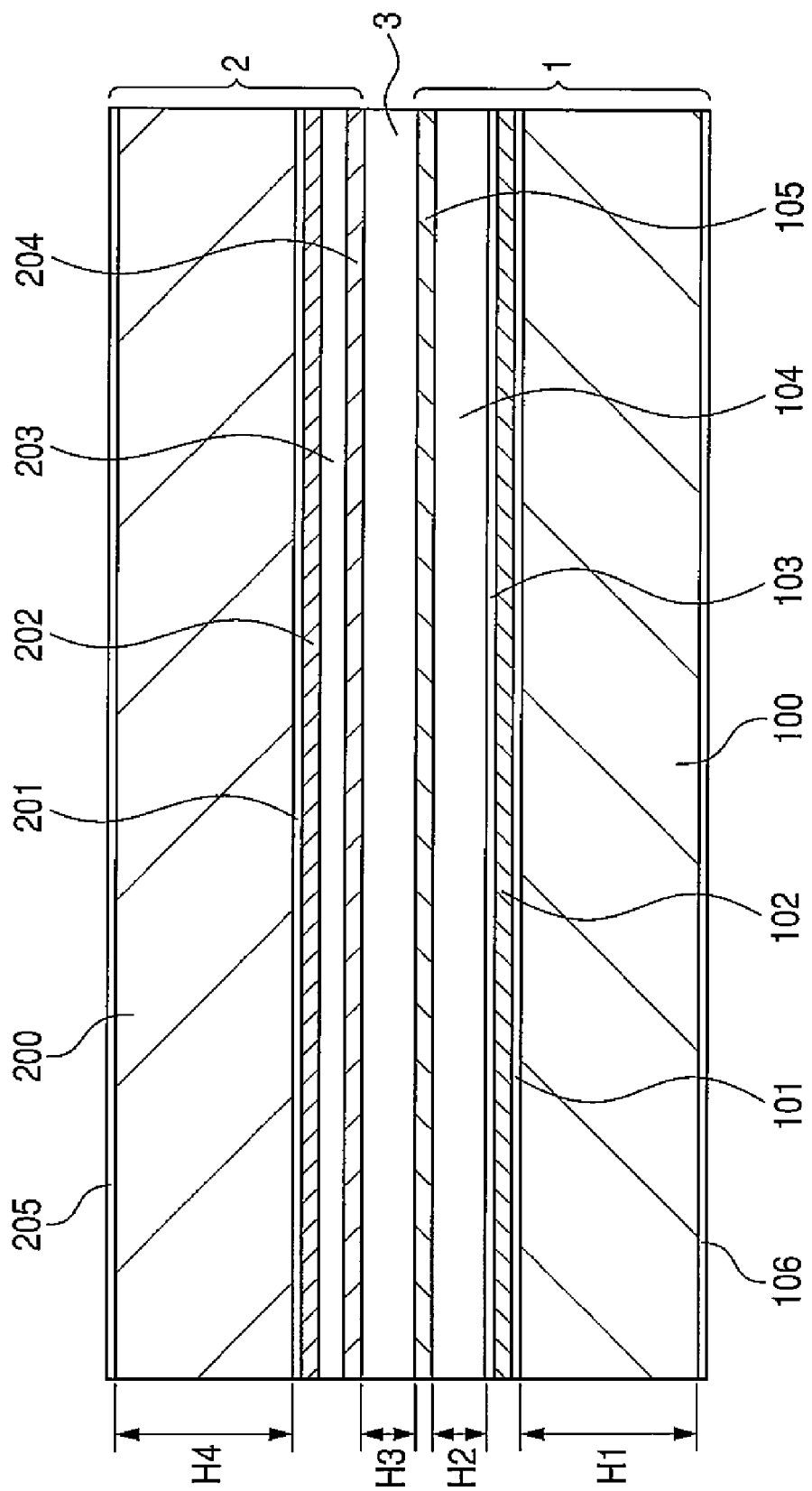
FIG. 2B is a schematic cross sectional view showing an example of a cross sectional constitution along line A-A' in FIG. 2A.
Figure 2C:
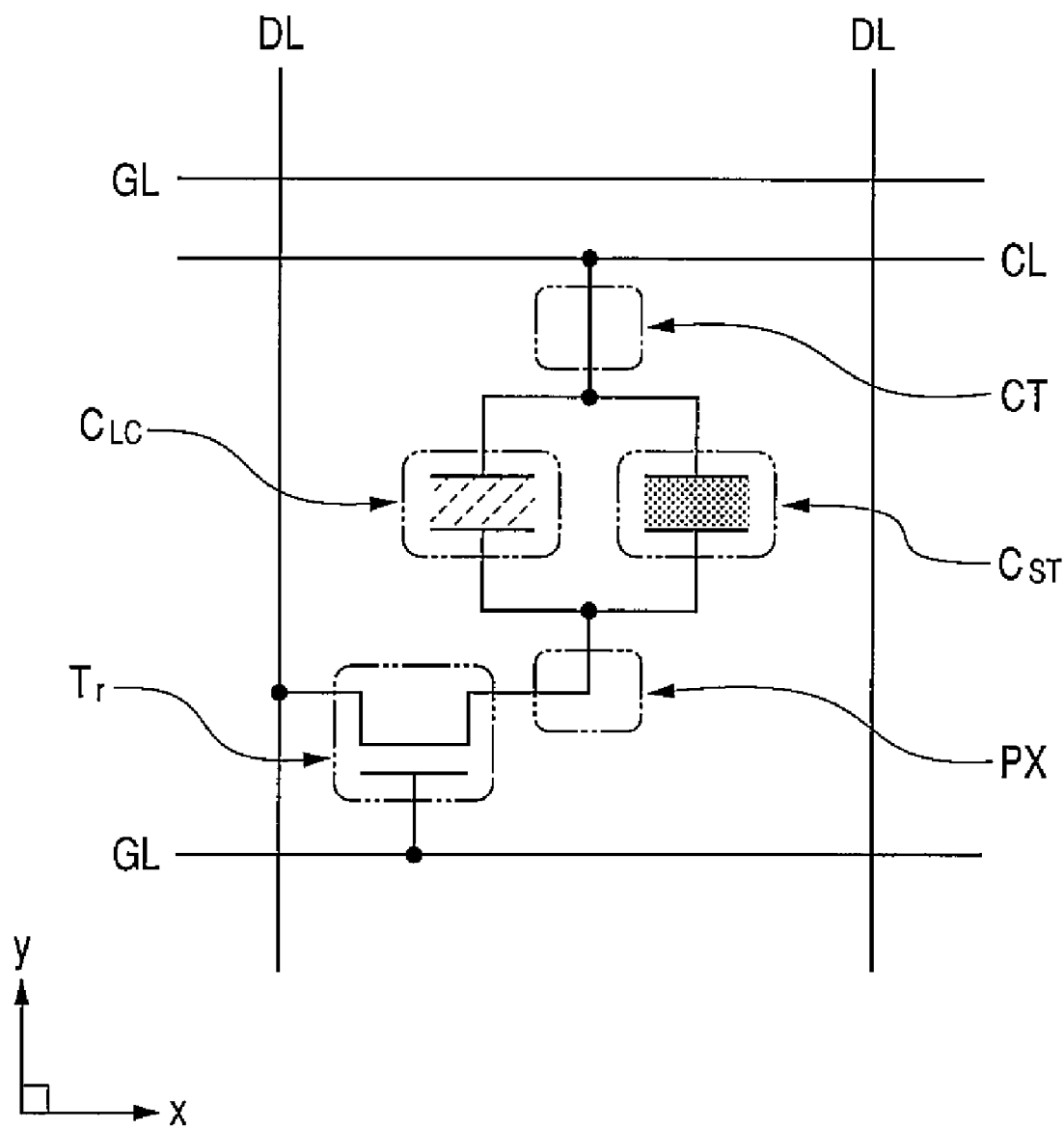
FIG. 2C is a schematic circuit diagram showing an example of a circuit constitution of one pixel of a liquid crystal display panel.

FIG. 2A to FIG. 2C are schematic views showing an example of a schematic constitution of a liquid crystal display panel for a first embodiment according to the invention.

FIG. 2A is a schematic plan view showing an example of a planar constitution of a liquid crystal display panel of the first embodiment. FIG. 2B is a schematic cross sectional view showing an example of a cross sectional constitution along line A-A' in FIG. 2A. FIG. 2C is a schematic circuit diagraph showing an example of a circuit constitution for one pixel of a liquid crystal display panel.

In the first embodiment, an in-plane-switching and transmissive liquid crystal display panel is illustrated as an example of a liquid crystal display panel applied with the invention.

The liquid crystal display panel of the first embodiment has, for example, as shown in FIG. 2A and FIG. 2B, a first substrate 1 (hereinafter referred to as a TFT substrate), a second substrate 2 (hereinafter referred to as a counter substrate) and a liquid crystal 3 interposed between the TFT substrate 1 and the counter substrate 2. In this case, the TFT substrate 1 and the counter substrate 2 are held so as to keep a predetermined distance, for example, by a sealing material (not illustrated) and a spacer (not illustrated) disposed in a ring-like configuration so as to surround a display region DA, and the liquid crystal 3 is sealed (tightly sealed) in a space surrounded with the TFT substrate 1, the counter substrate 2, and the sealing material. Further, the TFT substrate 1 has an area larger than the counter substrate 2 and, for example, an IC chip 4 having a circuit for generating a signal for driving the liquid crystal display panel is mounted in a region of the TFT substrate 1 not overlapped with the counter substrate 2.

The TFT substrate 1 has, for example, a first insulating substrate 100, a first barrier layer 101, a first polarizer 102, an under coating layer 103, a circuit layer 104, a first alignment layer 105, and a second barrier layer 106. In this case, the first insulating substrate 100 is a plastic substrate composed of a resin of one of a polybenzoxazole containing an alicyclic structure, a polyamideimide containing an alicyclic structure, a polyimide containing an alicyclic structure, and a polyamide containing an alicyclic structure. In this case, the circuit layer 104 is formed with a circuit, for example, having plural scanning lines GL, plural signal lines DL, plural thin-film transistors, plural pixel electrodes, plural counter electrodes, and plural insulating layers.

Further, in the liquid crystal display panel of the first embodiment, the thickness H1 of the first insulating substrate 100 is sufficiently larger compared with the thickness H2 of the circuit layer 104 and the thickness H3 of the liquid crystal 3 and it is, for example, 20 µm or more and 150 µm or less (preferably, 30 µm or more and 100 µm or less) and the layer 100 has retardation. Accordingly, in the liquid crystal display panel of the first embodiment, the first polarizer 102 is incorporated in the TFT substrate 1 and it is disposed between the first insulating substrate 100 and the circuit layer 104.

The counter substrate 2 has, for example, a second insulating substrate 200, a third barrier layer 201, a second polarizer 202, a filter layer 203, a second alignment layer 204, and a fourth barrier layer 205. In this case, the second insulating substrate 200 is a plastic substrate comprising the resin of one of the polybenzoxazole containing the alicyclic structure, the polyamideimide containing the alicyclic structure, the polyimide containing the alicyclic structure, and the polyamide containing the alicyclic structure. In this case, it is preferred that the second insulative 200 substrate comprises the same resin as the first insulating substrate 100.

Further, in the liquid crystal display panel of the first embodiment, the thickness H4 of the second insulating substrate 200 is sufficiently larger compared with the thickness H2 of the circuit layer 104 and the thickness H3 of the liquid crystal 3 and it is, for example, 20 µm or more and 150 µm or less (preferably, 30 µm or more and 100 µm or less) and the layer 200 has retardation. Accordingly, in the liquid crystal display panel of the first example, the second polarizer 202 is incorporated in the counter substrate 2 and disposed between the second insulating substrate 200 and the filter layer 203.

The display region DA of the liquid crystal display panel has an assembly of pixels arranged in a matrix along a direction x and a direction y. In this case, a region occupied by one pixel corresponds, for example, to a region surrounded by two adjacent scanning lines GL and two adjacent signal lines DL.

One pixel has, for example, as shown in FIG. 2C, a thin-film transistor Tr, a pixel electrode PX connected to the source of the thin-film transistor Tr, and a counter electrode CT connected to a common electrode. In this case, the thin-film transistor Tr is connected at the gate thereof with one of two adjacent scanning lines GL and connected at the drain thereof with one of two adjacent signal lines DL.

Further, one pixel has, for example, a pixel capacitance $C_{LC}$ (also referred to sometimes as liquid crystal capacitance) comprising a pixel electrode PX, a counter electrode CT, and a liquid crystal 3, and a storage capacitance $C_{ST}$ composed of a pixel electrode PX, a counter electrode CT, and a insulating layer of the circuit layer 104 (sometimes referred to also as auxiliary capacitance or a storage capacitance). The storage capacitance $C_{ST}$ sometimes has conductive layers different from the pixel electrode PX and the counter electrode CT, and the insulating layer of the circuit layer 104.

FIG. 3A to FIG. 3D are schematic views showing a specific example for the constitution of a circuit layer and a filter layer in the liquid crystal display panel of the first embodiment.

Figure 3A:
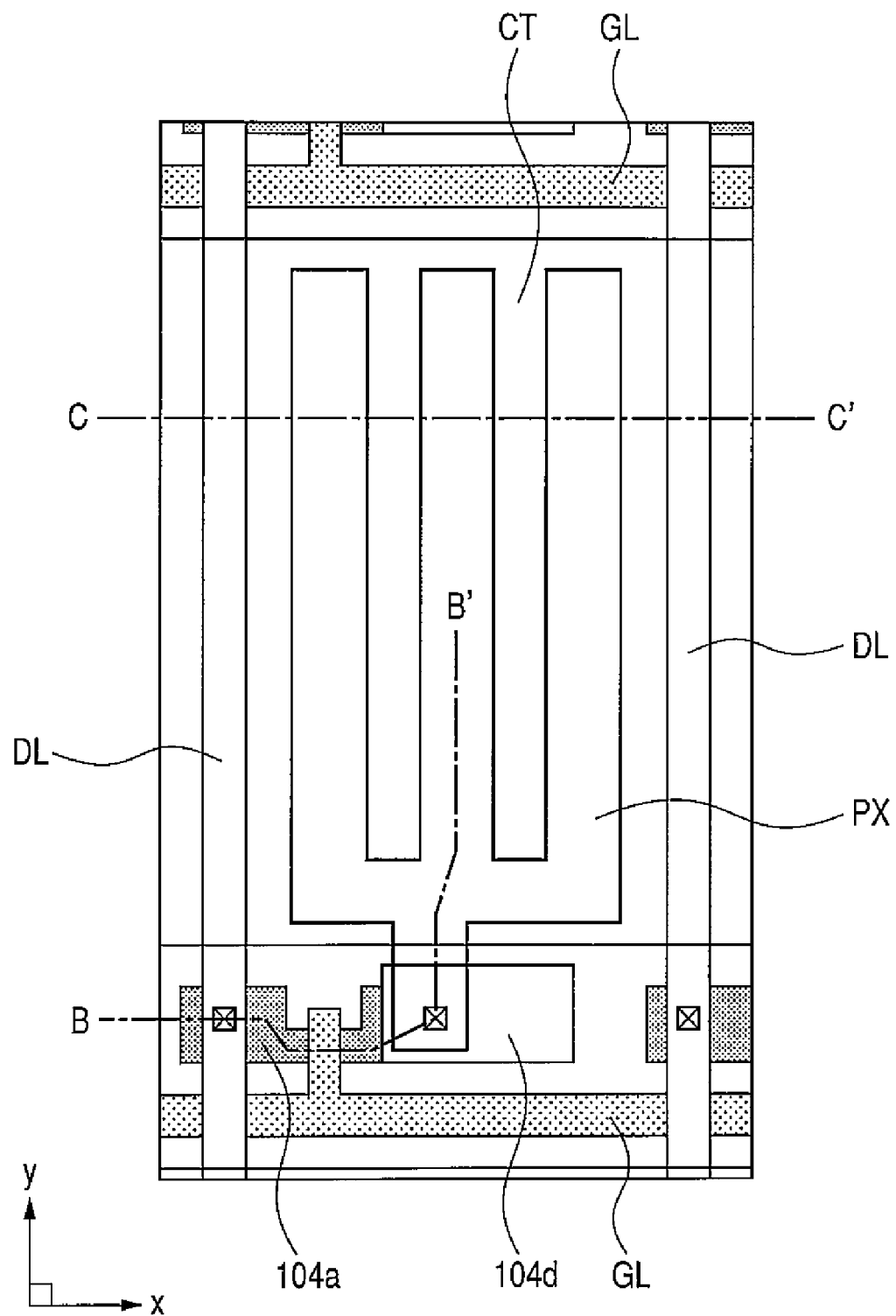
FIG. 3A is a schematic plan view showing an example of a planar constitution of a pixel in a TFT substrate.
Figure 3C:
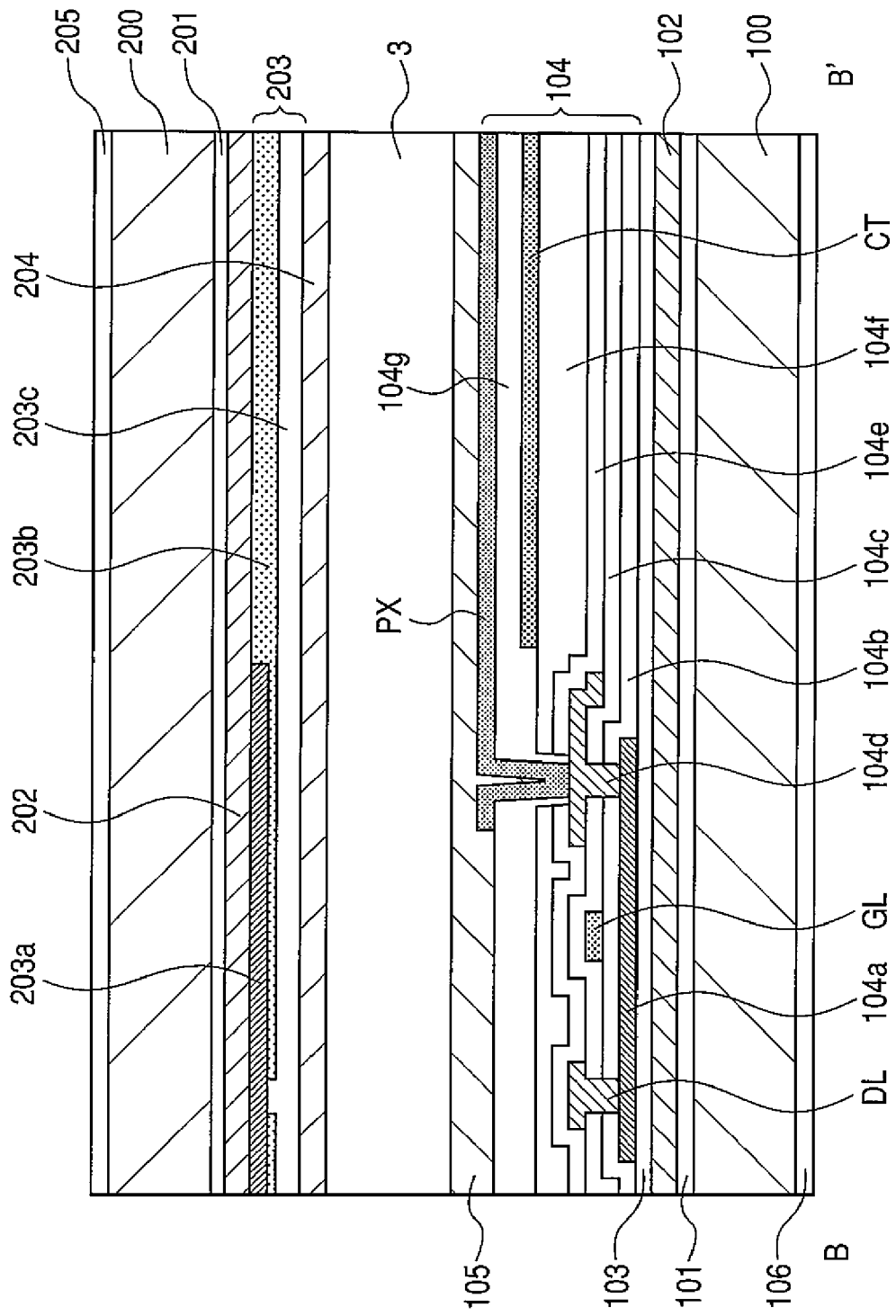
FIG. 3C is a schematic cross sectional view showing an example of a cross sectional constitution along line B-B' in FIG. 3B.

FIG. 3A is a schematic plan view showing an example of the planer constitution for one pixel in a TFT substrate. FIG. 3B is a schematic plan view showing an example of the planer constitution for one pixel in the counter substrate. FIG. 3C is a schematic cross sectional view showing an example of a cross sectional constitution along line B-B' in FIG. 3B. FIG. 3D is a schematic cross sectional view showing an example of a cross sectional constitution along line C-C' in FIG. 3B.

In the liquid crystal display panel of the first embodiment, one pixel in the circuit layer 104 of the TFT substrate 1 has a constitution, for example, as shown in FIG. 3A, FIG. 3B, and FIG. 3C, in which a semiconductor layer 104a of the thin-film transistor Tr is formed above the under coating layer 103. The semiconductor layer 104a of the thin-film transistor Tr is formed, for example, of an amorphous semiconductor such as amorphous silicon or a polycrystal semiconductor such as polycrystal silicon.

Further, a first insulating layer 104b covering the semiconductor layer 104a is formed above the under coating layer 103 and a scanning GL is formed above the first insulating layer 104b. The first insulating layer 104b is formed, for example, of silicon oxide (SiO), etc. The scanning line GL is formed, for example, of a metal such as aluminum (Al).

A second insulating layer 104c covering the scanning line GL is formed above the first insulating layer 104b, and an image signal line DL and the source electrode 104b of the thin-film transistor Tr are formed above the second insulating layer 104c. The signal line DL has a function as the drain electrode of the thin-film transistor Tr and is connected with the drain region of the semiconductor layer 104a through a first contact hole (not illustrated) passing through the first insulating layer 104b and the second insulating layer 104c. The source electrode 104d is connected with the source region of the semiconductor layer 104a through a second contact hole (not illustrated) passing through the first insulating layer 104b and the second insulating layer 104c. The second insulating layer 104c is formed, for example, of silicon oxide or silicon nitride (SiN). The signal line DL and the source electrode 104d are formed, for example, of a metal such as aluminum (Al).

Further, above the second insulating layer 104c, a third insulating layer 104e and a fourth insulating layer 104f covering the signal line DL and the source electrode 104d are formed and, above the fourth insulating layer 104f, a counter electrode CT is formed. In this case, the counter electrode CT is a stripe electrode used in common with plural pixels arranged in the direction x and is connected with a common electrode at the outside of the display region DA. Further, in this case, a through hole (not illustrated) is formed above the source electrode 104d in the third insulating layer 104e and the fourth insulating layer 104f. The third insulating layer 104e is formed, for example, of silicon oxide or silicon nitride, and the fourth insulating layer 104f is formed, for example, of acrylic resin. The counter electrode CT is formed, for example, of a transparent conductor such as ITO or IZO.

Further, above the fourth insulating layer 104f, a fifth insulating layer 104g covering the counter electrode CT is formed and a pixel electrode PX is formed above the fifth insulating layer 104g. In this case, the pixel electrode PX is, for example in a planar shape having three strip portions extending in the direction y, as shown in FIG. 3A and FIG. 3D, and connected through a third contact hole (not illustrated) formed to the fifth insulating layer 104g to the source electrode 104. The pixel electrode PX is formed, for example, of a transparent conductive film such as ITO or IZO.

Further, a first alignment layer 105 covering the pixel electrode PX is formed above the fifth insulating layer 104g.

The filter layer 203 of the counter substrate 2 has a constitution, for example, as shown in FIG. 3A, FIG. 3C, and FIG. 3D, in which a light cut off film 203a referred to as a black matrix layer and a color filter 203b are formed above the second polarizer 202. The black matrix layer 203a is, for example, a lattice-like film for partitioning the display region DA into each opening region on every pixel and is disposed so as to pass a position overlapping the scanning line GL, the thin-film transistor, and the signal line DL of the TFT substrate 1. The black matrix layer 203a is formed, for example, of a light sensitive black material or a metal material.

When the liquid crystal display panel corresponds to RBG type color display, the color filter 203b comprises three color filters of a red filter, a green filter, and a blue filter, and a filter for one color among filters for three colors is disposed in one opening region of the black matrix layer 203a. In this case, in the opening regions arranged in the black matrix layer 203a along the direction x, the red filter, the green filter, and the blue filter are arranged, for example, repetitively in this order. The red filter, the green filter, and the blue filter are formed of light sensitive material films containing dyes for respective colors.

Further, an over-coating layer (planarizing film) 203c is formed above the black matrix layer 203a and the color filter 203b, and the second alignment layer 204 is formed above the over-coating layer 203c.

The constitution for the circuit layer 104 and the filter layer 203 shown in FIG. 3A to FIG. 3D are one example for the constitution of the circuit layer 104 and the filter layer 203 in the liquid crystal panel of the first embodiment and it will be apparent that the constitutions can be modified appropriately.

Then, a method of manufacturing a liquid crystal display panel of the first embodiment is to be described with reference to FIG. 4A to FIG. 4F.

FIG. 4A to FIG. 4F are schematic views showing an example for the method of manufacturing a liquid crystal display panel of the first embodiment.

Figure 4A:
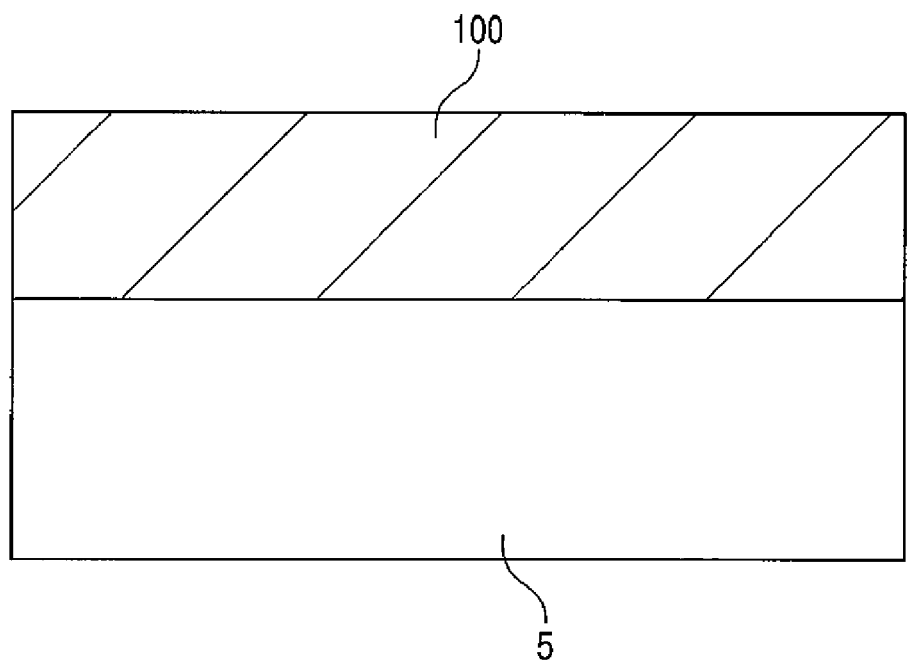
FIG. 4A is a schematic cross sectional view showing a cross sectional constitution just after forming a first insulating substrate above a first supporting substrate.
Figure 4B:
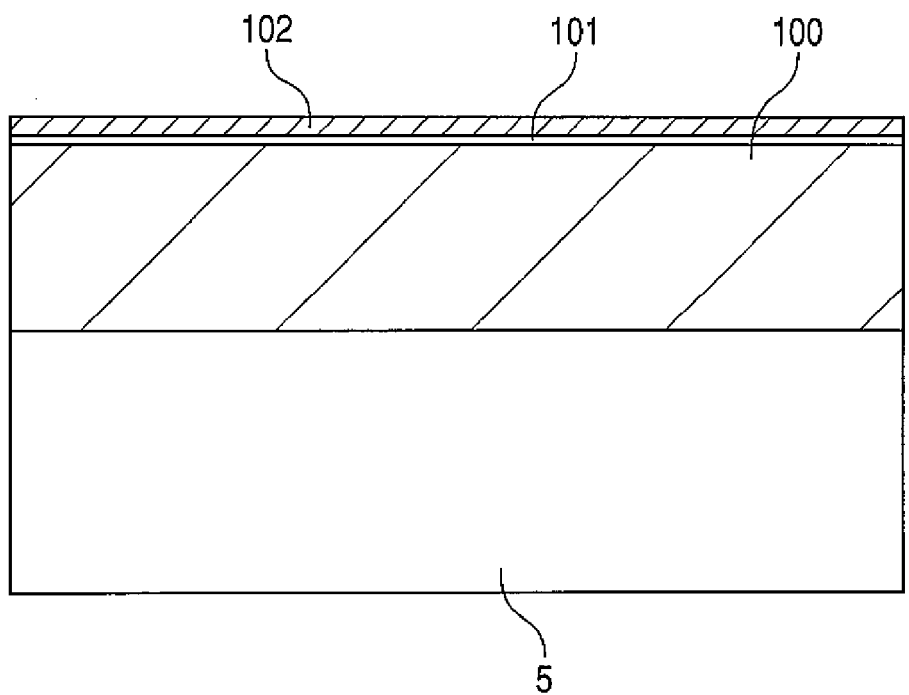
FIG. 4B is a schematic cross sectional view showing a cross sectional constitution just after forming a first barrier layer and a first polarizer.
Figure 4C:
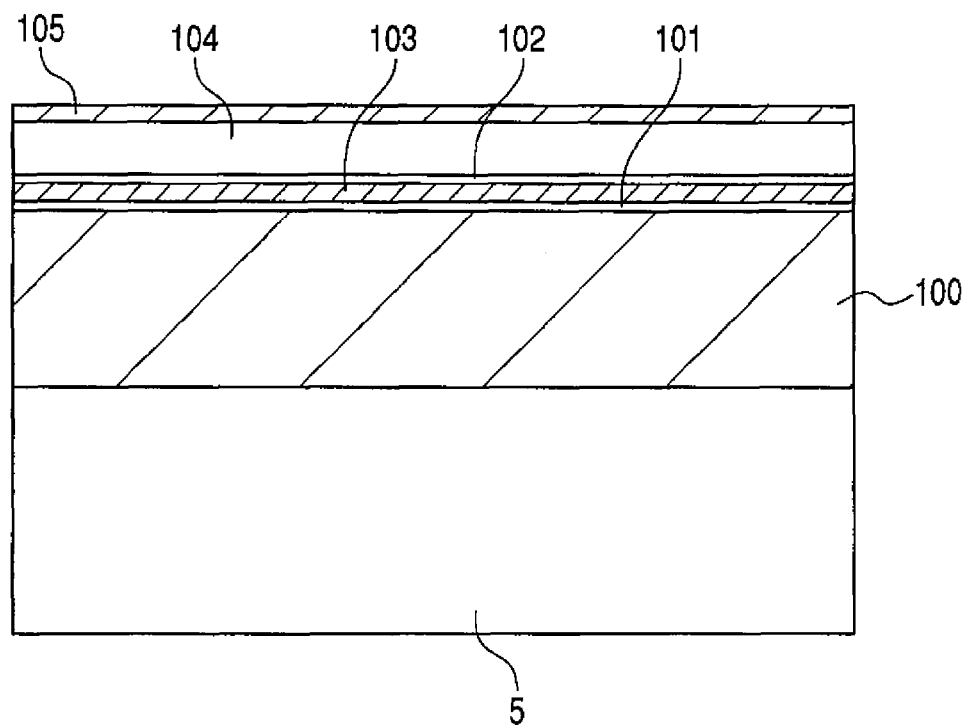
FIG. 4C is a schematic cross sectional view showing a cross sectional constitution just after forming an under coating layer, a circuit layer, and a first alignment layer.
Figure 4D:
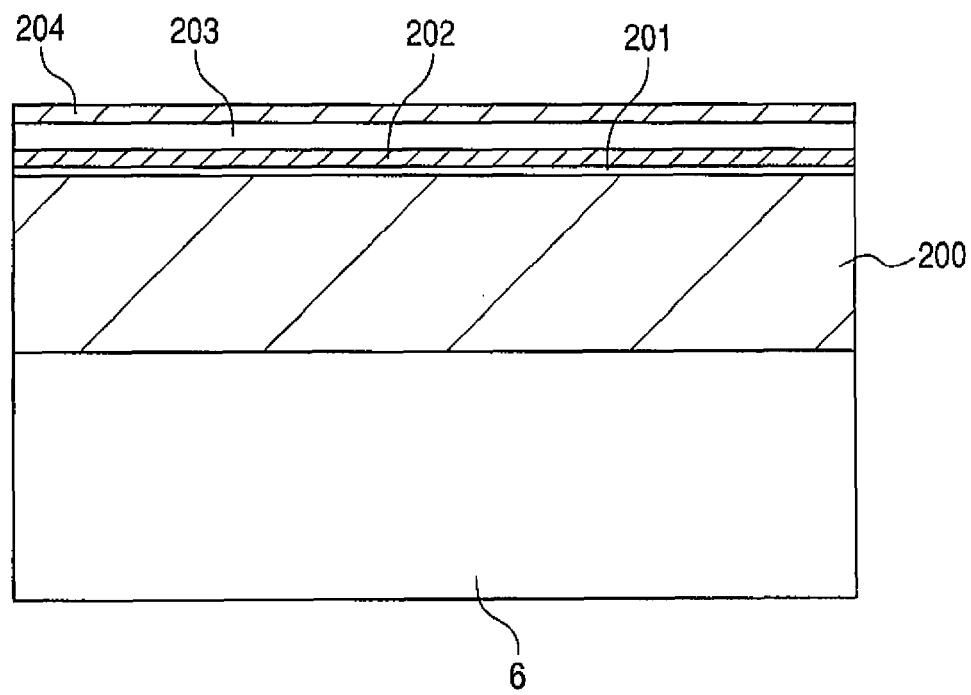
FIG. 4D is a schematic cross sectional view showing a cross sectional constitution just after forming a counter substrate above a second supporting substrate.
Figure 4E:
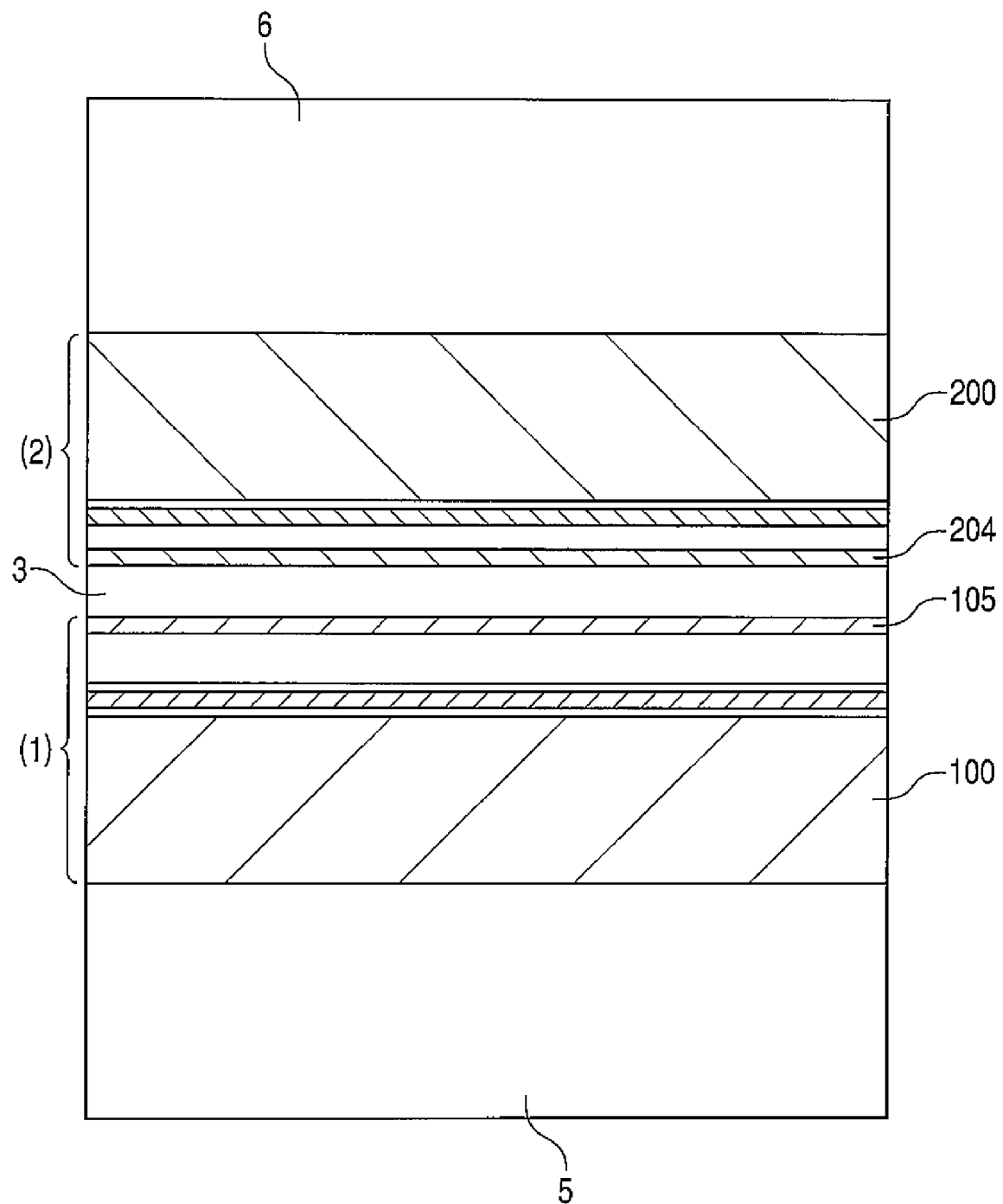
FIG. 4E is a schematic cross sectional view showing a cross sectional constitution just after bonding a TFT substrate and a counter substrate to each other and sealing a liquid crystal.
Figure 4F:
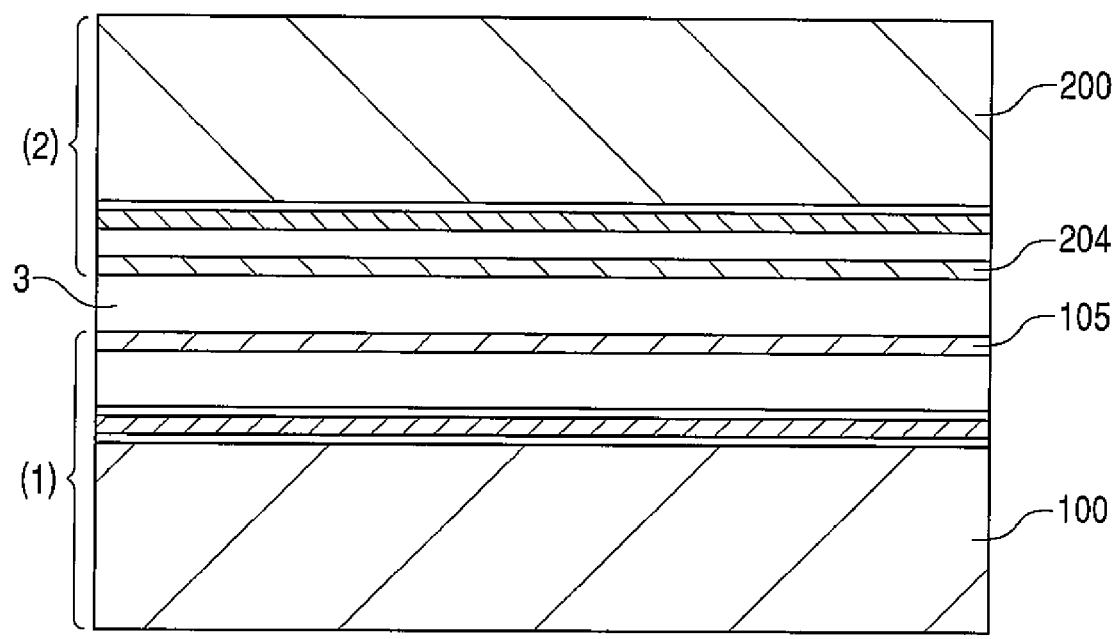
FIG. 4F is a schematic cross sectional view showing a cross sectional constitution just after separating a first supporting substrate and a second supporting substrate.

FIG. 4A is a schematic cross sectional view showing the cross sectional constitution just after forming a first insulating substrate above a first supporting substrate. FIG. 4B is a schematic cross sectional view showing the cross sectional constitution just after forming a first barrier layer and a first polarizer. FIG. 4C is a schematic cross sectional view showing the cross sectional constitution just after forming an under coating layer, a circuit layer, and a first alignment layer. FIG. 4D is a schematic cross sectional view showing the cross sectional constitution just after forming a counter substrate above a second supporting substrate. FIG. 4E is a schematic cross sectional view showing the cross sectional constitution just after bonding a TFT substrate and a counter substrate to each other and sealing a liquid crystal. FIG. 4F is a schematic cross sectional view showing the cross sectional constitution just after separating the first supporting substrate and the second supporting substrate.

In the liquid crystal display panel of the first embodiment, a film-like plastic substrate (resin substrate) having a thickness of 20 μm or more and 150 μm or less (more preferably, 30 μm or more and 100 μm or less) is used as a first insulating substrate 100 and a second insulating substrate 200. In this case, the liquid crystal display panel of the first embodiment is manufactured by the procedures as described below.

In the first step of preparing a TFT substrate 1, as shown in FIG. 4A, the first insulating substrate 100 with a thickness, for example, of 20 μm or more and 150 μm or less (more preferably, 30 μm or more and 100 μm or less) is at first formed on the surface of a first supporting substrate 5. For the first supporting substrate 5, a substrate of high heat resistance, for example, a glass substrate, a quartz substrate, a silicon substrate, or a metal substrate is used. In the method of manufacturing the liquid crystal display panel of the first embodiment, after forming the TFT substrate 1 (excluding second barrier layer 106) above the first supporting substrate 5, a light (UV-light) is irradiated to separate the first supporting substrate 5 from the insulating substrate 100 as will be described later. For this purpose, it is preferred that the first supporting substrate 5 is a transparent substrate such as a glass substrate or a quartz substrate.

Further, when the first insulating substrate 100 is formed, a solution containing a resin having the alicyclic structure described above dissolved therein, or a solution containing a precursor of such resin dissolved therein is at first coated, for example, by spin coating or slit coating to the surface of the first support substrate 5. In this case, in a usual resin forming method, the solution is coated by spin coating or slit coating and then pre-baking is effected for evaporating the solvent. Then, baking/hardening is effected at a temperature of 250° C. or higher in an atmosphere of an inert gas such as a nitrogen gas or in vacuum. While baking/hardening can be applied also in air, baking/hardening effected in air may cause coloration due to oxidation. Accordingly, baking/hardening is preferably effected in a nitrogen atmosphere or in vacuum.

Further, the temperature for applying baking/hardening is at a level where the resin material is not decomposed and a temperature higher than that in the step of forming the thin-film transistor to be carried out subsequently is preferred. Accordingly, the baking/hardening is effected, for example, at 300° C. or higher and 450° C. or lower.

Then, as shown in FIG. 4B, a first barrier layer 101 and a first polarizer 102 are formed above the first insulating substrate 100. The first barrier layer 101 is a layer for preventing the water content or oxygen absorbed to a resin used as the first insulating substrate 100 from intruding into the circuit layer 104. Accordingly, the first barrier layer 101 is preferably formed, for example, of an inorganic material such as silicon oxide (SiO), silicon nitride (SiN), or aluminum oxide (AlO).

In this case, the thickness of the first barrier layer 101 is, for example preferably, from 10 nm and up to 2000 nm. Further, in this case, the thickness of the first barrier layer 101 is, more preferably, 50 nm or more and 500 nm or less. Further, the first barrier layer 101 is not restricted to an inorganic material film comprising a single material, but two or more kinds of inorganic layer films may also be laminated as required.

The method of forming the inorganic film described above includes for example, a sputtering method, a reactive plasma deposition method, a CVD method, a plasma CVD method, etc. Since the first barrier layer 101 is formed on the first insulating substrate 100 which is an organic compound, it is preferably formed by a method where the temperature forming the layer is relatively low with a view point of decreasing damages to the first insulating substrate 100.

Accordingly, when the first barrier layer 101 is formed, a silicon nitride film with a thickness of about 200 nm is formed by using a CVD method at a temperature of about 300° C. In this case, since the first insulating substrate 100 is formed of the resin of high heat resistance as described above, the first insulating substrate 100 is not deformed or denatured in the step of forming the first barrier layer 101.

Further, since it is necessary that the first polarizer 102 can withstand a heating treatment in the step of forming the circuit layer 104 (for example, treatment performed at about 300° C.), the first polarizer has to be formed with a material of high heat resistance. Accordingly, a polarizer formed, for example, by stretching a polyvinyl alcohol dyed with iodine as used in an existent liquid crystal display device is not suitable as the first polarizer 102.

An example of the highly heat resistant polarizer includes, for example, a polarizer of a structure referred to as a wire grid (hereinafter referred to as a wire grid polarizer). The wire grid polarizer is, for example, a polarizer of a structure obtained by forming a film of a metal such as aluminum and patterning the metal film into a grid shape. In this case, the first polarizer 102 is configured such that fine metal wires extending in one direction are arranged above the first barrier layer 101 each at an equal pitch in a direction perpendicular to the one direction. In this case, a preferred distance between the fine metal wires is, for example, about from 50 nm to 300 nm. Further in this case, the distance between the fine metal wires is more preferably about from 100 nm to 150 nm. A preferred height of the fine metal wire is, for example, about from 50 nm to 400 nm. Further, a more preferred height of the fine metal wire is, for example, about from 100 nm to 300 nm.

Further, the material for the wire grid polarizer (fine metal wire) includes, for example, gold, silver, aluminum, and silicon. Since the polarizer is disposed below the circuit layer 104, those which are not heavy metals or not containing heavy metals that may contaminate semiconductors, or those giving less contamination are preferred.

Further, the wire grid polarizer may be formed, for example, by using photolithography or electron beam lithography, or may be formed by using a pattern forming method by optical double beam interference. Furthermore, the wire grid polarizer may also be formed, for example, by using nanoimprint technique or self-assembling by a high molecular block copolymer.

When the wire grid polarizer is used as the first polarizer 102, it is preferred to fill a space portion (gap portion between fine metal wires) with a planarizing layer to planarize the surface on which forms the under coating layer 103 or the like is to be formed. The material for the planarizing layer includes, for example, a Si type inorganic film by using vacuum deposition technique (for example, $SiO_2$ or SiN), or a coating type sol-gel material. Further, the material for the planarizing layer is not restricted to the material described above but other materials may also be used so long as they are transparent and endure the temperature in the subsequent step of forming the thin-film transistor. In this case, the material for the planarizing layer is preferably those having a coefficient of thermal expansion close to the coefficient of thermal expansion of the metal material for the wire grid polarizer. Furthermore, also organic materials may be used as the material for the planarizing layer so long as they are transparent and heat resistant. The organic material usable as the material for the planarizing layer includes, for example, a polybenzoxazole containing an alicyclic structure, a polyamideimide containing an alicyclic structure, a polyimide containing an alicyclic structure, and a polyamide materials containing an alicyclic structure used for the first insulating substrate 100.

Accordingly, when the wire grid polarizer is used as the first polarizer 102, a vapor-deposited film of aluminum having a thickness of about 200 nm is at first formed above the first barrier layer 101 for instance. Then, an etching resist is formed above the thin vapor-deposited film by photolithography using a phase shifting mask, and the thin vapor-deposited film is etched to form a polarizer having a grid with a pitch of about 150 nm. Further, after forming the wire grid polarizer, a silicon oxide film with a thickness of about 300 nm is formed, for example, as a planarizing layer.

The first polarization layer 102 is not restricted to the wire grid polarizer described above but may be a polarizer of any other constitution (structure) so long as the polarizer has high heat resistance and can be formed directly over the first insulating substrate 100.

Then, as shown in FIG. 4C, an under coating layer 103, a circuit layer 104, and a first alignment layer 105 are formed above the first polarizer 102. The under coating layer 103 is formed, for example, by using an inorganic material such as silicon oxide in the same manner as that for the first barrier layer 102. Further, when the first polarizer 102 is a wire grid polarizer, the under coating layer 103 may serve also as the planarizing layer.

The circuit layer 104 and the first alignment layer 105 may be formed by the procedures in the existent method of manufacturing the TFT substrate 1 or by the procedures applying them. Accordingly, detailed description for the procedures of forming the circuit layer 104 and the first alignment layer 105 are to be omitted.

When the semiconductor layer 104a of the thin-film transistor Tr formed to the circuit layer 104 comprises, for example, amorphous silicon, the step of forming the thin-film transistor Tr includes a step carried out at a high temperature of about 300° C. However, each of the first insulating substrate 100 and the first polarizer 102 is formed of a highly heat resistant material. Accordingly, in the method of manufacturing the TFT substrate 1 of the first embodiment, the first insulating substrate 100 and the first polarization 102 are not deformed or denatured in the step of forming the circuit layer 104.

Further, when the TFT substrate 1 is manufactured by the procedures as described above, the first polarizer 102, the circuit layer 104, the first alignment layer 105, etc. can be formed, for example, by a manufacturing apparatus used upon manufacturing an existent TFT substrate in which the first insulating substrate 100 is a glass substrate.

Further, while the resin material used for the first insulating substrate 100 has a higher coefficient of thermal expansion compared with that of a glass substrate used in the existent TFT substrate, the first polarizer 102, the circuit layer 104, the first alignment layer 105, etc. are formed in a state of securing the first insulating substrate 100 to the first supporting substrate 5 such as a glass substrate having small coefficient of thermal expansion in the method of preparing the TFT substrate 1 of the first embodiment. Accordingly, in the method of preparing the TFT substrate 1 of the first embodiment, heat expansion of the first insulating layer 100 can be suppressed upon heating, for example, in the step of forming the circuit substrate 104 and the displacement for the position of forming the thin-film transistor Tr, etc can be decreased.

On the other hand, in the second step of forming a counter substrate 2, the second insulating substrate 200, a third barrier layer 201, the second polarizer 202, the filter 203, and the second alignment layer 204 are formed in this order above a second supporting substrate 6, for example, as shown in FIG. 4D.

For the second supporting substrate 6, a substrate having a high heat resistance such as a glass substrate, a quartz substrate, a silicon substrate, a metal substrate, etc. are used in the same manner as in the first supporting substrate 5. In the method of manufacturing the liquid crystal display panel of the first embodiment, after forming the counter substrate 2 (excluding the fourth barrier layer 205 above the second supporting substrate 6, light (UV-light) is irradiated to separate the second supporting substrate 6 from the second insulating substrate 200 as to be described later. Accordingly, the second supporting substrate 6 is preferably a transparent substrate such as a glass substrate or a quartz substrate.

The second insulating substrate 200 is formed, for example, by using the same material as that for the first insulating substrate 100 such that the thickness is 20 μm or more and 150 μm or less (more preferably, 30 μm or more and 100 μm or less).

The third barrier layer 201 is formed by using an inorganic material, for example, silicon oxide, silicon nitride, or aluminum oxide in the same manner as in the first barrier layer 101.

The second polarizer 202 is formed, for example, as a wire grid polarizer in the same manner as in the first polarizer 102. In this case, the extending direction of the fine metal wire in the second polarizer 202 is directed, for example, in a direction perpendicular to the extending direction of the fine metal wire in the first polarizer 102, or in a direction parallel therewith.

The filter layer 203 and the second alignment layer 204 may be formed, for example, by the procedures in the existent manufacturing method for manufacturing a counter substrate 2 or procedures applying them. Accordingly, description for the procedures of forming the filter layer 203 and the second alignment layer 204 are to be omitted.

In the step of forming the counter substrate 2, the step performed at the highest temperature is usually a step of forming the color filter 203b and the temperature therefor is about 200° C. Therefore, the material used for the second insulating substrate 200 and the second polarizer 202 may be any material having heat resistance to a temperature of about 200° C. Accordingly, when the second insulating substrate 200 is formed by the same material as the first insulating substrate 100 and the second polarizer 202 of the same constitution as the first polarizer 102 is formed as in the method of manufacturing the liquid crystal display panel of the first embodiment, the second insulating substrate 200 and the second polarizer 202 are not deformed or denatured in the step of forming the counter substrate 2.

Further, when the counter substrate 2 is prepared by the procedures as described above, the second polarizer 202, the filter layer 202, the second alignment layer 204, etc. can be formed, for example, by a manufacturing apparatus used for preparing an existent counter substrate in which the second insulating substrate 200 is a glass substrate.

After forming the TFT substrate 1 above the first supporting substrate 5 (excluding the second barrier layer 106) and forming the counter substrate 2 above the second supporting substrate 6 (excluding fourth barrier layer 205), the TFT substrate 1 and the counter substrate 2 are bonded to each other, and a liquid crystal 3 is sealed therebetween as shown in FIG. 4E. For example, in this step, after bonding the TFT substrate 1 and the counter substrate 2 to each other by means of an open ring-like seal member, the liquid crystal is injected, and the open portion of the sealing material is sealed. Alternatively, this step may be carried out, for example, by coating a sealing material in a closed ring shape on the first alignment layer of the TFT substrate 1, dripping the liquid crystal to a region surrounded by the sealing material, and bonding the TFT substrate 1 and the counter substrate 2 to each other.

Further, in this case, the TFT substrate 1 and the counter substrate 2 are bonded to each other while securing them to the first supporting substrate 5 and the second supporting substrate 6 as they are. With such procedures, the TFT substrate 1 and the counter substrate 2 can be bonded to each other by an existent apparatus used for bonding the TFT substrate 1 and the counter substrate 2 by using the glass substrate.

Then, as shown in FIG. 4F, the first supporting substrate 5 is separated from the first insulating substrate 100 and the second supporting substrate 6 is separated from the second insulating substrate 200.

When the first supporting substrate 5 is separated from the insulating substrate 100, separation is effected, for example, by irradiating a UV-light from the rear face of the boundary of the first supporting substrate 5 with the first insulating substrate 100, thereby lowering the bonding strength between the first supporting substrate 5 and the first insulating substrate 100. In the same manner, when the second supporting substrate 6 is separated from the insulating substrate 200, separation is effected, for example, by irradiating a UV-light from the rear face of the boundary of the second supporting substrate 6 with the second insulating substrate 200, thereby lowering the bonding strength between the second supporting substrate 6 and the second insulating substrate 200.

As the UV-light to be irradiated, a UV-light, for example, at a wavelength of 200 nm or more and 450 nm or less is preferred. Further, the UV-light to be irradiated in this case is, preferably a laser light such as, for example, an XeCl excimer laser light at a wavelength of 308 nm or a KrF excimer laser light at a wavelength of 248 nm, or a third harmonics (wavelength: 355 nm) or fourth harmonics (wavelength: 266 nm) of a YAG laser at a wavelength of 1064 nm. Furthermore, as the UV-light to be irradiated, an UV-light of g-line (wavelength: 436 nm), h-line (wavelength: 405 nm), and i-line (wavelength: 365 nm) as the line of a mercury lamp or a xenon mercury lamp at a wavelength of 313 nm or at a wavelength of 254 nm can also be used.

The wavelength of the UV-light (optical light) to be irradiated is, preferably, 300 nm or more and 400 nm or less. In most cases, light in the wavelength band described above efficiently transmits through a glass substrate used as the first supporting substrate 5 and the second supporting substrate 6 and less transmits a plastic substrate (resin film) used as the first insulating substrate 100 and the second insulating substrate 200. Accordingly, this can decrease the possibility, for example, that the irradiated UV-light transmits through the first insulating substrate 100 or the second insulating substrate 200 to thereby damage the circuit layer 104, etc. present at the inside.

Further, referring more specifically, the UV-light (optical light) to be irradiated is preferably such a light at a wavelength in which the transmittance is 50% or less and, more preferably, at a wavelength in which the transmittance is 10% or less in the first insulating substrate 100 and the second insulating substrate 200. The light at a wavelength in which the transmittance in the first insulating substrate 100 is 10% or less or a light having a value approximate thereto is adsorbed at the boundary between the first supporting substrate 5 and the first insulating substrate 100 when irradiated from the rear face of the supporting substrate 5, thereby exerting efficiently to cause easy separation.

Accordingly, when the first supporting substrate 5 is separated from the first insulating substrate 100, an XeCl excimer laser light at a wavelength of 308 nm is irradiated, for example, from the rear face of the first supporting substrate 5. In the same manner, when the second supporting substrate 6 is separated from the second insulating substrate 200, an XeCl excimer laser light at a wavelength of 308 nm is irradiated, for example, from the rear face of the second supporting substrate 6. In this case, an XeCl excimer laser light, for example, at a pulse width of 30 ns and an energy density of 150 mJ/cm$^2$/shot is irradiated by 50 shots.

In this case, when a quartz substrate is used as the first supporting substrate 5, since the quartz substrate allows a UV-light at a shorter wavelength, which less transmits the glass substrate, to transmit therethrough, the bonding strength between the first supporting substrate 5 and the first insulating substrate 100 can be lowered by irradiating, for example, a KrF excimer laser light at a wavelength of 248 nm (for example). In this case, a KrF excimer laser light, for example, at a pulse width of 20 ns and an energy density of 50 mJ/cm$^2$/shot is irradiated by 10 shots.

After separating the first supporting substrate 6 from the first insulating substrate 100 and separating the second supporting substrate 5 from the second insulating substrate 200, the second barrier layer 106 is formed to the rear face of the first insulating substrate 100 and the fourth barrier layer 205 is formed to the rear face of the second insulating substrate 200 finally as shown in FIG. 2B. The second barrier layer 106 and the fourth barrier layer 205 are, respectively, films for preventing moisture absorption to the first insulating substrate 100 and the second insulating substrate 200 and are formed, for example, of the same inorganic material as for the first barrier layer 101.

Descriptions have been made that the second barrier layer 106 and the fourth barrier layer 205 are formed after separating the first supporting substrate 5 and the second supporting substrate 6. Alternatively, the liquid crystal display panel of the first embodiment may also be formed, for example, by at first separating only the first supporting substrate 5 and forming the second barrier layer 106 to the rear face of the first insulating substrate 100, subsequently, separating the second supporting substrate 6 and forming the fourth barrier layer 205 to the rear face of the second insulating substrate 200.

As has been described above, according to the liquid crystal display panel of the first embodiment, the first insulating substrate 100 and the second insulating substrate 200 can be formed each as a plastic substrate with a thickness of 20 μm or more and 150 μm or less. Accordingly, the liquid crystal display panel of the first embodiment enables, for example, further reduction in the thickness and reduction in the weight of the liquid crystal display device.

Furthermore, the liquid crystal display panel of the first embodiment can enhance the possibility of realizing a liquid crystal display device having a display region DA in a curved surface, or a liquid crystal display device that can be turned down smaller by rolling up or bending when it is not used.

Further, according to the method of manufacturing the liquid crystal display panel of the first embodiment, after bonding the TFT substrate 1 secured to the first supporting substrate 5 and the counter substrate 2 secured to the second supporting substrate 6 to each other and sealing the liquid crystal, the first supporting substrate 5 and the second supporting substrate 6 are separated. In this case, the first insulating substrate 100 and the second insulating substrate 200 are formed respectively to such a thickness capable of sufficiently ensuring the strength as the insulating substrate. Accordingly, the method of manufacturing the liquid crystal display panel of the first embodiment can, for example, lower the possibility of causing cracks in the circuit layer 104 by internal stress or an external force in the course of manufacture. Accordingly, the method of manufacturing the liquid crystal display panel of the first embodiment can improve the yield in the manufacture of the liquid crystal display panel.

Further, according to the method of manufacturing the liquid crystal display panel of the first embodiment, a manufacturing apparatus used for manufacturing a liquid crystal display panel in which the insulating substrate is a glass substrate can be used effectively. Further, according to the method of manufacturing the liquid crystal display panel of the first embodiment, the first supporting substrate 5 and the second supporting substrate 6 can be utilized after being separated from the first insulating substrate 100 and the second insulating substrate 200 in a case where other liquid crystal display panels are manufactured. Accordingly, the method of manufacturing the liquid crystal display panel of the first embodiment can suppress increase in the cost of manufacturing the liquid crystal display panel.

Further, according to the method of manufacturing the liquid crystal display panel of the first embodiment, the circuit layer 104, the first alignment layer 105, the filter layer 203, the second alignment layer 204, etc. can be formed substantially under the same conditions as those for the liquid crystal display panel in which the insulating substrate is a glass substrate. Therefore, the method of manufacturing the liquid crystal display panel according to the first embodiment can sufficiently ensure the reliability of the circuit layer 104, etc.

Further, in the TFT substrate 1 of the liquid crystal display panel of the first embodiment, the first polarizer 102 is disposed between the first insulating substrate 100 and the circuit layer 104 but the first polarizer 102 may also be disposed, for example, in the circuit layer 104 or between the circuit layer 104 and the first alignment layer 105. However, when the first polarizer 102 is disposed in the circuit layer 104 or between the circuit layer 104 and the first alignment layer 105, since the presence of the first polarizer 102 gives an undesired effect on the electric field applied to the liquid crystal 3 upon operation of the liquid crystal display device, it is necessary, for example, to increase the driving voltage. Accordingly, it is preferred that the first polarizer 102 is formed before forming the circuit layer 104 and disposed between the first insulating substrate 100 and the circuit layer 104.

Further, in the liquid crystal display panel of the first embodiment, the first insulating substrate 100 and the second insulating substrate 200 may be formed of different resins. However, use of different resins tends to result, for example, warp of the liquid crystal display panel by the difference of the coefficient of thermal expansion or breakage of the circuit layer 104 by stresses. Accordingly, it is preferred to form the first insulating substrate 100 and the second insulating substrate 200 of an identical resin.

Further, in the method of manufacturing the liquid crystal display panel of the first embodiment, while an example of forming the semiconductor layer 104a of the thin-film transistor Tr with amorphous silicon has been mentioned as an example, this is not limitative but it will be apparent that the semiconductor layer of the thin-film transistor may also be formed of polycrystal silicon.

Figure 5:
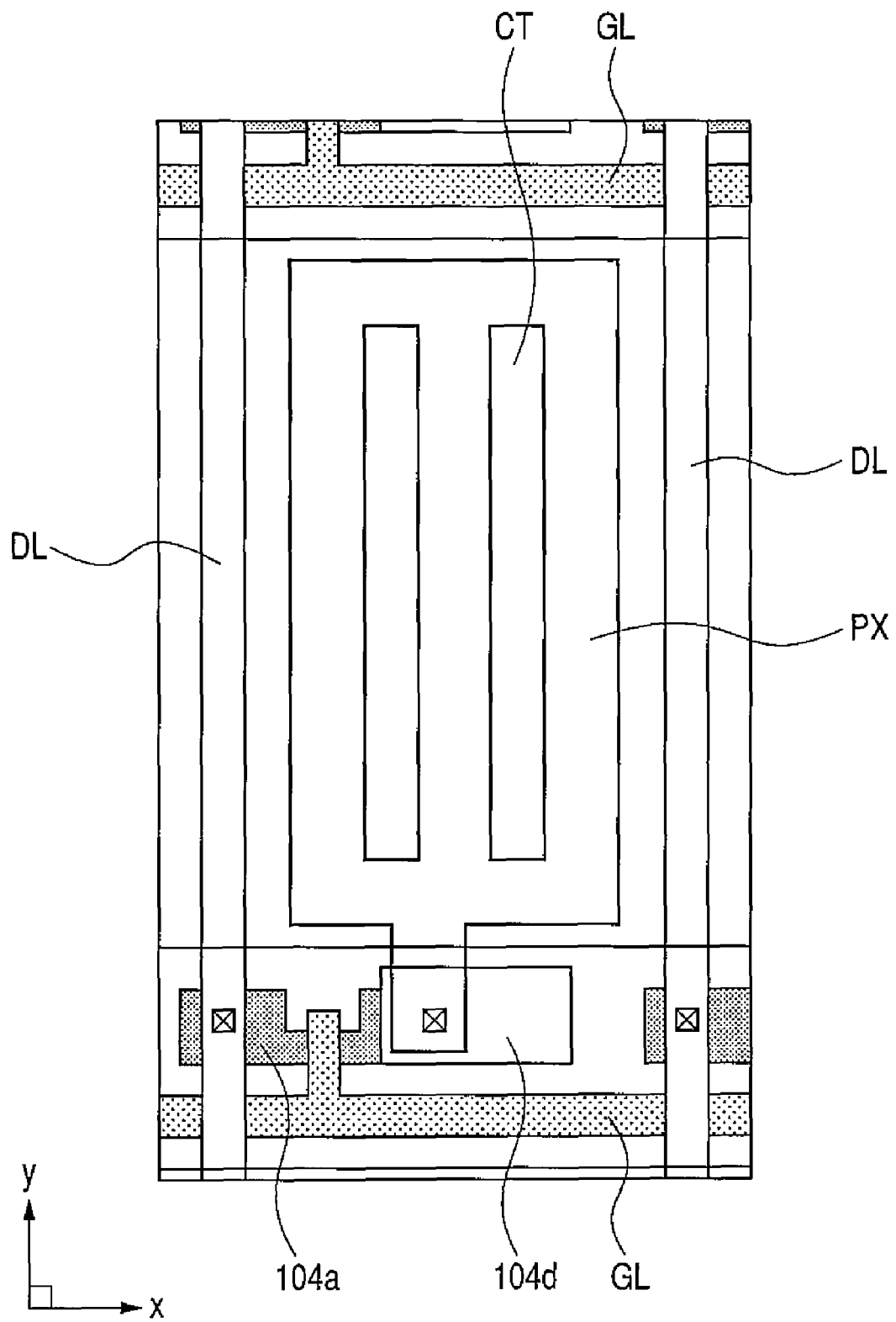
FIG. 5 is a schematic plan view showing a first modified example for a planar constitution of a TFT substrate in a liquid crystal display panel of the first embodiment.

FIG. 5 is a schematic plan view showing a first modified example for the planar constitution of a TFT substrate in the liquid crystal display panel of the first embodiment.

In the first embodiment, a constitution, for example, as shown in FIG. 3A has been described as an example of the planar constitution of one pixel in the TFT substrate 1. However, the planar constitution of one pixel in the TFT substrate 1 is not restricted thereto but may also have a constitution as shown in FIG. 5. The constitution shown in FIG. 5 is different from the constitution shown in FIG. 3A is the planar shape of the pixel electrode PX. In the example shown in FIG. 3A, three strip portions extending in the direction y are connected only on the side near the source electrode 104*d*. On the contrary, in the example shown in FIG. 5, three strip portions extending in the direction y are connected both on the sides near the source electrode 104*d* and on the side opposite thereto, it is configured such that openings extending in the direction y are disposed by the number of two in one flat plate pixel electrode PX.

While the pixel electrode PX shown in FIG. 3A and FIG. 5 have three strips extending in the direction y, this is not limitative but may of course be in a planar shape having more number of strip portions.

Further, in the pixel electrode PX shown in FIG. 3A and FIG. 5, while the strip portion extends linearly in the direction y, this is not limitative but the strip portion may of course extend in a direction at a predetermined angle to the direction y. Furthermore, in the pixel electrode PX, the strip portion may of course extend also in a dog-leg shape.

Figure 6A:
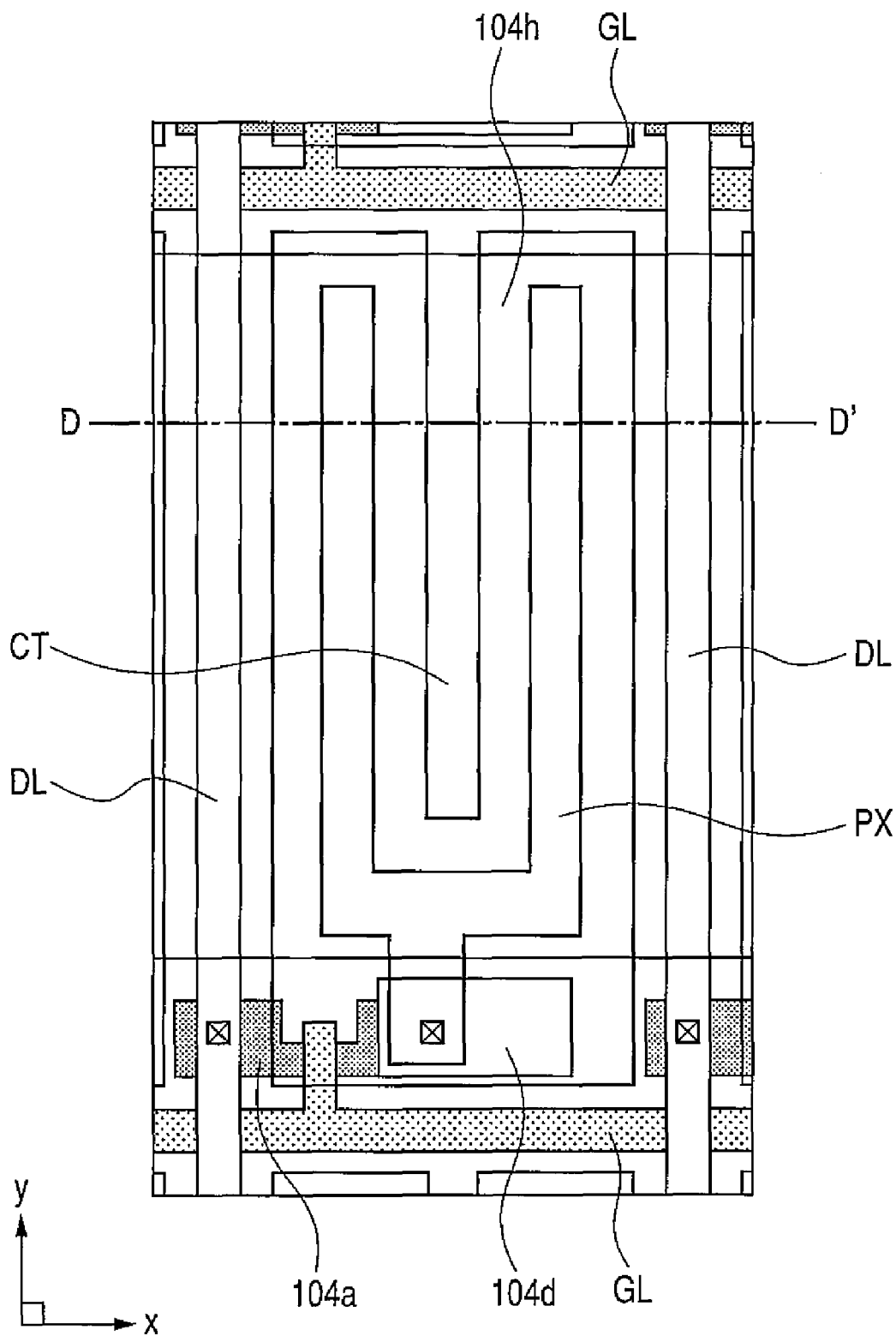
FIG. 6A is a schematic plan view showing a second modified example for a planar constitution of a TFT substrate in a liquid crystal display panel of the first embodiment.
Figure 6B:
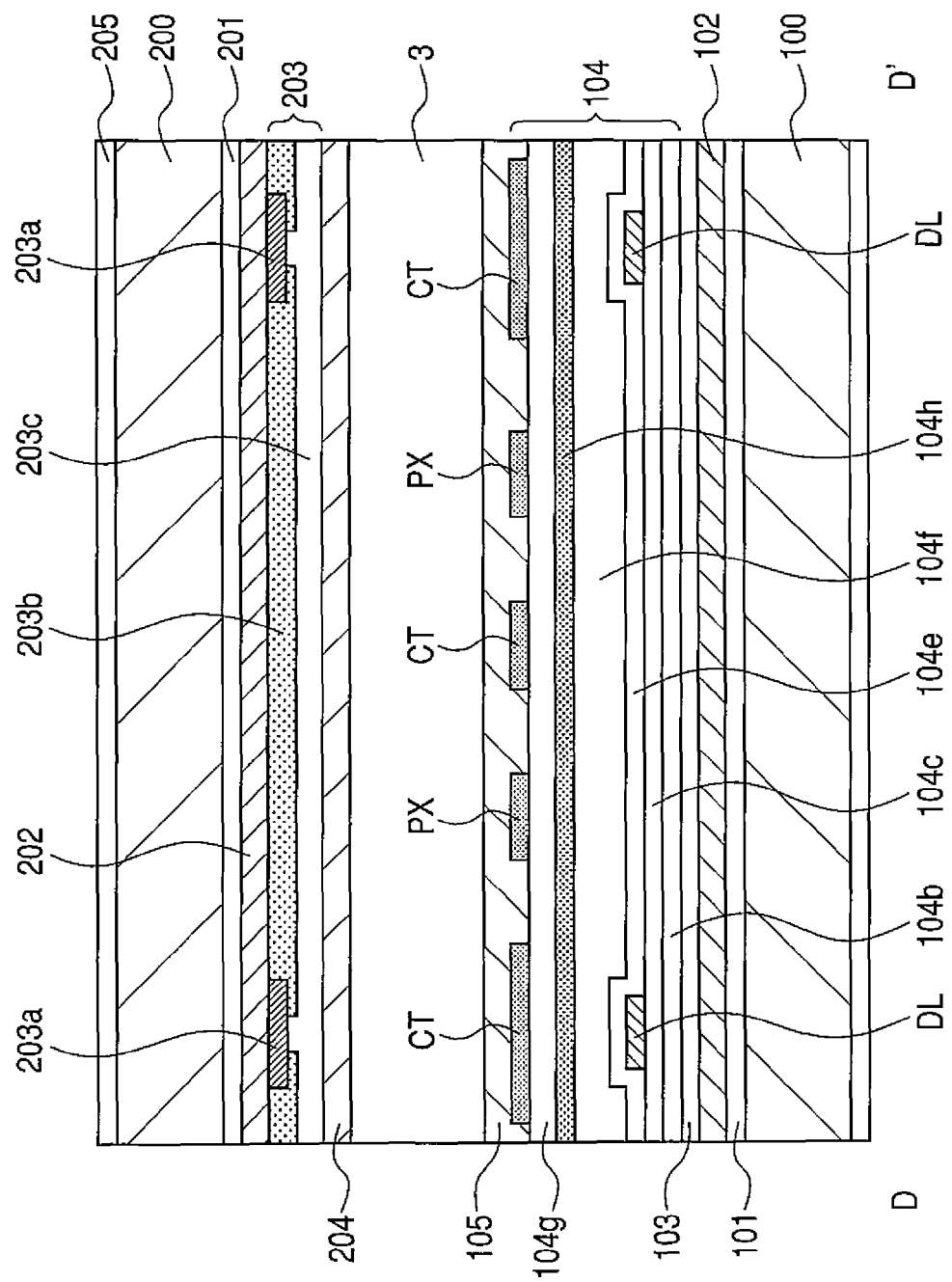
FIG. 6B is a schematic plan view showing an example of a cross sectional constitution along line D-D' in FIG. 6A.

FIG. 6A and FIG. 6B are schematic views showing a second modified example for the constitution of a TFT substrate in the liquid crystal display panel of the first embodiment.

FIG. 6A is a schematic plan view showing a second modified embodiment in the planar constitution of a TFT substrate in the liquid crystal display panel of the first embodiment. FIG. 6B is a schematic plan view showing an example of a cross sectional constitution along line D-D' in FIG. 6A.

The first embodiment describes a case where a counter electrode CT and a pixel electrode PX are stacked by way of a fifth insulating layer 104*b*, for example, as shown in FIG. 3D as an example of the constitution for the TFT substrate in the liquid crystal display panel of an in-plane-switching mode and a transmissive type. However, the constitution and the manufacturing method described in the first embodiment are not restricted thereto but may of course be applied also to a case, for example, as shown in FIG. 6A and FIG. 6B in which the counter electrode CT and the pixel electrode PX are disposed on an identical surface of the fifth insulating layer 104*g*. In the example shown in FIG. 6A and FIG. 6B, a transparent conductive layer 104*h* is disposed, for example, between the fourth insulating layer 104*f* and the fifth insulating layer 104*g* for forming a storage capacitance $C_{ST}$, such a conductive layer 104*h* may of course be saved.

Figure 7A:
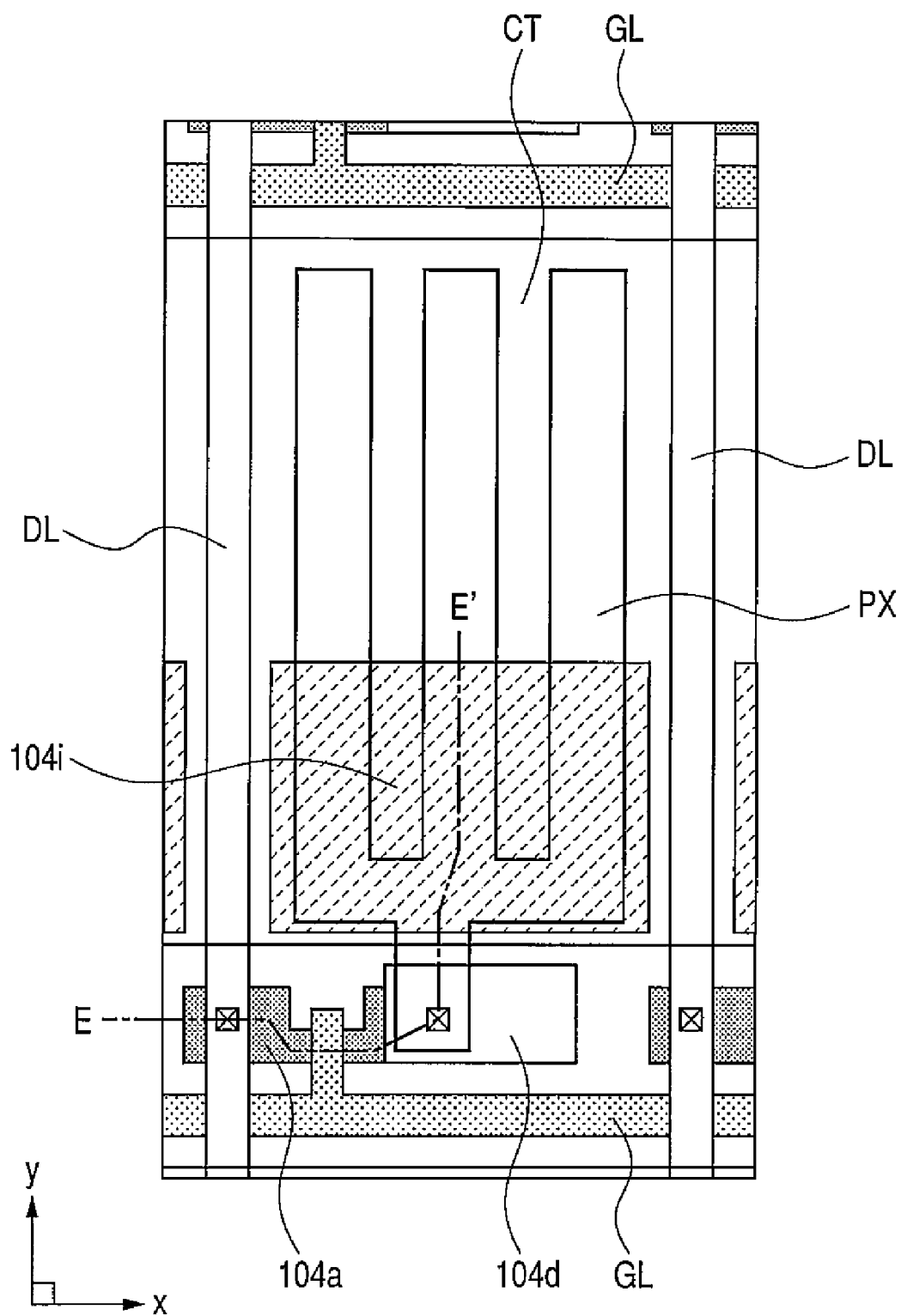
FIG. 7A is a schematic plan view showing a first applied example of a planar constitution of a TFT substrate in a liquid crystal display panel of the first embodiment.

FIG. 7A to FIG. 7C are schematic views showing a first applied example for the constitution of a TFT substrate in the liquid crystal display panel of the first embodiment.

FIG. 7A is a schematic plan view showing a first applied example for the planar constitution of a TFT substrate in the liquid crystal display panel of the first embodiment. FIG. 7B is a schematic plan view showing an example for the cross sectional constitution along line E-E' in FIG. 7A. FIG. 7C is a schematic plan view showing another example for the cross sectional constitution along line E-E' in FIG. 7A.

The first embodiment describes a transmissive liquid crystal display panel as an example but the method of manufacturing the liquid crystal display panel described in the first embodiment is applicable, for example, also to a semi-transmissive liquid crystal display panel. One pixel in the TFT substrate 1 of the semi-transmissive liquid crystal display panel has a constitution, for example, as shown in FIG. 7A and FIG. 7B. The planar constitution shown in FIG. 7A is basically identical with the planar constitution shown in FIG. 3A and different from the planar constitution shown in FIG. 3A in that a reflecting layer 104*i* is disposed partially on the counter electrode CT. The reflecting layer 104*i* is formed, for example, by stacking a thin film of molybdenum (Mo) and a thin film of aluminum (Al). In the liquid crystal display panel of such a constitution, the portion having the refractive layer 104*i* disposed thereon operates in the same manner as the reflective liquid crystal display panel and other portions operate in the same manner as in the transmissive liquid crystal display panel.

Further, in a case of the semi-transmissive type liquid crystal display panel, an unevenness may be formed to the surface (surface opposing to the liquid crystal 3) of the reflecting layer 104*i*, for example, as shown in FIG. 7C. When the unevenness is disposed on the surface of the reflecting layer 104*i*, a light incident on the side of the counter substrate 2 (external light) is diffused (scattered) when it is reflected on the reflecting layer 104*i* thereby capable improving the efficiency of utilizing the external light.

Further, in the examples illustrated so far, the thin-film transistor Tr has a top gate structure having a scanning line GL (gate electrode) above the semiconductor layer 104*a* as viewed from the first insulating substrate 100 but this is not limitative and the thin-film transistor Tr may of course have a bottom gate structure having a semiconductor layer 104*a* above the scanning line GL (gate electrode) as viewed from the first insulating substrate 100.

Figure 8A:
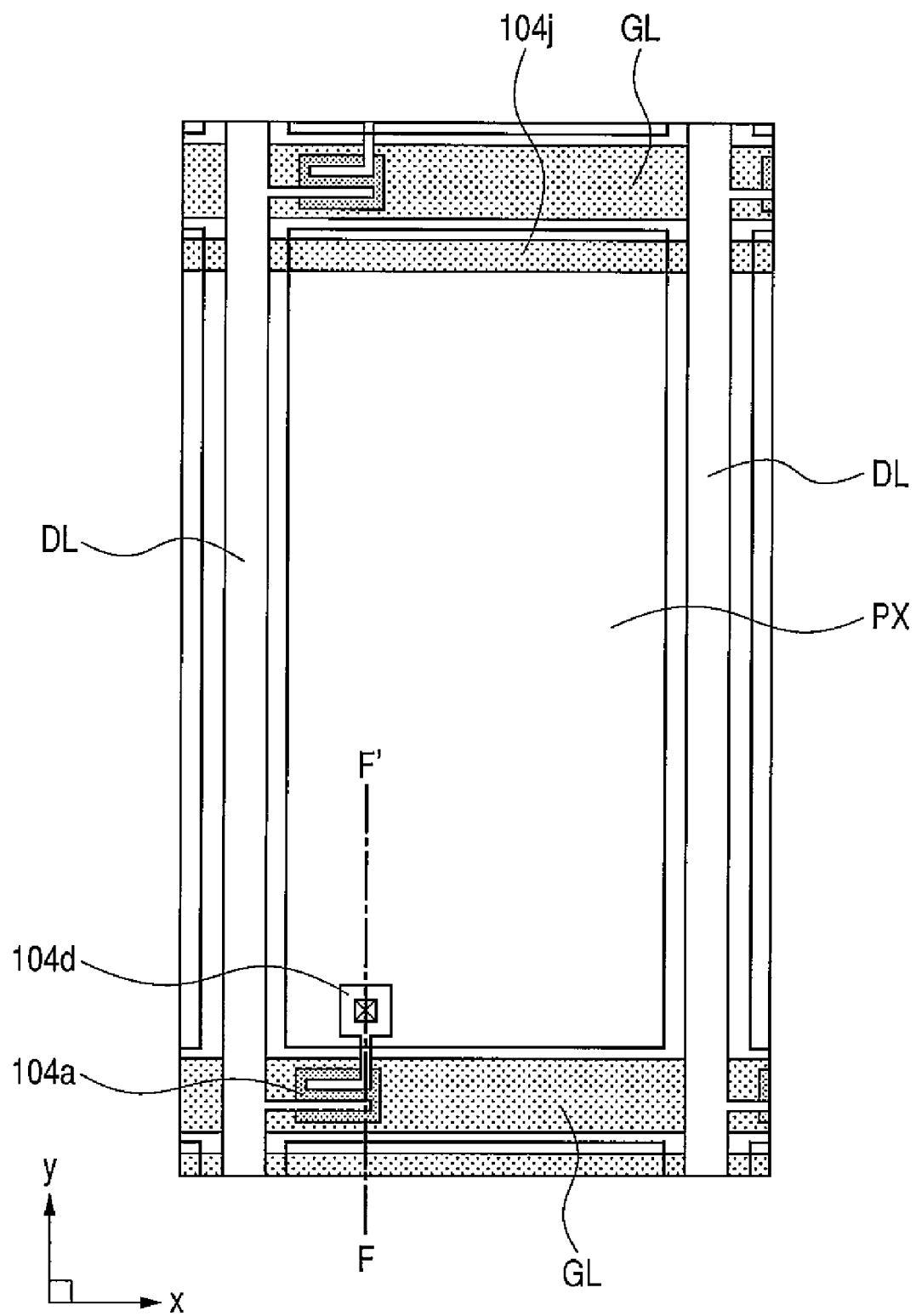
FIG. 8A is a schematic plan view showing a second applied example for a planar constitution of a TFT substrate in a liquid crystal display panel of the first embodiment.
Figure 8B:
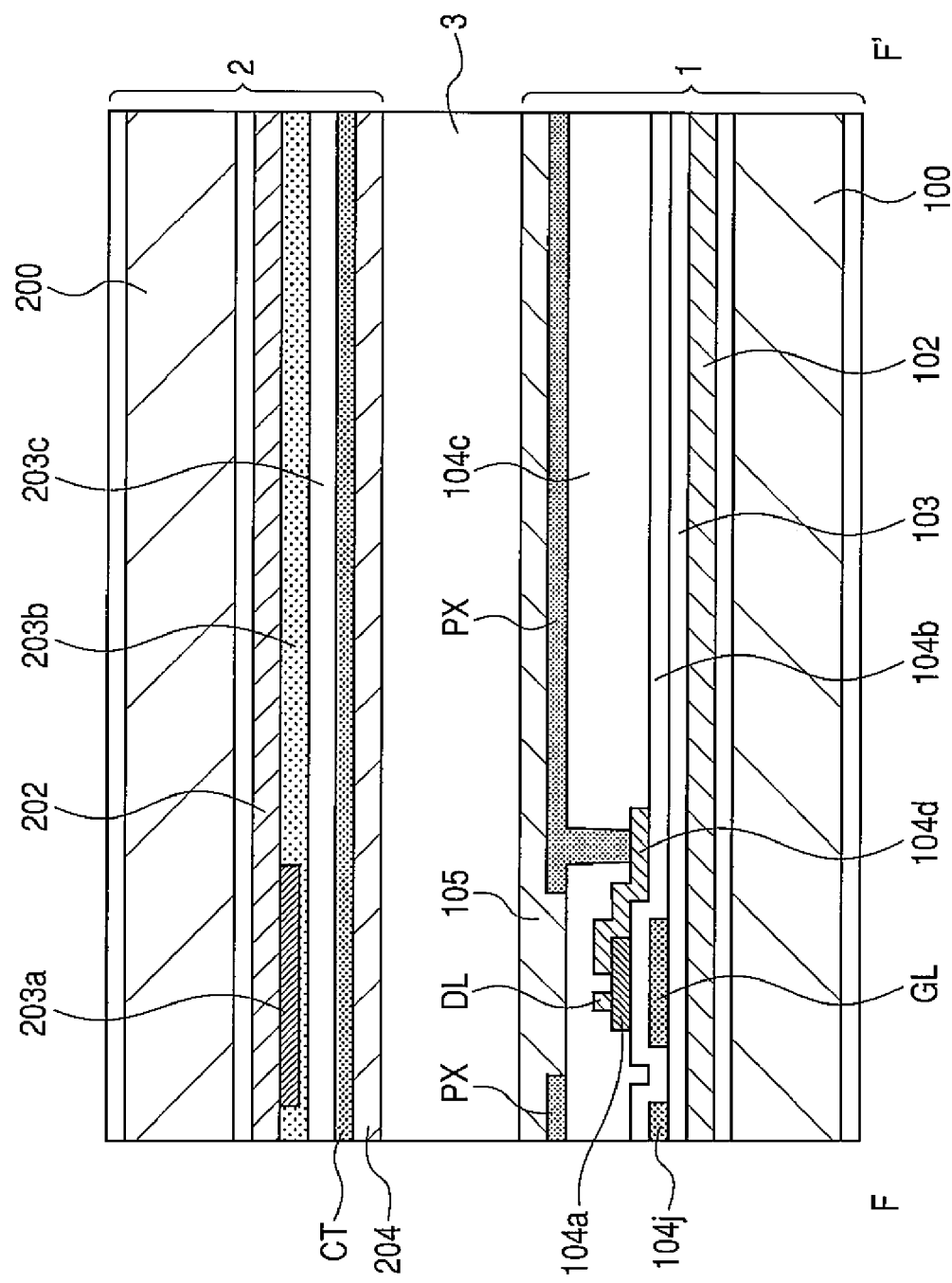
FIG. 8B is a schematic plan view showing an example of a cross sectional constitution along line F-F' in FIG. 8A.

FIG. 8A and FIG. 8B are schematic views showing a second applied example for the constitution of a TFT substrate in the liquid crystal display panel of the first embodiment.

FIG. 8A is a schematic plan view showing a second applied example for the planar constitution of a TFT substrate in the liquid crystal display panel of the first embodiment. FIG. 8B is a schematic cross sectional view showing an example for the cross sectional constitution along line F-F' in FIG. 8A.

In the first embodiment, the liquid crystal display panel of in-plane-switching mode has been described as an example but the method of manufacturing the liquid crystal display panel described in the first embodiment is applicable also to a liquid crystal display panel of a vertical alignment mode such as a TN mode. In the liquid crystal display panel of vertical alignment mode, for example, as shown in FIG. 8A and FIG. 8B, only the pixel electrode PX of the pixel electrode PX and the counter electrode CT for forming the pixel capacitance $C_{LC}$ is disposed to the circuit layer 104 of the TFT substrate 1, and the counter electrode CT is disposed to the counter substrate 2. In this case, for example, a storage capacitance line 104*j* parallel with the scanning line GL is disposed to the circuit layer 104 of the TFT substrate 1, and a portion of the pixel electrode PX is overlapped with the storage capacitance line 104*j* thereby forming the storage capacitance $C_{ST}$.

Further the pixel electrode PX in this case is not limited only to the simple plate shape as shown in FIG. 8A but it may be in a comb shape having plural slits extending in a predetermined direction.

Further, in the example shown in FIG. 8A and FIG. 8B, while the thin-film transistor Tr has a bottom gate structure having a semiconductor layer 104*a* above the scanning line GL (gate electrode) as viewed from the first insulating substrate 100, this is not limitative but the structure of the thin-film transistor Tr may of course have a top gate structure as shown, for example, in FIG. 3A having a scanning line GL (gate electrode) above the semiconductor layer 104a as viewed from the first insulating substrate 100.

Furthermore, the method of manufacturing the liquid crystal display panel described in the first embodiment can of course be applied also to a reflective liquid crystal display panel although not illustrate in the drawing.

As described above, the method of manufacturing the liquid crystal display panel described in the first embodiment is applicable irrespective of the driving mode or the constitution of the circuit layer 104.

Figure 9A:
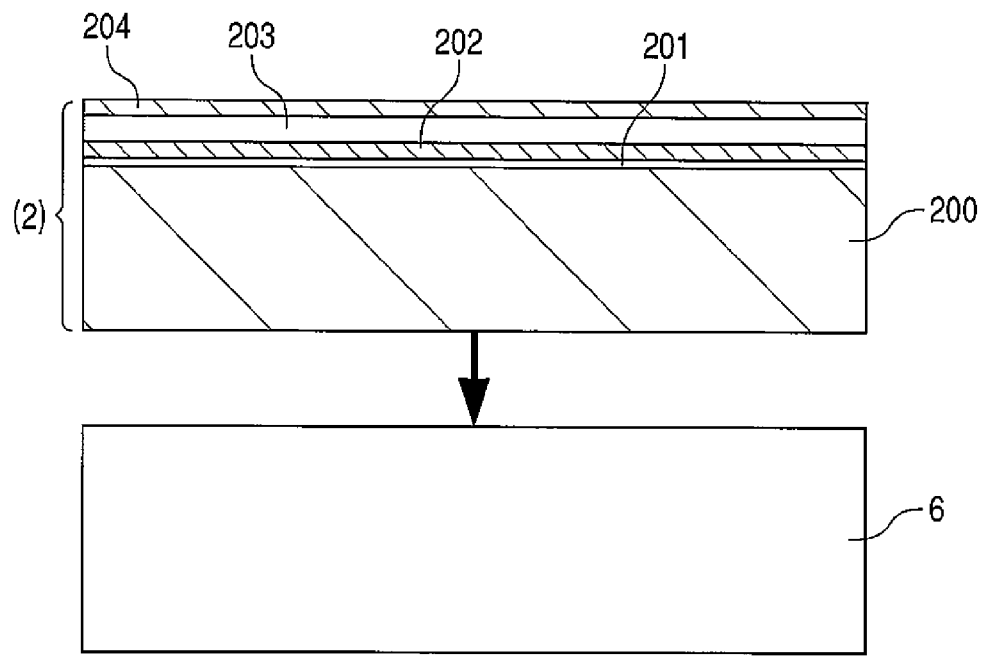
FIG. 9A is a schematic cross sectional view showing a cross sectional constitution just after separating the second supporting substrate from a counter substrate.
Figure 9B:
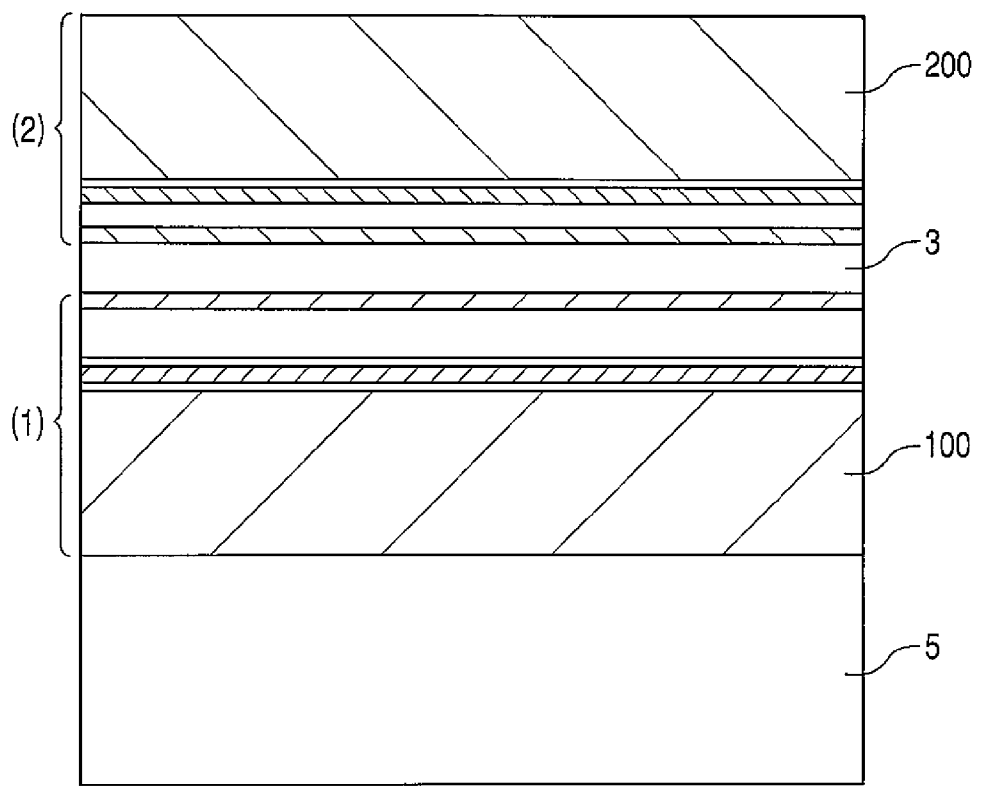
FIG. 9B is a schematic cross sectional view showing a cross sectional constitution just after bonding a TFT substrate and a counter substrate to each other and sealing a liquid crystal.

FIG. 9A and FIG. 9B are schematic views showing a modified example for the method of manufacturing the liquid crystal display panel of the first embodiment.

FIG. 9A is a schematic cross sectional view showing a cross sectional constitution just after separating a second supporting substrate from a counter substrate. FIG. 9B is a schematic cross sectional view showing a cross sectional constitution just after bonding a TFT substrate and a counter substrate to each other and sealing a liquid crystal therebetween.

The method of manufacturing the liquid crystal display panel of the first embodiment is not limited to the procedures described above but, instead, the second supporting substrate 6 may be separated from the second insulating substrate 200 before bonding the TFT substrate 1 and the counter substrate 2 to each other as shown, for example, in FIG. 9A. In this case, the step of bonding the TFT substrate 1 and the counter substrate 2 to each other and sealing the liquid crystal therebetween is effected, as shown in FIG. 9B, in a state of exposing the rear face of the second insulating substrate 200. Also in this case, the possibility of causing cracks to the circuit layer 104 in the course of manufacturing the liquid crystal display panel can be decrease by constituting such that the first supporting substrate 5 is separated from the insulating substrate 100 after bonding the TFT substrate 1 and the counter substrate 2 to each other.

When the second supporting substrate 6 is separated from the second insulating substrate 200 before bonding the TFT substrate 1 and the counter substrate 2 to each other, the fourth barrier layer 205 may also be formed, for example, to the rear face of the second insulating substrate 200 before bonding the TFT substrate 1 and the counter substrate 2 to each other.

Further, in the liquid crystal display panel of the first embodiment, each of the second barrier layer 106 and the fourth barrier layer 205 has not only the function of preventing moisture absorption to the first insulating substrate 100 and the second insulating substrate 200 but also has a function, for example, as the protective layer for preventing damage to the rear face of the first insulating substrate 100 and the second insulating substrate 200. Accordingly, it is preferred to dispose the second barrier layer 106 and the fourth barrier layer 205 as in the liquid crystal display panel of the first embodiment. However, for example, in a case where the first insulating substrate 100 and the second insulating substrate 200 comprise a resin which is less hygroscopic and suffers from less damages, the second barrier layer 106 and the fourth barrier layer 205 may be saved.

SECOND EMBODIMENT

Figure 10:
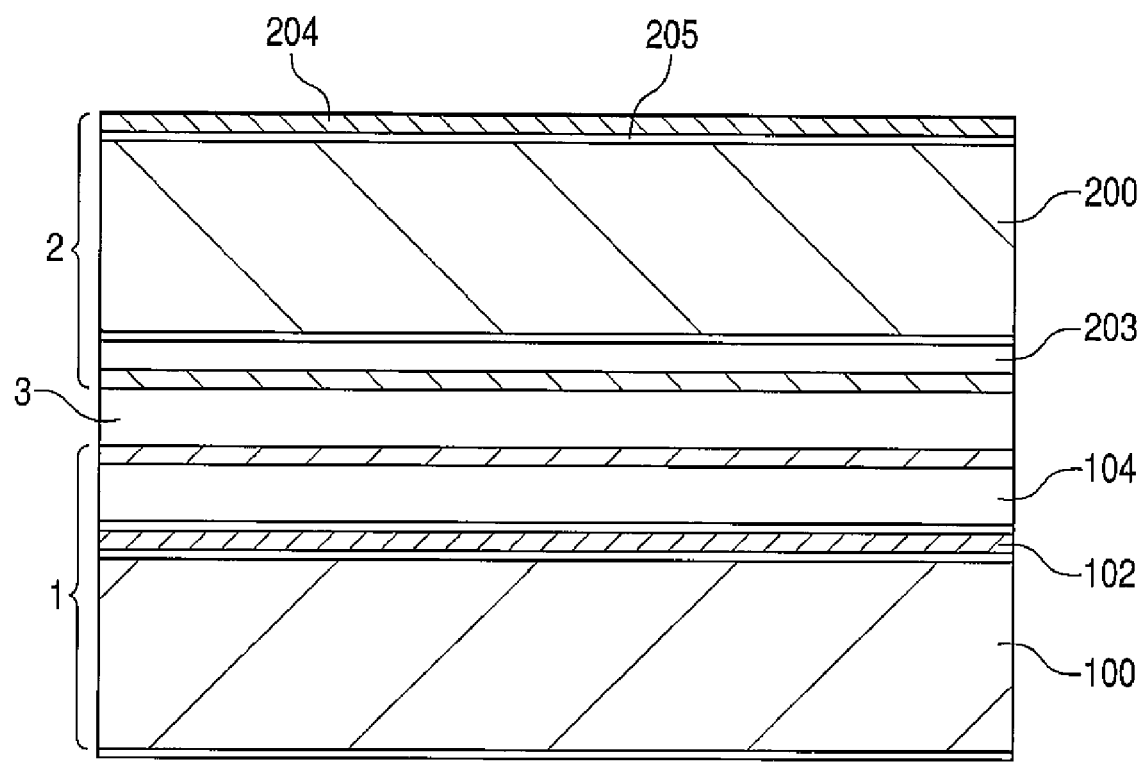
FIG. 10 is a schematic cross sectional view showing an example for a cross sectional constitution of a liquid crystal display panel of a second embodiment according to the invention.

FIG. 10 is a schematic cross sectional view showing an example for the cross sectional constitution of a liquid crystal display panel of a second embodiment according to the invention.

FIG. 10 is a cross sectional view for a portion extracted from a cross sectional constitution along line A-A' in FIG. 2A.

In the first embodiment, a resin of one of the polybenzoxazole containing the alicyclic structure, the polyamideimide containing the alicyclic structure, the polyimide containing the alicyclic structure, and the polyamide containing the alicyclic structure is used both for the first insulating substrate 100 of the TFT substrate 1 and the second insulating substrate 200 of the counter substrate 2. However, the step effected at the highest temperature in the steps of forming the counter substrate 2 is usually a step of forming a color filter 203b in which the temperature is about 200° C. Accordingly, it may suffice that the second insulating substrate 200 has heat resistance to the temperature of about 200° C. Therefore, it is not necessary that the second insulating substrate 200 is formed of the resin containing the alicyclic structure described above but it may also be a transparent resin with an extremely small retardation such as polycarbonate.

Retardation of a polycarbonate film at a thickness of 120 μm is 2 nm or less. Accordingly, in a case of using the polycarbonate film for the second insulating substrate 200, the counter substrate 2 can also be constituted, for example, as shown in FIG. 10. That is, a second polarizer 202 may also be disposed to the rear face for the surface of the second insulating substrate 200 (surface opposed to the liquid crystal 3).

The cross sectional constitution shown in FIG. 10 is an example of a cross sectional constitution of a liquid crystal display panel of in-plane-switching mode, and a circuit having a scanning line GL, a signal line DL, a thin-film transistor Tr, a pixel electrode PX, a counter electrode CT, etc. are formed in the circuit layer 104 of the TFT substrate 1. Further, the constitution of the TFT substrate 1 containing the circuit layer 104, and the constituting of the filter layer 203, the second alignment layer 204, etc. of the counter substrate 2 are as described in the first embodiment.

FIG. 11A to FIG. 11D are schematic views showing the method of manufacturing a liquid crystal display panel of the second embodiment.

Figure 11A:
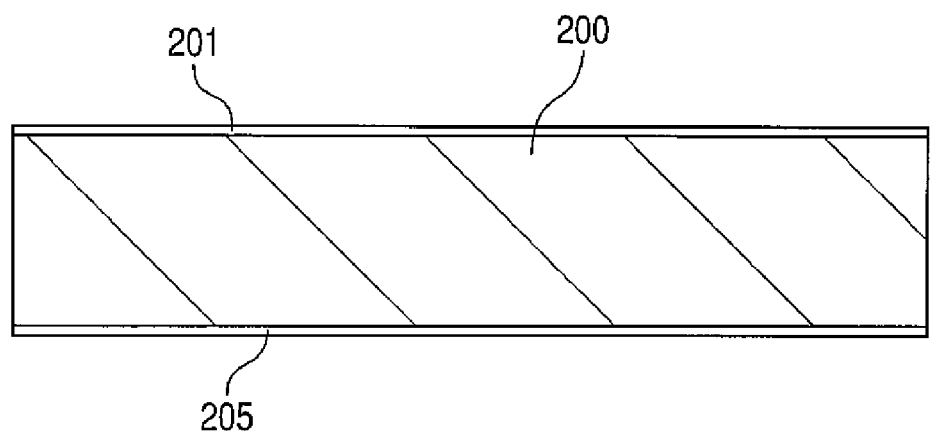
FIG. 11A is a schematic cross sectional view showing a cross sectional constitution just after forming a third barrier layer and a fourth barrier layer to a second insulating substrate.
Figure 11B:
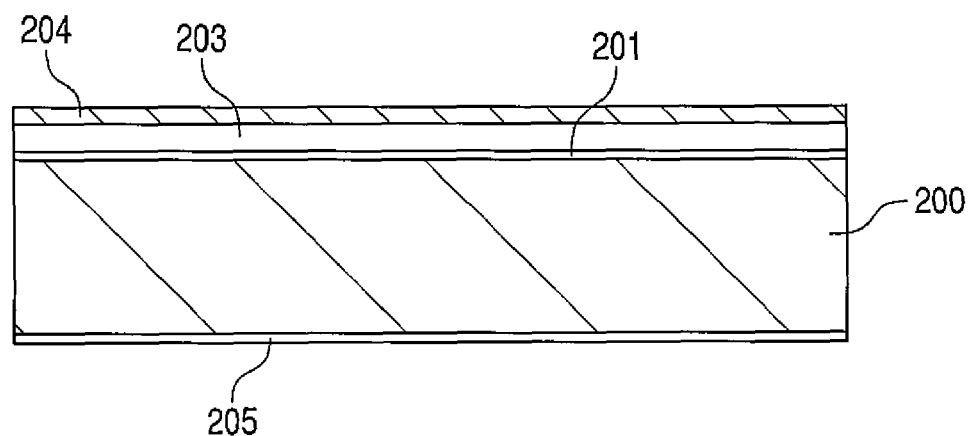
FIG. 11B is a schematic cross sectional view showing a cross sectional constitution just after forming a color filter layer and a second alignment layer above a third barrier layer.
Figure 11C:
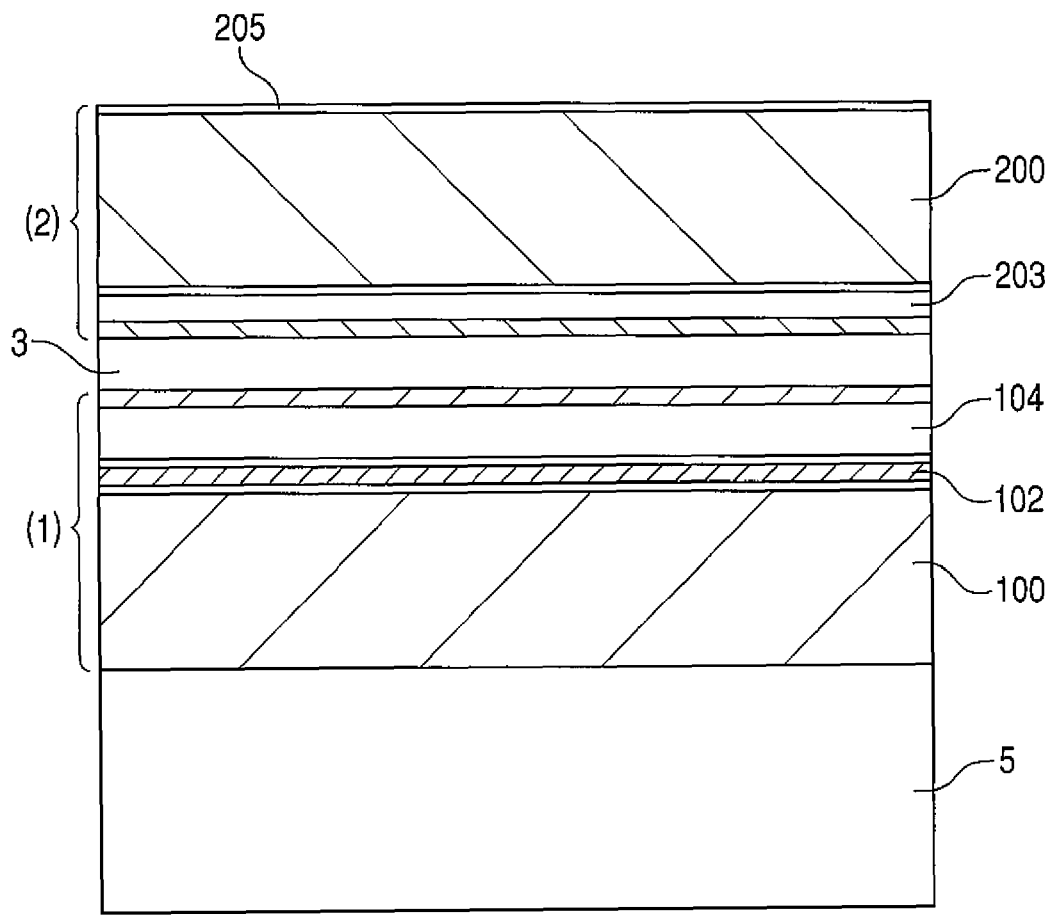
FIG. 11C is a schematic cross sectional view showing a cross sectional constitution just after bonding a TFT substrate and a counter substrate to each other and sealing a liquid crystal.
Figure 11D:
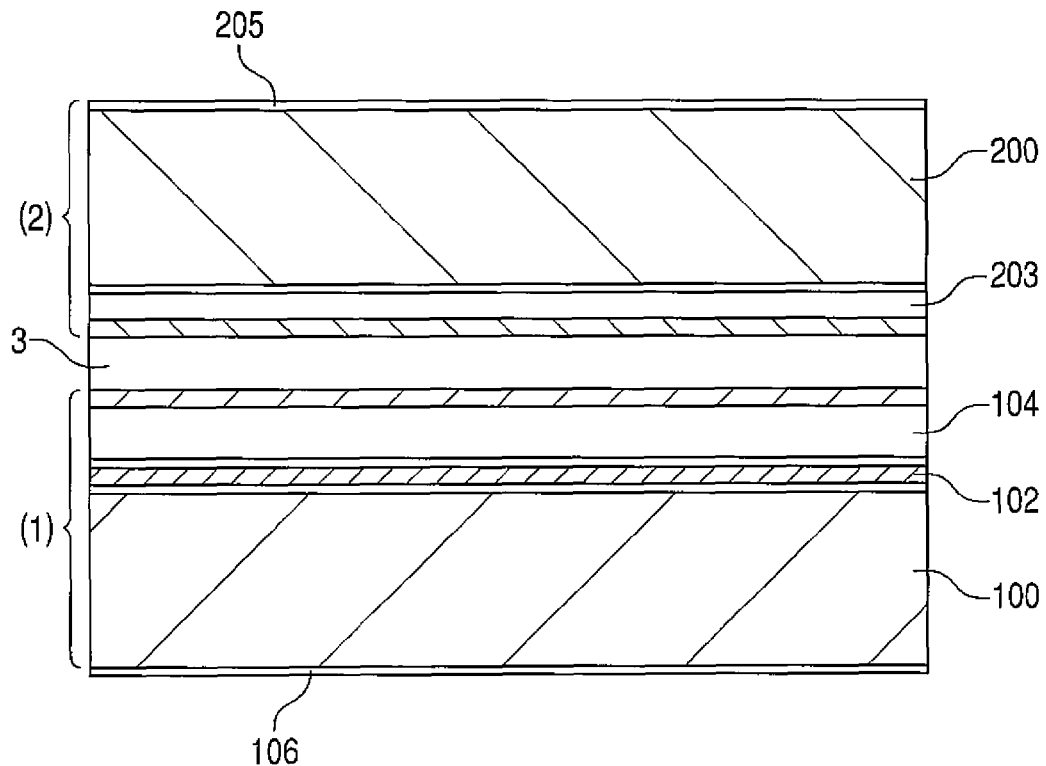
FIG. 11D is a schematic cross sectional view showing a cross sectional constitution just after separating the first supporting substrate and forming the second barrier layer.

FIG. 11A is a schematic cross sectional view showing a cross sectional constitution just after forming a third barrier layer and a fourth barrier layer to a second insulating substrate. FIG. 11B is a schematic cross sectional view showing a cross sectional constitution just after forming a color filter layer and a second alignment layer above the third barrier layer. FIG. 11C is a schematic cross sectional view showing a cross sectional constitution just after bonding a TFT substrate and a counter substrate to each other and sealing a liquid crystal. FIG. 11D is a schematic cross sectional view showing a cross sectional constitution just after separating a first supporting substrate and forming a second barrier layer.

In the method of manufacturing the liquid crystal display panel of the second embodiment, since the step of forming a TFT substrate 1 may be effected by the procedures described in the first embodiment, descriptions for the step of forming the TFT substrate 1 are to be omitted.

In the step of forming the counter substrate 2 in the method of manufacturing the liquid crystal display panel of the second embodiment, a third barrier layer 201 is at first formed to one of the surfaces of a polycarbonate film of 120 μm thickness used as the a second insulating substrate 200 and a fourth barrier layer 205 is formed to the rear face thereof. The third barrier layer 201 and the fourth barrier layer 205 are formed respectively by depositing silicon oxide (SiO) of about 100 nm thickness using, for example, a CVD method.

Then, as shown, for example, in FIG. 11B, a filter layer 203 and a second alignment layer 204 are formed above the third barrier layer 201. As described in the first embodiment, the filter layer 203 is a layer having, for example, a black matrix layer 203a, a color filter 203b and an over-coating layer 203c and they are formed respectively by the same procedures as those in the existent method of forming the counter substrate 2. Further also the second alignment layer 204 is formed by the same procedures as those in the existent method of forming the counter substrate 2.

Then, as shown in FIG. 11C, the TFT substrate 1 formed by the same procedures as described in the first embodiment (excluding the second barrier layer 106) and the counter substrate 2 formed by the same procedures as those described above (excluding the second polarizer 202) are bonded to each other and a liquid crystal 3 is sealed. The procedures for bonding the TFT substrate 1 and the counter substrate 2 to each other and the procedures for sealing the liquid crystal are performed in the same procedures as those in the existent method of manufacturing the liquid crystal display panel.

Then, as shown in FIG. 1D, the first supporting substrate 5 is separated from the first insulating substrate 100 and a second barrier layer 106 is formed to the rear face of the first insulating substrate 100. Since the method of separating the first supporting substrate 5 and the method of forming the second barrier layer 106 are as has been described in the first embodiment, detailed descriptions therefor are to be omitted.

Then, for example, as shown in FIG. 10, a second polarizer 202 is disposed to the rear face of the second insulating substrate 200, that is, above the fourth barrier layer 205. In this case, it is not necessary that the second polarizer 202 is a wire grid polarizer as described in the first embodiment but a usual polarizer film or polarizer plate used in existent liquid crystal display devices, for example, a polarizer film or a polarizer plate formed by stretching an iodine dyed polyvinyl alcohol can be used. Accordingly, when the second polarizer 202 is disposed, it may suffice, for example, that the polarizer film is bonded by means of a bonding material or adhesive material such that it is in a cross nicol or parallel nicol relation with the first polarizer 102.

According to the liquid crystal panel of the second embodiment, the second insulating substrate 200 is disposed between the first polarizer 102 and the second polarizer 202. Since the retardation of the second insulating substrate 200 is extremely small, the display quality of the liquid crystal display device is scarcely deteriorated by retardation. Accordingly, the liquid crystal display panel of the second embodiment can further reduce the thickness and reduce the weight of the liquid crystal display device.

Further, according to the method of manufacturing the liquid crystal display panel of the second embodiment, after bonding the TFT substrate 1 and the counter substrate 2 to each other, the first supporting substrate 5 is separated from the insulating substrate 100. Accordingly, the method of manufacturing the liquid crystal display panel of the second embodiment can decrease the possibility of damaging the circuit layer 104 and can improve the yield in the manufacture of the liquid crystal display panel.

Further, according to the method of manufacturing the liquid crystal display panel of the second embodiment, the second supporting substrate 6 is not necessary and a usual polarizer film or a polarizer plate can be used as the second polarizer 202 upon preparation of the counter substrate 2. Accordingly, the method of preparing the counter substrate 2 is made simpler compared with the manufacturing method of the first embodiment. Accordingly, the method of manufacturing the liquid crystal display panel of the second embodiment can suppress increase in the cost of manufacturing the liquid crystal display panel.

Further, while detailed descriptions for the constitution of the circuit layer 104 of the TFT substrate 1, etc. are omitted in the second embodiment, it is apparent that the method of manufacturing the liquid crystal display panel of the second embodiment is applicable irrespective of the circuit layer 104 in the same manner as in the manufacturing method described for the first embodiment. That is, the method of manufacturing the liquid crystal display panel of the second embodiment is applicable to the liquid crystal display panel of in-plane-switching mode or to the liquid crystal display panel of vertical alignment mode. Further, the method of manufacturing the liquid crystal display panel of the second embodiment is applicable to any of transmissive liquid crystal display panel, semi-transmissive liquid crystal display panel or reflective liquid crystal display panel.

THIRD EMBODIMENT

FIG. 12A to FIG. 12D are schematic views showing a method of manufacturing a liquid crystal display panel of a third embodiment according to the invention.

Figure 12A:
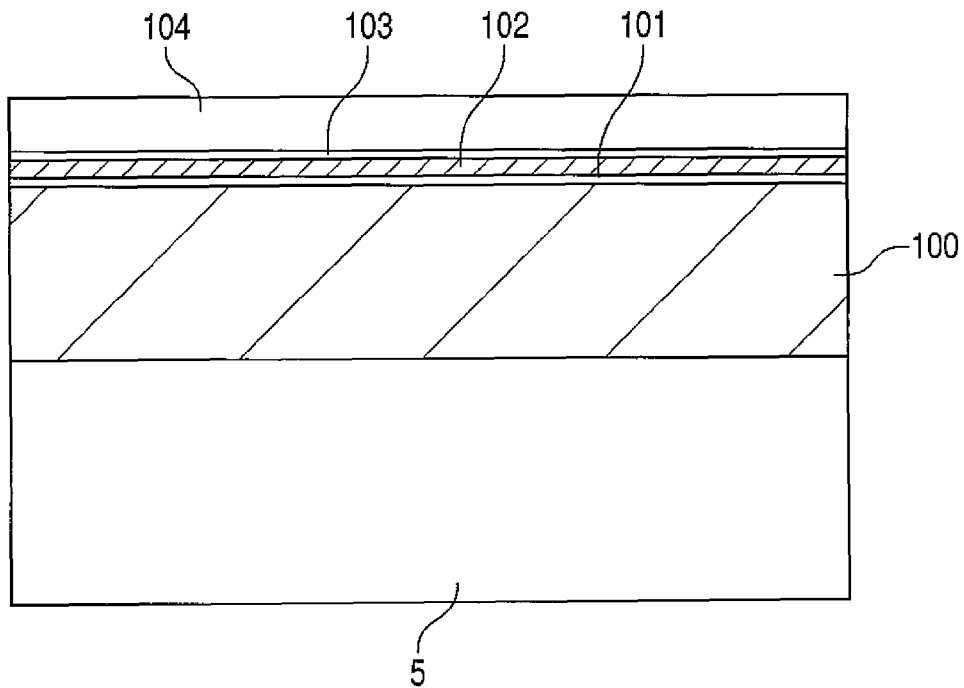
FIG. 12A is a schematic cross sectional view showing a cross sectional constitution just after forming from the first insulating substrate to the circuit layer above the first supporting substrate.
Figure 12B:
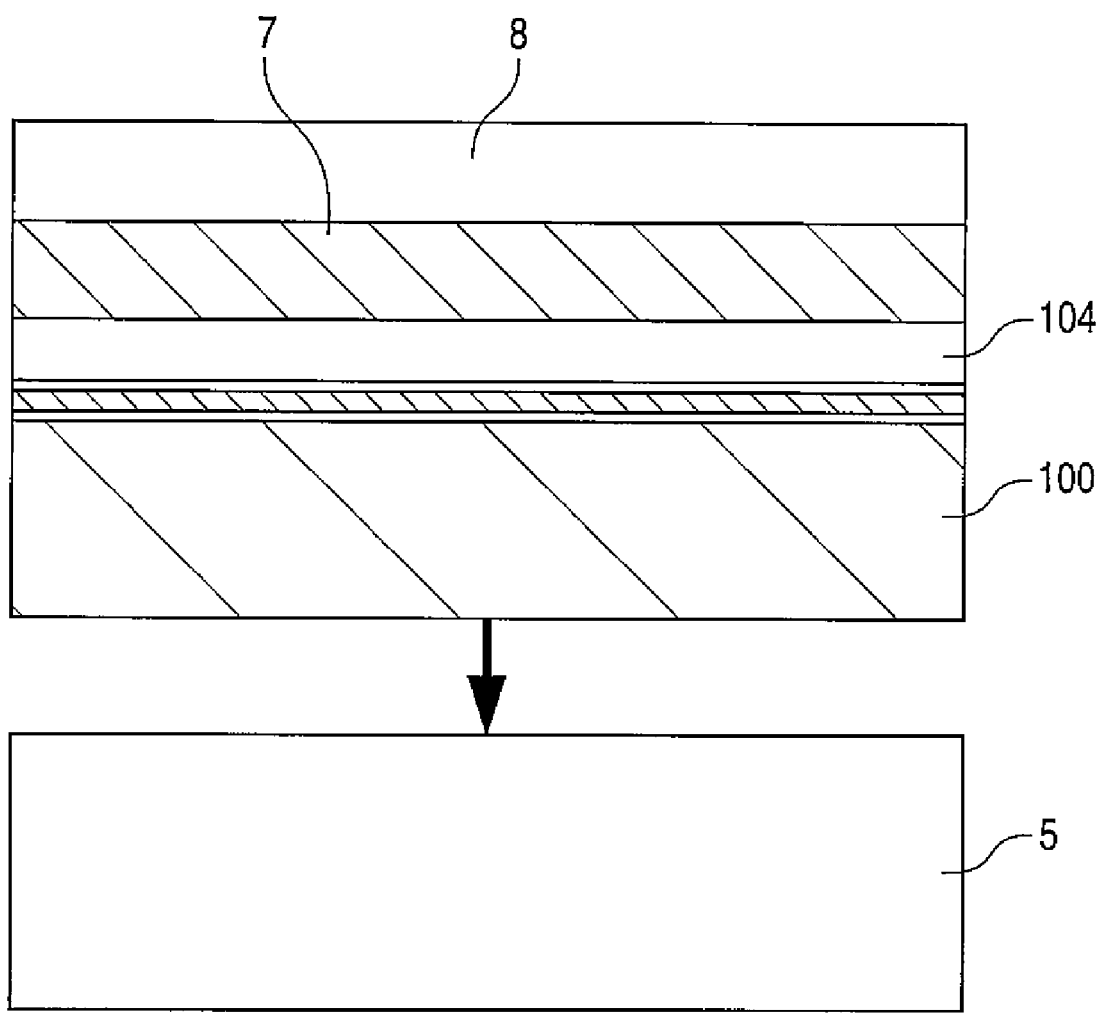
FIG. 12B is a schematic cross sectional view showing a cross sectional constitution just after separating the first supporting substrate from a first insulating substrate.
Figure 12C:
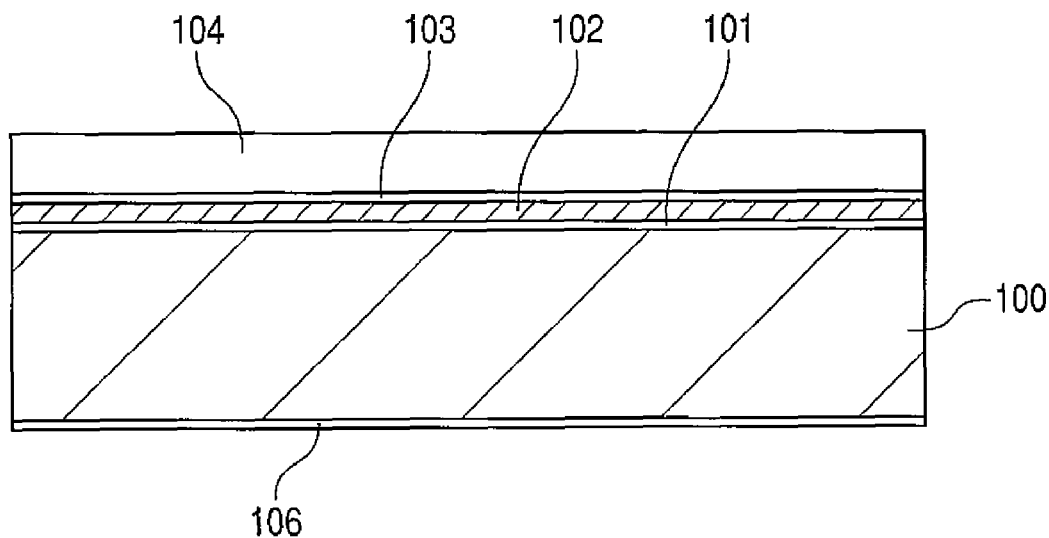
FIG. 12C is a schematic cross sectional view showing the cross sectional constitution just after forming a second barrier layer.
Figure 12D:
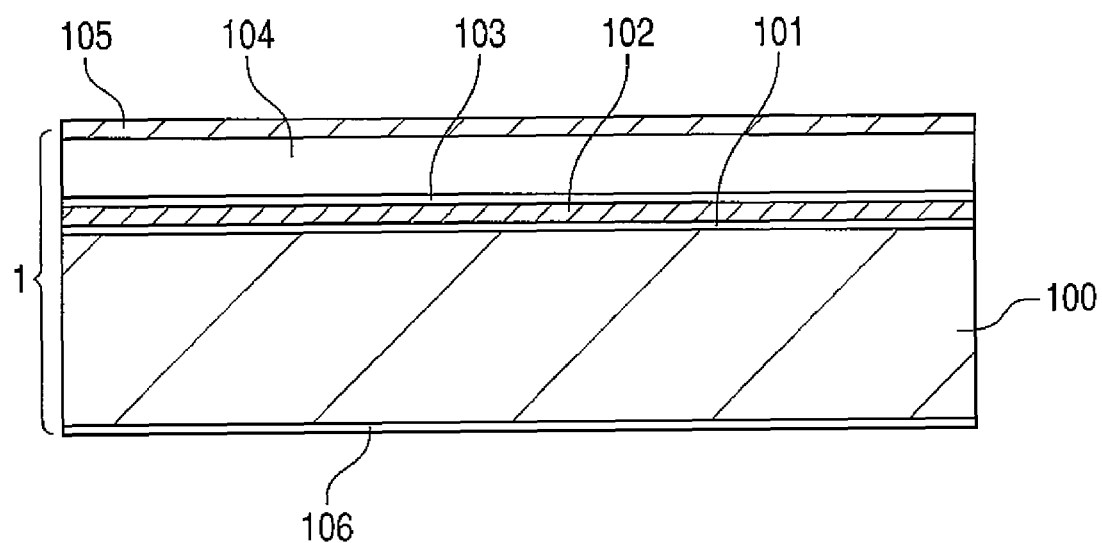
FIG. 12D is a schematic cross sectional view showing a cross sectional constitution just after forming the first alignment layer.

FIG. 12A is a schematic cross sectional view showing a cross sectional constitution just after forming from a first insulating substrate to a circuit layer above a first supporting substrate. FIG. 12B is a schematic cross sectional view showing a cross sectional constitution just after separating the first supporting substrate from the first insulating substrate. FIG. 12C is a schematic cross sectional view showing a cross sectional constitution just after forming a second barrier layer. FIG. 12D is a schematic cross sectional view showing a cross sectional constitution just after forming a first alignment layer.

The third embodiment 3 describes an example of another manufacturing method for the liquid crystal display panel with the constitution as shown in FIG. 2A to FIG. 2C.

The step of manufacturing a TFT substrate 1 in the method of manufacturing a liquid crystal display panel of the third embodiment is performed in the same procedures as those described for the first embodiment as far as the step of forming a circuit layer 104. That is, as shown in FIG. 12A, after forming a first insulating substrate 100 to the surface of a first supporting substrate 5, a first barrier layer 101, a first polarizer 102, an under coating layer 103, and a circuit layer 104 are formed above the first insulating substrate 100.

Then, as shown in FIG. 12B, a protective film 8 is bonded over the circuit layer 104 by using an adhesive 7, and the first supporting substrate 5 is separated from the first insulating substrate 100. In a case of separating the first supporting substrate 5, this is separated by irradiating UV-light thereby lowering the bonding strength between the first insulating substrate 100 and the first supporting substrate 5 as described in the first embodiment. For this purpose, an adhesive tape in which the adhesion force is lowered when heated to a predetermined temperature is used, for example, for the adhesive 7. As described above, breakage of the circuit layer 104 by the stress upon separating the first supporting substrate 5 can be prevented by separating the first supporting substrate 5 in a state of bonding the protective film 8 over the circuit layer 104.

Then, as shown in FIG. 12C, the protective film 8 and the adhesive 7 are separated from the circuit layer 104, and a second barrier layer 106 is formed to the rear face of the first insulating substrate 100. The first insulating substrate 100 is composed of a resin containing the alicyclic structure as described above and is formed to such a thickness as capable of ensuring the strength as the insulating substrate of the TFT substrate 1. Accordingly, even when the first supporting substrate 5 is separated in this stage, anxiety of breaking the circuit layer 104 can be lowered.

Further, in the third embodiment, while the second barrier layer 106 is formed to the rear face of the first insulating substrate 100 after separating the first supporting substrate 5, this is not limitative. It is apparent that the second barrier layer 106 may not be formed. Further, when the second barrier layer 106 is formed, the protective film 8 and the adhesive 7 may be separated from the circuit layer 104 for example, after forming the second barrier layer 106.

Then, as shown in FIG. 12D, a first alignment layer 105 is formed above the circuit layer 104.

Then, although not illustrated in the drawing, the TFT substrate 1 formed by the procedures described above and the counter substrate 2 formed by the procedures described in the first embodiment or the second embodiment are bonded to each other and the liquid crystal 3 is sealed to obtain a liquid crystal display panel.

While the present invention has been described specifically with reference to the embodiments described above, the invention is not restricted only to the embodiments but can be modified variously within a range not departing the gist of the invention.

For example, the resin material used for the first insulating substrate 100 or the first insulating substrate 100 and the second insulating substrate 200 are not restricted the polybenzoxazole containing the alicyclic structure, the polyamideimide containing the alicyclic structure, the polyimide containing the alicyclic structure, and the polyamide containing the alicyclic structure as described above but it may suffice that the material can satisfy the conditions described above. That is, in the liquid crystal display device of the invention, it is suffice that the first insulating substrate 100, or the first insulating substrate 100 and the second insulating substrate 200 having a transmittance of 80% or higher to a visible light at a wavelength of 400 nm or more and 800 nm or less, a 3% weight reduction temperature of 300° C. or higher, and not having a melting point or having a melting point of 300° C. or higher, and has a thickness of 20 μm or more and 150 μm or less.

Further, the method of separating the first supporting substrate 5 from the first insulating substrate 100 and a method of separating the second supporting substrate 6 from the second insulating substrate 200 are not restricted only to the method of separating them while lowering the bonding strength by the irradiation of the UV-light as described above but other methods may of course be used.

Further, in the first embodiment to the third embodiment, while a small-sized liquid crystal display panel used, for example, in a portable telephone terminal as shown in FIG. 2A is described as an example, it is apparent that the invention is not limited only thereto but applicable also to a large-sized liquid crystal display panel such as a television or a PC display.

Furthermore, in the present specification, while the liquid crystal display device has been described as an example of the image display device applied with invention, it is apparent that the invention is not restricted thereto but applicable also to an image display device of a constitution or an operation principle similar with that of the liquid crystal display device and having the polarizer.

What is claimed is:

1. An image display device having a display panel in which a first substrate and a second substrate are opposed to each other,
    wherein the first substrate has a first insulating substrate composed of a resin, a circuit layer having a circuit in which a plurality of thin-film transistors are arranged in a matrix, and a polarizer disposed between the first insulating substrate and the circuit layer, and
    wherein the first insulating substrate has a thickness of 35 μm or more and 150 μm or less, a transmittance of 80% or more to a visible light at a wavelength of 400 nm or more and 800 nm or less, and a 3 wt % weight loss temperature of 300° C. or higher, and has no melting point or has a melting point of 300° C. or higher, and
    wherein the second substrate has a second insulating substrate composed of a resin of one of a polybenzoxazole containing a cycloaliphatic structure, a polyamideimide containing an alicyclic structure, a polyimide containing an alicyclic structure, and a polyamide containing an alicyclic structure.

2. The image display device according to claim 1, wherein the first insulating substrate is composed of a resin of one of a polybenzoxazole containing a cycloaliphatic structure, a polyamideimide containing an alicyclic structure, a polyimide containing an alicyclic structure, and a polyamide containing an alicyclic structure.

3. The image display device according to claim 1,
    wherein the second substrate has a polarizer disposed on the surface of the second insulating substrate, and
    wherein the polarizer of the first substrate and the polarizer of the second substrate are disposed between the first insulating substrate and the second insulating substrate.

4. The image display device according to claim 1, wherein a liquid crystal is interposed between the first substrate and the second substrate of the display panel.

* * * * *